(12) United States Patent
Galdo et al.

(10) Patent No.: US 11,888,594 B2
(45) Date of Patent: Jan. 30, 2024

(54) SYSTEM ACCESS USING A MOBILE DEVICE

(71) Applicant: Apple Inc., Cupertino, CA (US)

(72) Inventors: Florian Galdo, Sunnyvale, CA (US); Arun G. Mathias, Los Altos, CA (US); Matthias Lerch, Paris (FR); Najeeb M. Abdulrahiman, Fremont, CA (US); Onur E. Tackin, Sunnyvale, CA (US); Yannick Sierra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 298 days.

(21) Appl. No.: 17/479,571

(22) Filed: Sep. 20, 2021

(65) Prior Publication Data

US 2022/0078029 A1    Mar. 10, 2022

Related U.S. Application Data

(63) Continuation of application No. 16/490,418, filed as application No. PCT/US2018/020494 on Mar. 1, 2018, now Pat. No. 11,128,478.

(Continued)

(51) Int. Cl.
*H04L 9/32*        (2006.01)
*H04L 9/08*        (2006.01)
*H04L 9/40*        (2022.01)

(52) U.S. Cl.
CPC .......... *H04L 9/3263* (2013.01); *H04L 9/0841* (2013.01); *H04L 9/3247* (2013.01); *H04L 63/0823* (2013.01)

(58) Field of Classification Search
CPC . H04L 2209/80; H04L 63/0823; H04L 9/006; H04L 9/3247; H04L 9/3265; H04L 9/3263
See application file for complete search history.

(56) References Cited

U.S. PATENT DOCUMENTS 3,841,987 A1    9/2014   Stanfield et al.
9,189,900 B1 *   11/2015   Penilla .................... B60L 53/80
(Continued)

FOREIGN PATENT DOCUMENTS

CN     101005359 A    7/2007
CN     101129018 A    2/2008
(Continued)

OTHER PUBLICATIONS

Office Action in KR Appl. No. 10-2022-7016314 dated Oct. 28, 2022, 7 pages.

(Continued)

*Primary Examiner* — Olugbenga O Idowu
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to electronic security, e.g., for authenticating a mobile electronic device to allow access to system functionality (e.g., physical access to the system, starting an engine/motor, etc.). In some embodiments, a system and mobile device exchange public keys of public key pairs during a pairing process. In some embodiments, an asymmetric transaction process includes generating a shared secret using a key derivation function over a key established using a secure key exchange (e.g., elliptic curve Diffie-Hellman), and verifying a signature of the system before transmitting any information identifying the mobile device. In various embodiments, disclosed techniques may increase transaction security and privacy of identifying information.

20 Claims, 32 Drawing Sheets

Related U.S. Application Data

(60) Provisional application No. 62/565,039, filed on Sep. 28, 2017, provisional application No. 62/471,926, filed on Mar. 15, 2017, provisional application No. 62/465,806, filed on Mar. 1, 2017.

(56) References Cited

U.S. PATENT DOCUMENTS

| | | |
|---|---|---|
| 9,218,700 B2 | 12/2015 | Gautama et al. |
| 2003/0093374 A1 | 5/2003 | Fenlon et al. |
| 2006/0075222 A1 | 4/2006 | Moloney et al. |
| 2006/0105740 A1 | 5/2006 | Puranik |
| 2009/0161876 A1 | 6/2009 | Sherkin |
| 2011/0213629 A1 | 9/2011 | Clark et al. |
| 2012/0240192 A1 | 9/2012 | Orazi et al. |
| 2012/0290830 A1 | 11/2012 | Resch et al. |
| 2013/0259232 A1 | 10/2013 | Petel |
| 2014/0032898 A1 | 1/2014 | Yu et al. |
| 2014/0040621 A1* | 2/2014 | Klimke ............ H04W 12/08 713/171 |
| 2014/0079217 A1 | 3/2014 | Bai et al. |
| 2015/0188704 A1 | 7/2015 | Takenaka et al. |
| 2015/0222517 A1 | 8/2015 | McLaughlin et al. |
| 2015/0372811 A1 | 12/2015 | Le Saint et al. |
| 2016/0099814 A1 | 4/2016 | Negi et al. |
| 2016/0359629 A1 | 12/2016 | Nadathur et al. |
| 2017/0203720 A1 | 7/2017 | Peeters et al. |
| 2017/0236343 A1 | 8/2017 | Leboeuf et al. |
| 2017/0373843 A1 | 12/2017 | Benson et al. |

FOREIGN PATENT DOCUMENTS

| | | |
|---|---|---|
| CN | 101719250 A | 6/2010 |
| CN | 106127079 A | 11/2016 |
| JP | 2000-502553 | 2/2000 |
| JP | 2008-518530 | 5/2008 |
| JP | 2012-249054 | 12/2012 |
| KR | 10-2015-0054485 A | 5/2015 |
| KR | 10-2017-0017011 A | 2/2017 |
| KR | 1020170015462 A | 2/2017 |
| WO | 2009078139 A1 | 6/2009 |
| WO | 2015/120161 | 8/2015 |
| WO | 2017/181132 | 10/2017 |

OTHER PUBLICATIONS

KS Information technology—Security techniques—Entity authentication—Part 3: Mechanisms using digital signature techniques; KS X ISO/IEC 9798-3; confirmed in 2018; 13 pages.

Notice of Allowance in KR Appl. No. 10-2019-7023775 dated Mar. 3, 2022, 3 pages.

Philipp Mundhenk, et al., "Lightweight Authentication for Secure Automotive Network," 2015 Design, Automation & Test in Europe Conference & Exhibition, pp. 285-288.

Richard Soja, "Automotive Security: From Standards to Implementation," White Paper, NXP, Jan. 2014, 18 pages.

BSI TR-03110 Technical Guideline Advanced Security Mechanisms for Machine Readable Travel Documents and eIDAS Token, Bundesamt für Sicherheit in der Informationstechnik, https://www.bsi.bund.de/EN/Publications/TechnicalGuidelines/TR03110/BSITR03110.html, 2 pages. [Retrieved Feb. 20, 2018].

International Search Report & Written Opinion in Appl. No. PCT/US2018/020494 dated May 14, 2018, 10 pages.

Office Action in Japanese Appl. No. 2019-547391 dated Oct. 23, 2020, 2 pages.

Extended European Search Report in Appl. No. 20188408.7 dated Nov. 4, 2020, 8 pages.

Office Action in Korean Appl. No. 10-2019-7023775 dated May 28, 2021, 6 pages.

Behrouz A. Forouzan, Cryptography & Network Security, The McGraw-Hill companies (2007), entire book.

First Office Action in CN Appl. No. 201880011318.6 dated Jun. 28, 2021.

Office Action in EP Appl. No. 20188408.7 dated Jan. 23, 2023, 5 pages.

* cited by examiner

SYSTEM ACCESS USING A MOBILE DEVICE

The present application is a continuation of U.S. application Ser. No. 16/490,418 filed Aug. 30, 2019 (now U.S. Pat. No. 11,128,478), which is a U.S. National Application under 35 U.S.C. § 371 of PCT Appl. No. PCT/US18/20494 filed Mar. 1, 2018, which claims priority to U.S. Provisional Appl. Nos. 62/565,039 filed on Sep. 28, 2017, 62/471,926 filed on Mar. 15, 2017, and 62/465,806 filed on Mar. 1, 2017; the disclosures of each of the above-referenced applications are incorporated by reference herein in their entireties

BACKGROUND

Technical Field

This disclosure relates generally to electronic security, and, more specifically, to cryptographic techniques for using a mobile device to gain access to another system.

Description of the Related Art

Traditional techniques for gaining access to functionality of a system (e.g., physical access or accessing some function of the system) may require use of physical keys or electronic key fobs. Carrying such traditional keys may be inconvenient and may allow malicious entities to gain access if a key is lost or stolen.

Figure 1A:
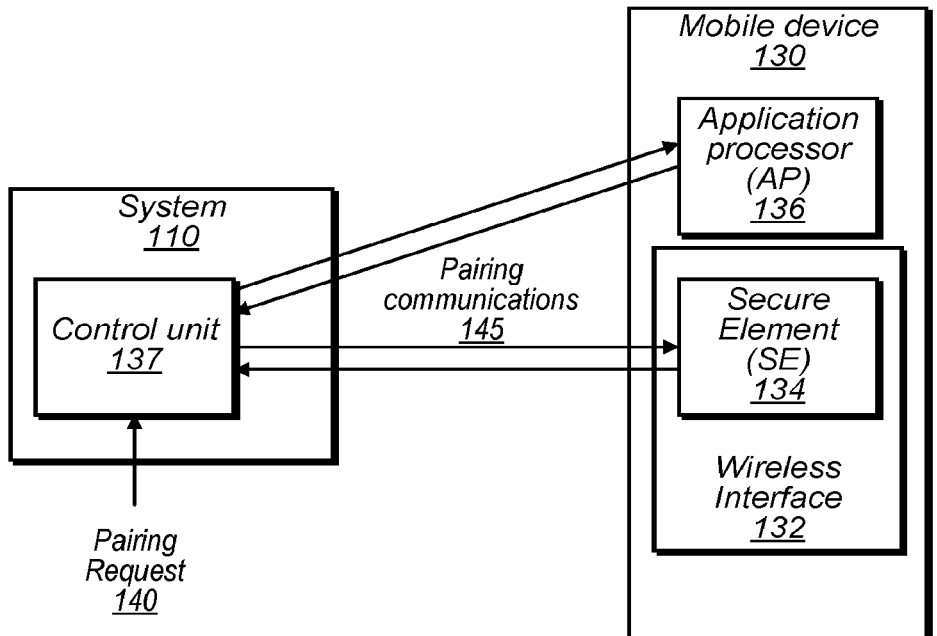
FIG. 1A is a block diagram illustrating exemplary pairing communications between a mobile device and a control unit, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "secure circuit configured to perform an authentication" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a mobile device may have a first user and a second user. The term "first" is not limited to the initial user of the device. The term "first" may also be used when only one user of the mobile device exists.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Overview of Exemplary Embodiments

The present disclosure describes embodiments in which a mobile device is used to gain access to functionality of a system. In some embodiments, asymmetric cryptography is used to establish a secure channel between a mobile device and a system. Using the secure channel, the system may authenticate the device by verifying a signature generated by a secure circuit such as a secure element (SE) of the mobile device using a previously-stored public key (e.g., a key stored as part of a pairing process). A processor such as a control unit of the system (e.g., an ECU) may be configured to store long-term key pairs, generate short-lived asymmetric key pairs, and verify signatures. A mobile device may include an SE configured to store long term asymmetric key pairs.

In various embodiments, the mobile device initially performs a pairing procedure with the system. This procedure may include the mobile device exchanging short-lived public key pairs with the system and a processor of the mobile device generating a shared secret with the system based on the exchanged keys (e.g., using elliptic curve Diffie-Hellman (ECDH)). A secure circuit of the mobile device may also generate a public key pair to allow the system to authenticate the mobile device. The secure circuit may be a secure element, for example. As used herein, the term "secure element" is to be interpreted according to its understood meaning in the art, which includes circuitry (e.g., often a single-chip microcontroller) that is configured to store information in a tamper-resistant manner that resists unauthorized extraction of that information. Non-limiting examples of form factors for secure elements include UICC, embedded SE, and microSD. In some embodiments, the secure element is also used for other types of transactions such as payment transactions, for example. For payment transactions, the secure element may cryptographically store data for payment instruments (e.g., credit cards) and owners (e.g., cardholders), entry to physical locations or buildings, transmit access, etc. In some embodiments, at least a portion of secure element functionality may be cloud-based. In these embodiments, the secure element on a device may store virtual information which may be used to retrieve actual required information that is stored on a server. In some embodiments, other types of secure circuits or secure processors may perform functionality described as being performed by a secure element, including, for example, a secure enclave processor discussed below.

After the key exchange, the mobile device may then encrypt a certificate for the key pair using the private key and send the encrypted certificate to the system. The mobile device may then display a value derived based on the public key pair and ask the user of the mobile device to confirm that the value is also displayed on a display of the system, which may derive the value based on the public key in the certificate.

Once the mobile device has been paired with the other system, the mobile device may perform an exchange with the other system to enable functionality of the other system such as, in some embodiments, opening a door, starting an engine or activating a motor, make a call, play media, travel above a certain speed, etc. In some embodiments, the exchange includes the processor of the mobile device generating another encryption key shared with the system for the session and the system issuing a challenge to the mobile device. In response to receiving the challenge, the secure element of the mobile device generates a response using a private key of the previously generated public key pair. In other embodiments, other secure circuits that are not considered secure elements may be used for perform similar functionality. The mobile device then encrypts the response with the other encryption key and sends the response to the system for verification. In response to a successful verification, the system may enable requested functionality.

In some instances, an owner of the system may wish to enable a mobile device of another user to access the system. In some embodiments, a secure element of the other user's mobile device may generate a public key pair and a corresponding certificate signing request for the public key. The other user's device may then send the certificate signing request to the secure element of the owner's mobile device, which generates a certificate for public key. The owner's mobile device may then send the generated certificate to the other user's mobile device to permit that mobile device to enable functionality of the system.

Figure 2:
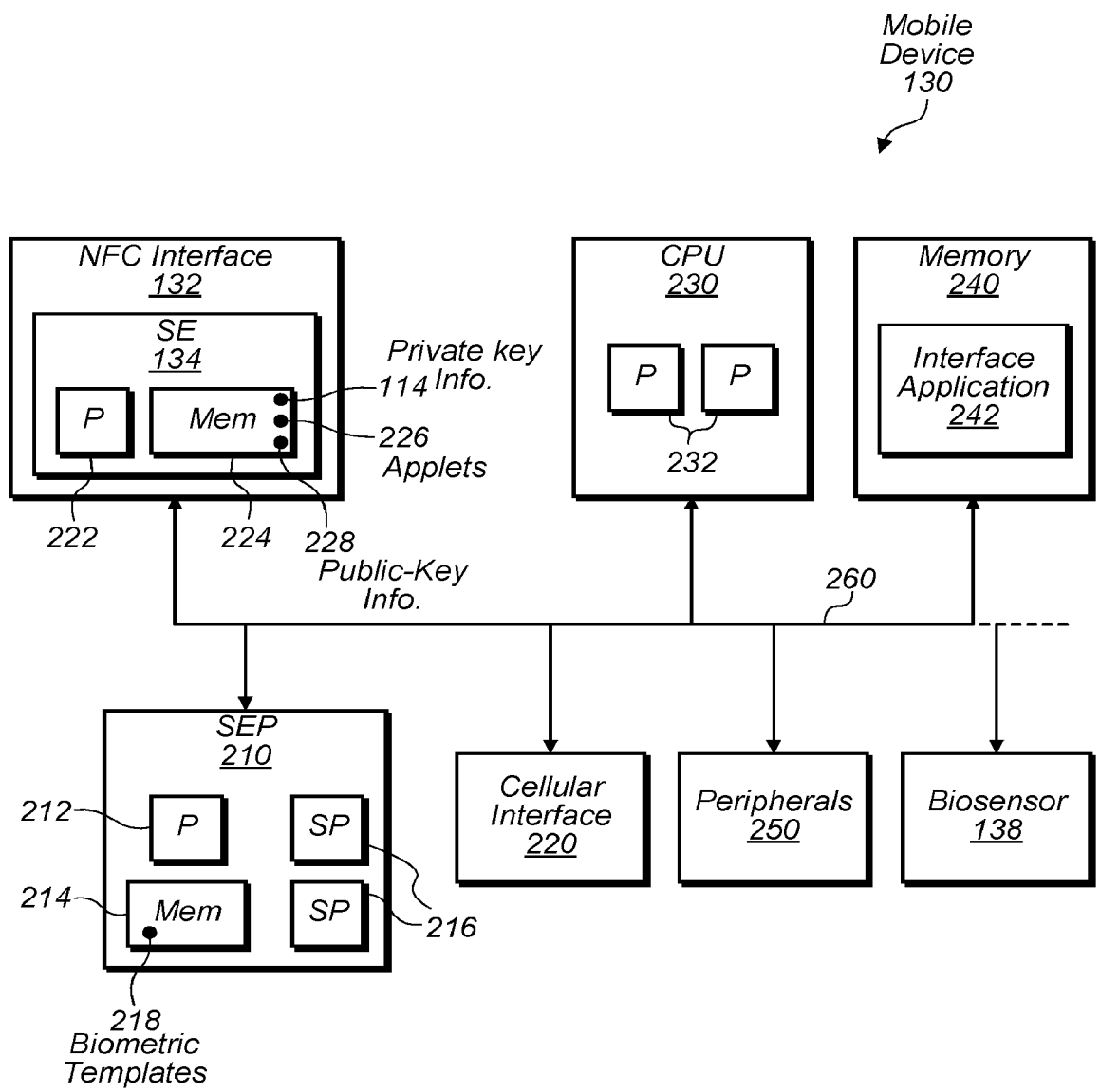
FIG. 2 is a block diagram illustrating an exemplary mobile device, according to some embodiments.

The mobile device and system may include any suitable hardware to implement functionality described herein. Accordingly, this hardware may include a processor subsystem coupled to a system memory and I/O interfaces(s) or devices via an interconnect (e.g., a system bus). Although described as a mobile device, this device may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). The mobile device and/or system may also implement various functionality by executing program instructions embodied in a non-transitory computer readable medium. FIG. 2, described in further detail below, shows additional non-limiting examples of hardware embodiments.

In some embodiments, the disclosed techniques may advantageously provide privacy equivalent to physical keys, offline key sharing, interoperability across devices and systems, operation independent from the underlying radio protocol(s), scalable systems, etc. In some embodiments, mobile device private keys never leave secure circuitry (e.g., a secure element) included in the mobile device. In some embodiments, the disclosed techniques can be used over an untrusted channel and provide protection against active and/or passive eavesdroppers.

As used herein, the term "secure channel" refers to either a dedicated path for communicating data (i.e., a path shared by only the intended participants) or communicating encrypted data or signed data using cryptographic keys known only to the intended participants. As used herein, the term "secure circuit" refers to one of a class of circuits that is configured to perform one or more services and return an authenticated response to an external requester. A result returned by a secure circuit is considered to have indicia of trust exceeding that of a circuit that merely returns a result without any form of authentication. Thus, a circuit that provides data (e.g., from an untrusted memory region accessible to third-party applications) that does not authenticate the source of accessed data would not be considered a secure circuit within the meaning of this application. In embodiments disclosed herein, a secure element and a secure enclave processor are provided as examples of secure circuits. By authenticating results that are returned, such as by signing with a verifiable cryptographic signature, a secure circuit may thus provide anti-spoofing functionality. Similarly, by encrypting results using a private or secret key, a secure circuit may authenticate the source of the encrypted data (encryption may be used alone or in combination with signatures, in various embodiments). Additionally, in some cases, a secure circuit may be said to be "tamper-resistant," which is a term of art referring to mechanisms that prevent compromise of the portions of the secure circuit that perform the one or more services. For example, a secure mailbox may be implemented such that only a portion of the secure circuit (e.g., a pre-defined memory region) is directly accessible to other circuitry. Similarly, firmware executed by a secure circuit may be encrypted, signed, and/or stored in a region that is inaccessible to other processing elements.

FIG. 1A is a block diagram illustrating exemplary pairing communications 145 between circuitry such as a control unit of a system and a mobile device, according to some embodiments. Although a single control unit is discussed in various examples for purposes of illustration, similar techniques may be used with multiple different control unit or processors (e.g., microcontrollers) and various types of control unit or processors that control different vehicular functions. The term "ECU" is one example of a control unit and is a term of art which is intended to be construed according to its well-understood meaning, which includes circuitry configured to control one or more operations of a vehicle.

System 110, in the illustrated embodiment, includes control unit 137 and receives a pairing request 140 from a user. In some embodiments, system 110 is a vehicle or a component thereof such as an ECU. Examples of vehicles include, without limitations: aircraft, marine vessels, RVs, automobiles, buses, railed vehicles, spacecraft, robotic devices, etc. Examples of systems that may not be vehicles further include: physical locations such as buildings, transit access control, and internet of things or home automation devices or controllers. Note that various actions described as performed by system 110 may be performed by a processor, component, or device included in system 110. The pairing request may be initiated at system 110, e.g., via input entered using a touchscreen in system 110, for example, and may include information identifying the user and/or information for initial authentication of the user, e.g., a personal identification number (PIN), a password, biometric authentication, etc. In various embodiments, the information may be sent out of band relative to the wireless communications discussed herein. In some embodiments, a manufacturer or provider of the system provides an initial PIN to the user upon sale of the system 110, which is then used in pairing request 140.

Mobile device 130, in the illustrated embodiment, includes an application processor (AP) 136 and wireless interface 132 (e.g., an NFC interface, Bluetooth interface, Wi-Fi direct interface, etc.), which in turn includes an SE 134. In some embodiments, SE 134 is configured to perform various encryption operations to facilitate secure communications between mobile device 130 and system 110. Note that although NFC communications are discussed herein, this is not intended to limit the scope of the present disclosure. In other embodiments, any of various appropriate interfaces may be used with the disclosed techniques, such as Wi-Fi Direct, Bluetooth, etc. Further, various functionality discussed herein with reference to a particular type of element (e.g., an application processor, secure element, ECU, etc.) may be performed by other types of elements, in various embodiments.

Pairing of mobile device 130 and system 110 may involve establishment of a shared secret (which may also be referred to as a shared key) and storing a long-term public key from the SE 134 by the system 110. A detailed description of an exemplary pairing procedure is discussed below, with reference to FIG. 3. Once paired, SE 134 may also facilitate transactions in which the mobile device 130 instructs the system 110 to perform various operations, e.g., as discussed below with reference to FIG. 4.

Figure 1B:
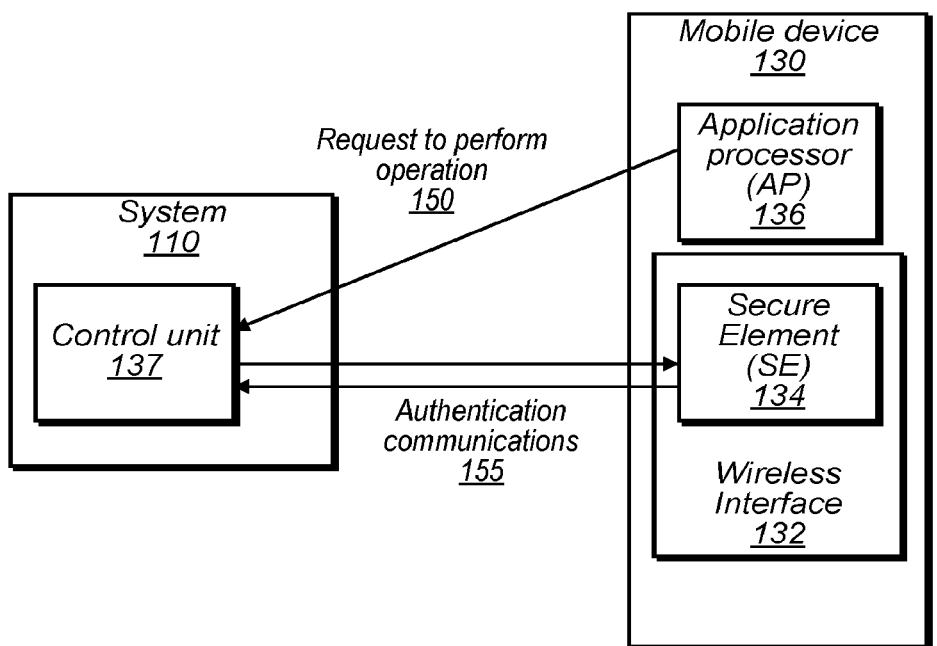
FIG. 1B is a block diagram illustrating exemplary request and authentication communications between a mobile device and an control unit, according to some embodiments.

FIG. 1B is a block diagram illustrating exemplary communications between a system and a mobile device to perform an operation, according to some embodiments. Examples of an operation include opening a door lock, starting an engine, enabling or disabling functionality, changing media being played, connecting or disconnecting the system to a wide-area network, authorizing or removing additional users, access to keychain data, ability to make purchases, etc. In the illustrated embodiment, SE 134 is configured to perform authentication communications 155 for a request 150 initiated by AP 136.

Figure 1C:
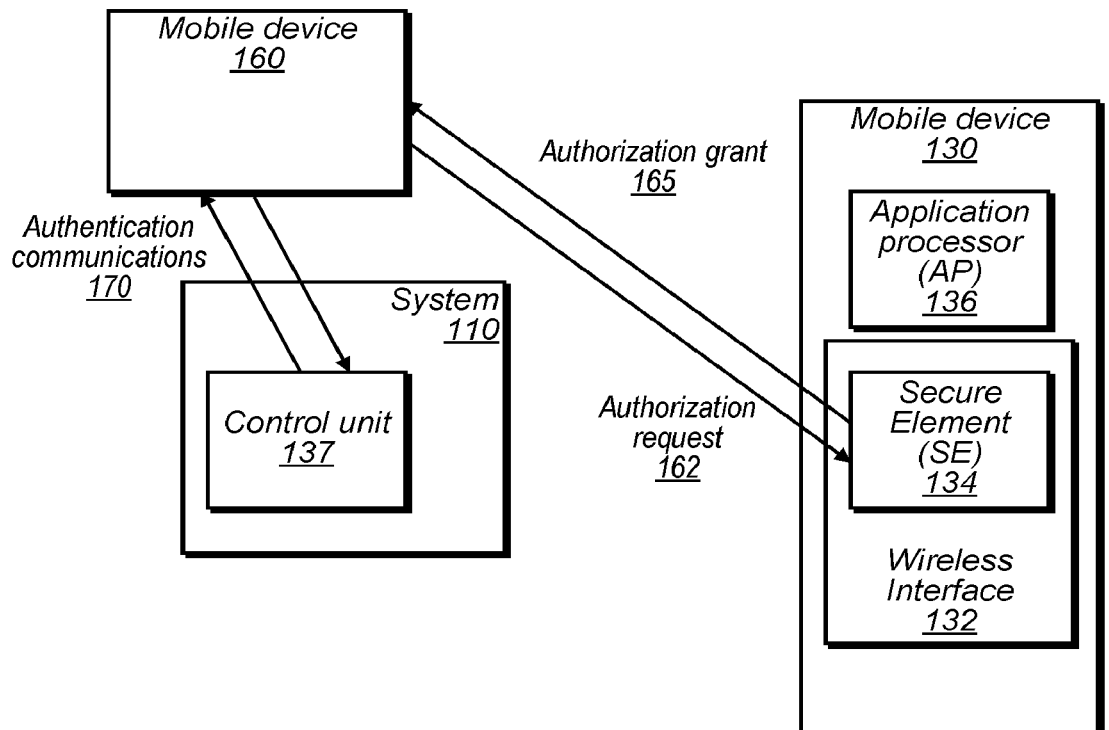
FIG. 1C is a block diagram illustrating exemplary communications to grant authorization to another mobile device to control an control unit, according to some embodiments.

FIG. 1C is a block diagram illustrating exemplary communications to grant authorization to another mobile device 160 to control unit 137. This may allow a user of a paired device to grant access to one or more other devices, e.g., of friends or family members. In the illustrated embodiment, SE 134 sends an authorization grant 165 (which may include a signed certificate, for example) to mobile device 160 that enables system 110 to confirm that mobile device 160 received authorization from mobile device 130, based on authentication communications 170. In the illustrated embodiment, mobile device 160 sends an authorization request 162, which may include a key to be signed by the SE 134.

Exemplary Mobile Device Implementation

Turning now to FIG. 2, a block diagram of a mobile device 130 is depicted, according to some embodiments. Mobile device 130 may include wireless interface 132, SE 134, and biosensor 138. In the illustrated embodiments, mobile device 130 further includes a secure enclave processor (SEP) 210, cellular interface 220, CPU 230, memory 240, peripherals 250 coupled via a communication fabric 260. As shown, SEP 210 may include one or more processors P 212, a secure memory 214, and one or more security peripherals 216. SE 134 may include one or more processors P 222 and a memory 224. CPU 320 may include one or more processors P 232. Memory 240 may store an interface application 242. In some embodiments, mobile device 130 may be implemented differently than shown.

In some embodiments, SEP 210 is configured to maintain previously-captured biometric template data 218 of one or more authorized users and compare it against newly received data captured by biosensor 138 in order to authenticate a user. (In another embodiment, biosensor 138 or SE 134 may perform the comparison.) In the illustrated embodiment, SEP 210 is configured to store biometric data collected from fingerprints, facial biometric data (e.g., iris data, voice data, facial or body characteristics), etc. in biometric templates 218. In fingerprint embodiments, each template 218 may correspond to a particular registered user and may be assigned a unique index value. In some embodiments, if biometric data received from biosensor 138 matches the biometric data stored in a template 218, SEP 210 is configured to provide the unique index value associated with the matching template 218 to SE 134, which, in turn, uses the index value to look up the corresponding identification information for a known user being authenticated. In some embodiments, SEP 210 may store multiple templates 218. In various embodiments, communications between SEP 210, SE 134, and/or biosensor 138 are encrypted such that another entity, such as CPU 230, is unable to view their communications.

In various embodiments, SEP 210 is configured to securely store biometric data. Accordingly, in various embodiments, SEP 210 is isolated from the rest of the mobile device 130 except for a carefully controlled interface (thus forming a secure enclave for SEP processor 212, secure memory 214, and security peripherals 216). Because the interface to SEP 210 is carefully controlled, direct access to SEP processor 212, secure memory 214, and security peripherals 216 may be prevented. In one embodiment, a secure mailbox mechanism may be implemented. In the secure mailbox mechanism, external devices may transmit messages to an inbox. SEP processor 212 may read and interpret the message, determining the actions to take in response to the message. Response messages from the SEP processor 212 may be transmitted through an outbox, which is also part of the secure mailbox mechanism. Other circuitry may not be able to access internal resources of SEP 210 other than via the mailbox mechanism. Other interfaces that permit only the passing of commands/requests from the external components and results to the external components may be used. No other access from the external devices to SEP 210 may be permitted, and thus the SEP 210 may be "protected from access." More particularly, software executed anywhere outside SEP 210 may be prevented from direct access to the secure components with the SEP 210. SEP processor 212 may determine whether a command is to be performed. In some cases, the determination of whether or not to perform the command may be affected by the source of the command. That is, a command may be permitted from one source but not from another.

In various embodiments, SEP 210 may be configured to perform functionality described with reference to SE 134 and/or vice versa. In some embodiments, SE 134 is configured to authenticate the identity of device 130 while SEP 210 is configured to authenticate the identity of a current user of device 130 (which also may be required for system access, in some embodiments).

In some embodiments, SEP processor 212 may execute securely loaded software that facilitates implementing functionality descried with respect to SEP 210. For example, a secure memory 214 may include software executable by SEP processor 212. One or more of the security peripherals 216 may have an external interface, which may be connected to a source of software (e.g. a non-volatile memory such as Flash memory). In another embodiment, the source of software may be a non-volatile memory coupled to another peripheral 216, and the software may be encrypted to avoid observation by a third party. The software from the source may be authenticated or otherwise verified as secure, and may be executable by SEP processor 212. In some embodiments, software may be loaded into a trust zone in memory 214 that is assigned to the SEP 210, and SEP processor 212 may fetch the software from the trust zone for execution. The software may be stored in the memory 240 in encrypted form to avoid observation. Despite the steps taken to ensure security of the secure software, the secure software may still be prevented from directly accessing/obtaining stored private keys. Only hardware may have access to private keys, in an embodiment.

Security peripherals 216 may be hardware configured to assist in the secure services performed by SEP 210. Accordingly, security peripherals 216 may include authentication hardware implementing/accelerating various authentication algorithms, encryption hardware configured to perform/accelerate encryption, secure interface controllers configured to communicate over a secure interface to an external (to mobile device 130) device, etc.

In some embodiments, SE 134 may implement similar functionality as SEP 210 in order to restrict access to confidential information stored in memory 224 such as public-key information 228. For example, SE 134 may implement a mailbox to restrict access to processor 222 and memory 224. In various embodiments, SE processor 222 also executes securely loaded software in order to implement functionality described herein such as applets 226 stored in memory 224.

Applets 226, in one embodiment, are executable to perform enrollment of mobile device 130 and authentication with a reader. With respect to enrollment, applets 226 may be executable to generate public-key pairs and obtain corresponding certificates, which may be stored in memory 224 as public-key information 228.

Interface application 242, in some embodiments, is executable to facilitate interfacing between SEP 210, SE 134, and a user of mobile device 130 when enrollment and authentication are performed. Accordingly, application 242 may provide various prompts to the user instructing the user to perform various actions during these processes. Application 242 may also activate biosensor 138, SEP 210, and/or SE 134 when appropriate during these processes. Various actions performed by application 242 are described in further detail below.

Cellular Interface 220, in some embodiments, is a long-range radio configured to facilitate interaction between mobile device 130 and one or more external systems such as systems 120 and 140. Cellular link 220 may include suitable circuitry for interfacing with long-range networks such as a baseband processor, analog RF signal processing circuitry (e.g., including filters, mixers, oscillators, amplifiers, etc.), digital processing circuitry (e.g., for digital modulation as well as other digital processing), one or more antennas, etc. Cellular interface 220 may be configured to communicate using any of multiple radio access technologies/wireless communication protocols such as GSM, UMTS, CDMA2000, LTE, LTE-A, etc.

As mentioned above, CPU 230 may include one or more processors 232. Generally, a processor may include circuitry configured to execute instructions defined in an instruction set architecture implemented by the processor. Processors 232 may include (or correspond to) processor cores implemented on an integrated circuit with other components as a system on a chip (SOC) or other levels of integration. Processors 232 may further include discrete microprocessors, processor cores and/or microprocessors integrated into multichip module implementations, processors implemented as multiple integrated circuits, etc.

Processors 232 may execute the main control software of the system, such as an operating system. Generally, software executed by CPU 230 during use may control the other components of the system to realize the desired functionality of the system. The processors may also execute other software. These applications may provide user functionality, and may rely on the operating system for lower-level device control, scheduling, memory management, etc. Accordingly, processors 232 (or CPU 230) may also be referred to as application processors. CPU 230 may further include other hardware such as an L2 cache and/or an interface to the other components of the system (e.g. an interface to the communication fabric 260).

Memory 240 may generally include the circuitry for storing data. For example, memory 240 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). Device 130 may include a memory controller (not shown) that may include queues for memory operations, for ordering (and potentially reordering) the operations and presenting the operations to the memory 240. The memory controller may further include data buffers to store write data awaiting write to memory and read data awaiting return to the source of the memory operation. In some embodiments, the memory controller may include a memory cache to store recently accessed memory data. In some embodiments memory 330 may include program instructions, such as instructions of application 242 that are executable by one or more processors 232 to cause device 130 to perform various functionality described herein with respect to device 130.

Peripherals 250 may be any set of additional hardware functionality included in device 130. For example, peripherals 340 may include video peripherals such as an image signal processor configured to process image capture data from a camera or other image sensor, display controllers configured to display video data on one or more display devices, graphics processing units (GPUs), video encoder/decoders, scalers, rotators, blenders, etc. Peripherals 250 may include audio peripherals such as microphones, speakers, interfaces to microphones and speakers, audio processors, digital signal processors, mixers, etc. Peripherals 250 may include interface controllers for various interfaces including interfaces such as Universal Serial Bus (USB), peripheral component interconnect (PCI) including PCI Express (PCIe), serial and parallel ports, etc. Peripherals 250 may include networking peripherals such as media access controllers (MACs). Any set of hardware may be included.

Communication fabric 260 may be any communication interconnect and protocol for communicating among the components of device 130. Communication fabric 260 may be bus-based, including shared bus configurations, cross bar configurations, and hierarchical buses with bridges. Communication fabric 260 may also be packet-based, and may be hierarchical with bridges, cross bar, point-to-point, or other interconnects.

Although FIG. 2 depicts components within mobile device 130, it is noted that similar components may exist in computer systems used to implement other functionality described herein such as functionality described with respect to system 110 or mobile device 160. Accordingly, these systems may also include CPUs, memory, various network interfaces, and peripherals such as those described above.

Exemplary Pairing Techniques

Figure 3:
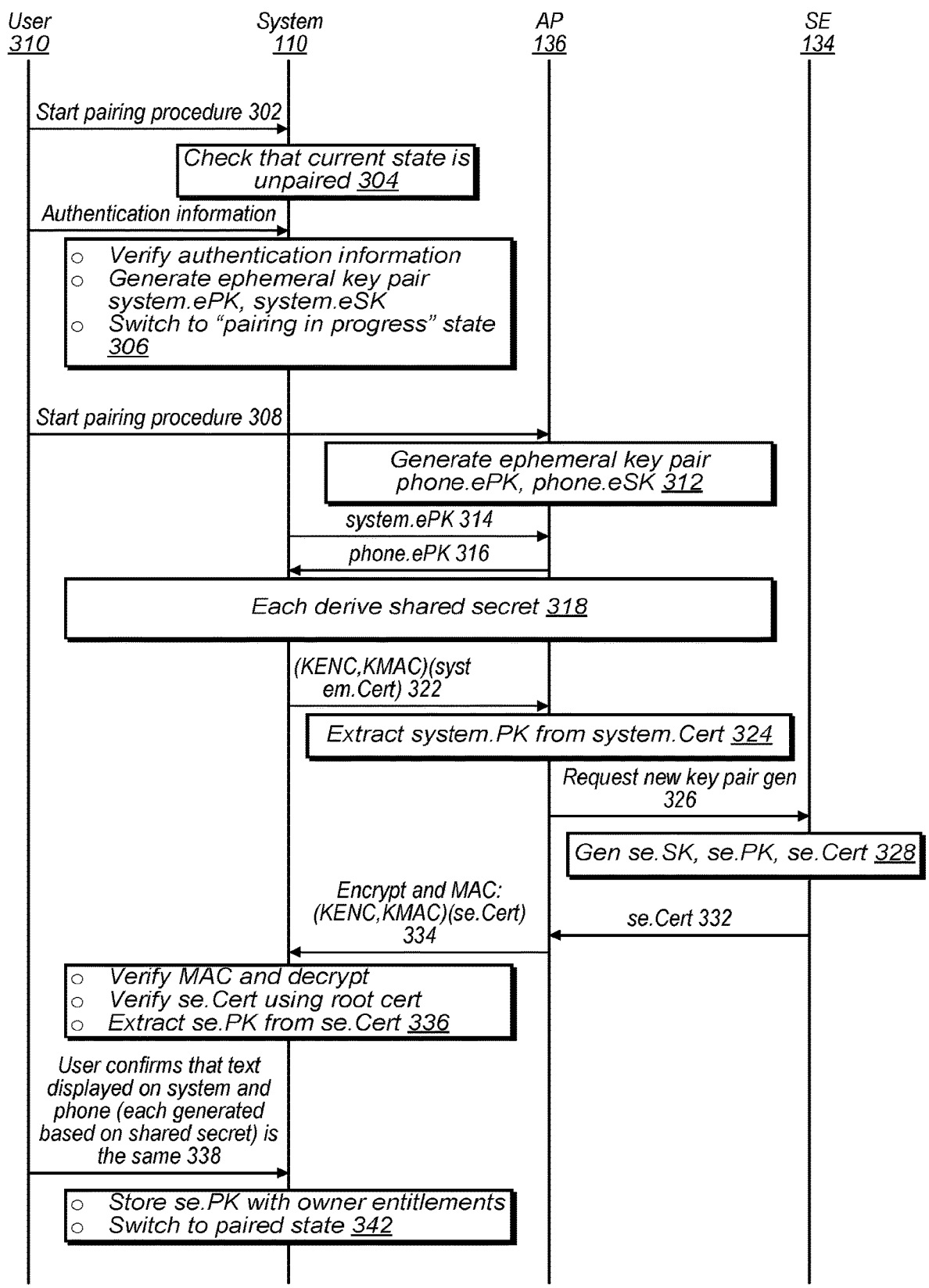
FIG. 3 is a communication diagram illustrating exemplary techniques for pairing, according to some embodiments.

FIG. 3 is a communication diagram illustrating exemplary messages between a user 310, system 110 (e.g., using control unit 137), application processor 136, and SE 134 for a pairing procedure. In some embodiments, the pairing procedure results in a long-term public key system.PK being stored by mobile device 130 and a long-term public key se.PK being stored by system 110. These keys may then be used for various transactions, e.g., as described below with reference to FIG. 4.

In the procedure of FIG. 3, the user 310 starts the pairing with system 110 at 302, e.g., using a console interface of the system or some other input device. In the illustrated embodiment, the system 110 then checks that the current state is unpaired at 304 (e.g., that the system is not currently paired with another mobile device). In other embodiments, pairing may be allowed even if the system 110 is already paired with another device. Allowing only one mobile device to be paired at a time may improve security but limit flexibility (although this may be mitigated by allowing a paired mobile device to authorize other mobile devices, as discussed in further detail below).

In the illustrated embodiment, the user 310 submits authentication information to the system 110. This may include a user PIN, a password, presence of a fob or key for the system, biometrics, etc. In some embodiments, multiple types of authentication information may be required. This may prevent unauthorized individuals from initiating the pairing procedure. Speaking generally, system 110 may require entrance to the pairing state before adding an owner key to the system and may require the user to prove ownership of the system before entering this state. The technique for proving ownership may be defined by a manufacturer of system 110.

In the illustrated embodiment, at 306 system 110 verifies the authentication information and, in response, generates an ephemeral key pair. In the illustrated embodiment, system 110 switches to a "pairing in progress state" at this point. Note that in other embodiments, other states may be used and the states may be entered or exited at different points than shown.

In the illustrated embodiment, the key pair includes an ephemeral public key system.ePK and an ephemeral secret key system.eSK. The keys may be "ephemeral" in the sense that they are limited-use, e.g., valid only for a certain number of uses (including embodiments in which they are valid for only a single use) or valid for a certain time interval. Ephemeral keys may be deleted at the end of each transaction. Because ephemeral keys are invalid after expiration, this may prevent the keys from being re-used by an unauthorized individual if they are somehow intercepted.

In the illustrated embodiment, user 310 also starts the pairing procedure with mobile device 130 via AP 136 at 308. This may be performed using an input device of mobile device 130 such as a touch screen, for example. The user may initiate the pairing procedure by opening an application and selecting a pair option, for example. In some embodiments, rather than requiring a user to navigate to a pairing application, mobile device 130 is configured to automatically prompt the user for input to confirm that a pairing operation is desired, e.g., in response to communications by system 110. In other embodiments, user-initiating of the pairing process may be required on both devices in order to avoid broadcasting an indication that pairing is occurring. Mobile device 130 may also prompt the user for authentication information such as a password, a biometric scan, a PIN, etc.

In response to initiation of the pairing procedure, at 312 AP 136 also generates an ephemeral key pair phone.ePK and phone.eSK, in the illustrated embodiment. In the illustrated embodiment, system 110 and AP 135 then exchange their respective generated ephemeral public keys, system.ePK and phone.ePK at 314 and 316. Each device then derives a shared secret based on the exchanged public keys and their respective secret keys at 318. As discussed above, ECDH may be used to derive the shared secret. At this point in the process, in the illustrated embodiment, an unauthenticated secure channel has been established between the system 110 and the mobile device 130 using ephemeral keys. In other embodiments, other techniques may be used to establish a shared secret or key. The disclosed techniques for obtaining a shared secret are disclosed for purposes of illustration, but are not intended to limit the scope of the present disclosure.

In the illustrated embodiment, system 110 then sends a certificate (system.Cert) that is encrypted using the shared secret at 322. In the particular illustrated embodiment, the shared secret includes an encryption key (KENC) and a message authorization code (KMAC). These may be shared symmetric keys derived from system.eSK/phone.ePK on the system side and phone.eSK/system.ePK on the mobile device side. These keys may be stored on the AP 136 and the system 110's ECU and may be deleted after each transaction. In the illustrated embodiment, the notation (KENC, KMAC)(data) denotes an encryption operation using KENC and a hashing operation using KMAC (where the hash output may be used to protect the integrity of the key exchange). AP 136, in the illustrated embodiment, extracts the system public key system.PK from the encrypted certificate system.Cert using the shared secret at 324.

In the illustrated embodiment at 326, AP 136 then requests a new key pair to be generated from SE 134. In the illustrated embodiment, SE 134 generates a public/private key pair se.SK and se.PK and a corresponding certificate se.Cert at 328. In the illustrated embodiment, the certificate is a wrapper for the public key, which may describe the public key and indicate that SE 134 is authorized to issue such public keys. The certificate may be self-signed or based on a certificate from a certificate authority (e.g., if the SE 134 is an intermediate authority). SE 135 sends the certificate se.Cert to AP 136 at 332, which then encrypts the certificate using the shared secret (using KENC and KMAC techniques in the illustrated embodiment) and sends the encrypted certificate to system 110 over the secure channel at 334.

In the illustrated embodiment, system 110 then verifies the MAC and decrypts the certificate se.Cert at 336. System 110 then verifies the se.Cert using a root certificate from an authorized entity associated with the mobile device (e.g., obtained from a manufacturer or OEM of mobile device 130) and extracts the public key se.PK from the se.Cert. In some embodiments, the manufacturer of mobile device 130 may provide its root certificate to various system manufacturers to facilitate this procedure.

In the illustrated embodiment, a text confirmation is then performed (this step may be omitted in other embodiments) and both the mobile device 130 and the system 110 generate text information based on the shared secret and display the text information to the user at 338. In the illustrated embodiment, the user then indicates to system 110 that the text is the same on both devices. This may be used to detect and avoid tampering by unauthorized entities during the pairing procedure (which would, e.g., cause the displayed text not to match).

In the illustrated embodiment, system 110 then stores the se.PK with owner entitlements (e.g., information specifying what operations mobile device 130 is authorized to perform) at 342. This long-term SE public key may be used to authenticate future requests from mobile device 130. Examples of owner entitlements for mobile device 130 may include, without limitation: open door, start engine, add/remove keys from system 110 (e.g., owner and friend keys), delegate key sharing to another party, change entitlements, set system to unpaired state, access keychain data (e.g., website usernames, passwords, WLAN network information, payment information, etc.), make purchases within system 110, perform other cryptographic operations, etc. In the illustrated embodiment, the system 110 also switches to a paired state, which may prevent subsequent pairings (e.g., until mobile device 130 is unpaired). In some embodiments, ownership transfer may be performed by giving owner entitlements to a new user (e.g., using the procedure of FIG. 5) and then revoking the previous owner's key, without transitioning to the unpaired state. In other embodiments, transition to the unpaired state may be required to transfer ownership to another mobile device.

In some embodiments, a rotating PIN is used for pairing with system 110. For example, the system 110 may display a new PIN to the user upon successful pairing, where the new PIN is required to be input by the user before another pairing to another mobile device. This may prevent pairings initiated by unauthorized users.

Various operations are discussed herein as being performed by ones of AP 136, SE 134, or SEP 210. These embodiments are discussed for purposes of explanation but are not intended to limit the scope of the present disclosure. In other embodiments, actions described as performed by one of these processors may be performed by other ones or combinations of these processors and/or other processing elements. As one example, SEP 210 may be used to require biometric authentication for various operations described as performed by SE 134 if additional security is desired. Further, the ordering and types of messages in various communication diagrams disclosed herein are not intended to limit the scope of the present disclosure; similar messages may be sent in a different order, disclosed messages may be omitted, and/or additional messages may be utilized, in various embodiments.

In some embodiments, a user may also initiate an un-pairing operation, which may transition system 110 to the unpaired state. This may be used to register a new device as an owner device of system 110, e.g., to transfer ownership of the system or if the user buys a new mobile device. For this process, the mobile device 130 may send a specific command while authenticating with the private key se.SK. In some embodiments, un-pairing may also be performed via an interface of system 110, e.g., by entering the new PIN from the last pairing operation.

In some embodiments, system 110 is configured to operate in a "pairing" state during the operations of FIG. 3 and reject pairing requests in this state. In some embodiments, system 110 is configured to transition to a blocked state after a number of failed pairing attempts (the number may be configurable). In the blocked state, a user may need to contact the manufacturer to obtain a recovery PIN, which may be provided only after showing proof of ownership.

In some embodiments, out-of-band communications may be used to establish a secure channel. For example, system 110 may dynamically generate a password and transfer the password out-of-band to the mobile device 130, e.g., by scanning an image, text, or animation using a camera of mobile device 130. The image, text, or information may be displayed on a multimedia system of system 110, for example. This out-of-band shared secret may be used with a password authenticated key exchange (PAKE) technique such as secure remote password (SRP) to establish the unauthenticated secure channel. In these embodiments, text matching by the user between text displayed by the system 110 and text displayed by mobile device 130 may be omitted, e.g., because the out-of-band communications may prevent man-in-the-middle attacks.

In some embodiments, a pre-existing pairing such as a BLUETOOTH pairing may be used to transfer the se.Cert from the mobile device 130 to system 110.

Exemplary Operation Authorization Techniques

Figure 4:
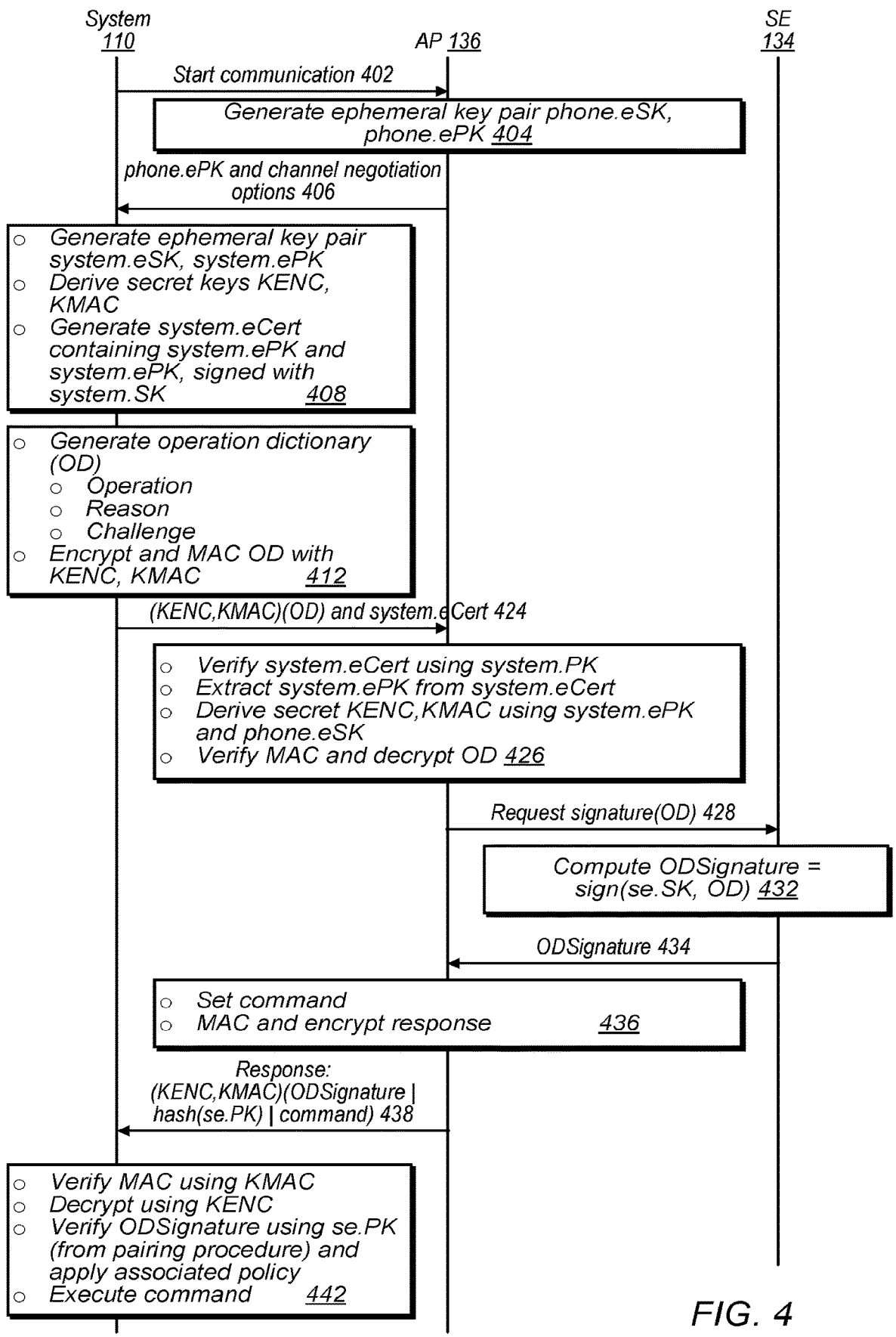
FIG. 4 is a communication diagram illustrating exemplary techniques for authorizing an operation, according to some embodiments.

FIG. 4 is a communication diagram illustrating exemplary messages between system 110 (e.g., via control unit 137), application processor 136, and SE 134 for authorizing an operation by system 110. In the illustrated embodiment, the communications are used to authenticate a command from mobile device 130 that specifies an operation to be performed by system 110.

In the illustrated embodiment at 402, system 110 starts communication with AP 136. In some embodiments, this includes sending polling messages (e.g., NFC anti-collision enhanced contactless polling (ECP) messages). In other embodiments, other communication initiation techniques may be used. In response, AP 136 generates an ephemeral key pair phone.eSK and phone.ePK, in the illustrated embodiment at 404 (although other processing elements such as SE 134 may generate the ephemeral key pair in other embodiments). Examples of key pairs include elliptic curve cryptography (ECC) pairs, pairs generated using AES encryption, etc. In the illustrated embodiment, AP 136 sends this key pair and channel negotiation options to system 110 at 406. In some embodiments, in response to determining that it is within communication distance with system 110, mobile device 130 may automatically prompt the user for input of one or more commands for system 110.

In the illustrated embodiment at 408, system 110 also generates an ephemeral key pair (system.eSK and system.ePK) and derives a KENC and KMAC for using in secure communications with system 110. (ECC may be used for this key pair as well, in some embodiments). In the illustrated embodiment, system 110 also generates a system.eCert certificate that contains the system.ePK and phone.ePK ephemeral public keys and is signed with system.SK.

In the illustrated embodiment at 412, system 110 also generates an operation dictionary (OD) that is a data structure that includes the following information: a requested operation, a reason, and a challenge. The operation, in this instance, may be signature of the challenge (e.g., system 110 is requesting that the challenge be signed by SE 134 using SE 134's secret key). The reason may specify an operation to be performed by the system (e.g., allow physical access or allow driving of the system). System 110 then encrypts and MACs the OD using the KENC and KMAC and also sends a certificate system.eCert for the public key system.PK at 424. AP 136 verifies the system.eCert using the public key system.PK (e.g., as stored during the pairing process) and extracts the ephemeral public key system.ePK from the system.eCert. AP 136 also derives the shared secret (KENC and KMAC in this embodiment) using the system.ePK and the phone.eSK. AP 136 then verifies the MAC and decrypts OD using the KENC at 426. Note that the secure channel of FIG. 4 may be used for privacy purposes.

In the illustrated embodiment, AP 136 then requests a signature of the OD from SE 134 at 428. SE 134 computes the ODSignature by signing the OD with secret key se.SK at 432 and returns ODSignature to AP 136 at 434. In the illustrated embodiment, the signature may be of the challenge in the OD. Encryption using the long-term secret key se.SK may prevent privacy-sensitive data being leaked in a man-in-the-middle attack and allows the phone to share a unique identifier or certificate with system 110 without leakage to an eavesdropper. In some embodiments, the mobile device 130 is further configured to require user authentication for the signature step, e.g., a biometric authentication using SEP 210 for the signature. Generally, mobile device 130 may be configured to require a touch ID or other user verification at this step, in some embodiments.

In the illustrated embodiment, AP 136 then sets the command (which indicates the desired operation(s) to be performed by system 110, in some embodiments) and MACs and encrypts a response to system 110 at 436. In the illustrated embodiment, the response includes the ODSignature, a hash of the public key se.PK, and the command at 438. This may utilize the established secure channel and may allow system 110 to authenticate mobile device 130. Note that although both encrypting and MACing are discussed in various embodiments, encrypting using a secret key without using a MAC may be used in other embodiments.

In the illustrated embodiment at 442, system 110 verifies the MAC using the KMAC portion of the shared secret, decrypts the ODSignature using the KENC portion of the shared secret, verifies the ODSignature using se.PK (as received and stored during the pairing procedure). In the illustrated embodiment, system 110 applies an associated access policy (e.g., to determine whether the user is allowed to perform the requested operation(s) and executes the command if the user is authorized. For example, system 110 may unlock a door to allow access to an interior, allow the system to be driven, allow an alarm to be disabled, etc.

In some embodiments, the disclosed techniques prevent the mobile device 130 from releasing unique identifiers or data (e.g., that might allow the mobile device to be tracked using a rogue radio) without user consent. In particular, public key certificates, public key hashes, or other kinds of key/device unique identifiers may be used to track a user device, but the disclosed techniques may prevent this information from being intercepted by establishing a secure channel prior to exchanging this information and/or by authenticating a system before transmitting this information.

In some embodiments, the disclosed techniques have the forward secrecy property, which prevents an attacker who manages to obtain a long term key from being able to decrypt past communications. In some embodiments, this property is attained by using ephemeral keys on each side.

In other embodiments, a more relaxed forward secrecy property may be implemented using a long term key on the system side and ephemeral keys on the mobile device side. This may simplify implementation on the system side.

In some embodiments, operations described as being performed by AP 136 (e.g., establishment of a secure channel) may be performed by SE 134, which may reduce flexibility in terms of control of the system 110 but may improve overall security.

In various embodiments, user authentication may be performed in addition to authentication of device 130. Authentication may prevent unauthorized users from using mobile device 130 to grant authorization to system 110. Authentication may be performed at least in part by SEP 210, for example, which may prevent SE 134 from performing further communications for a pairing or authorization session until authentication is complete. In some embodiments, biometric templates may be stored in a secure circuit included in the system and may be configured to perform at least a portion of biometric authentication. In other embodiments, biometric authentication may be handled entirely by the mobile device. In other embodiments, authentication of mobile device 160 may be performed without authenticating a user of the mobile device 160, e.g., in order to allow a user to physically lend their mobile device to another user for purposes of system access.

Exemplary Grants to Another Mobile Device

Figure 5:
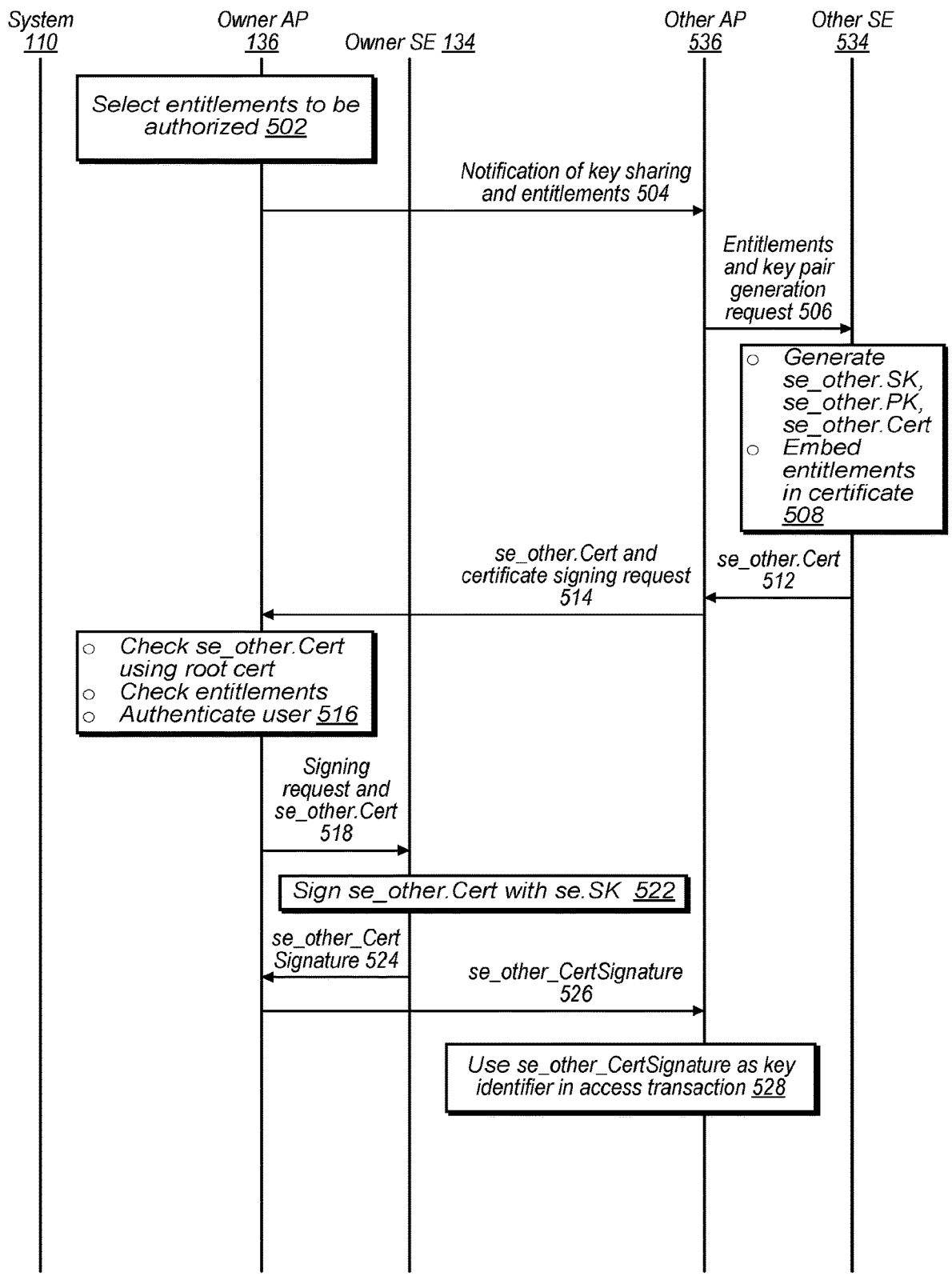
FIG. 5 is a communication diagram illustrating exemplary techniques for authorizing another device, according to some embodiments.

FIG. 5 is a communications diagram illustrating exemplary messages between system 110, application processor 136, and SE 134 for granting authorization to another mobile device 160. Additional embodiments for granting authorization to a sharee device (device with which authorization is being shared) are discussed below with reference to FIG. 15.

In the illustrated embodiment at 502, the AP 136 of the owner of system 110 selects a set of entitlements to be authorized for another mobile device. For example, the owner may restrict the speed limit available to the other mobile device, time of day during which the other mobile device has access to system 110, etc. Note that although the term "owner" is used herein for convenience, the AP 136 and SE 134 may be included in a mobile device of a user that does not actually own system 110, so long as the mobile device has been previously paired with system 110.

In the illustrated embodiment, owner AP 136 sends a notification at 504 that key sharing is desired and information specifying the entitlements to other AP 536 (where other AP 536 and other SE 534 are included in another mobile device 160, in the illustrated embodiment). AP 536 sends the entitlements information and a key pair generation request to SE 534 at 506, which generates a public/private key (pair se_other.SK and se_other.PK) and a corresponding certificate se_other.Cert at 508. In the illustrated embodiment, SE 534 also embeds the entitlements in the certificate (which may prevent unauthorized changes to the entitlements). SE 534 then sends the se_other.Cert back to AP 536 at 512 which forwards it at 514, with a signing request, to AP 136.

In the illustrated embodiment at 516, AP 136 checks se_other.Cert using a root certificate (e.g., from a phone manufacturer of mobile device 160), checks the entitlements (e.g., to ensure that they have not changed), and authenticates the user. Authentication may include biometric authentication, a PIN, a username/password combination, etc. AP 136 then sends a signing request and se_other.Cert to SE 134 at 518, which signs the certificate with se.SK at 522 and returns the signed certificate se_other.CertSignature to AP 136 at 524. The communications between the mobile devices may be performed locally (e.g., via a direct wireless connection such as NFC or Bluetooth) or via a network. Speaking generally, various communications between devices discussed herein may be performed remotely or in close proximity via a local direct wireless connection, for example.

In the illustrated embodiment, AP 136 sends the signature to AP 536 at 526, which then uses the signature as a key identifier in an access transaction with system 110 at 528. System 110 may check the entitlements in the signature to enforce the entitlements. Transactions by mobile device 160 may be performed similarly to the transaction of FIG. 4, for example. In this manner, the user of mobile device 130 may securely authorize mobile device 160 to perform a specified set of operations using system 110. This may be used to allow friends, family members, renters, etc. to access system 110. In ride-sharing contexts, mobile device 160 may be an individual or entity that rents or shares access to system 110.

In some embodiments, key sharing may be delegated to a third party such as a management company for a sharing network. In this scenario, a server may generate a key pair (instead of being generated by mobile device's 160, for example) such that the owner device can verify the origin of the public key using a root certificate of the sharing network. The management company may be provided with the following entitlements, for example: open door, start engine, add/remove friend public keys to/from the system 110, and an expiration date.

Further, in some embodiments, mobile device 130 is configured to revoke specific keys for other mobile device(s) in response to user input. In these embodiments, system 110 may remove the corresponding certificate or mark it as revoked (such that the certificate may be later re-enabled if desired). Once revoked, if the other mobile device attempts to command the system 110 to perform an operation, the transaction will not be accepted. In some embodiments, when an owner mobile device is unpaired from system 110, system 110 is also configured to revoke any friend keys that have been authorized.

In some embodiments, entitlements for authorized friends may include, without limitation: open door, start engine, remove public key from system, a key expiration day, a speed limit, a location limit, a time limit, etc.

In some embodiments, another party such as a system manufacturer may desire input regarding what operations are allowed by a system (e.g., adding new keys or new owner pairing). This may enable the manufacturer to better track ownership changes for warranty purposes, for example. In these embodiments, in addition to signatures performed by a user's device for certain operations, a signature from the other party's server may also be requested by system 110 before performing certain operations.

In various disclosed embodiments, pairing and key sharing may be performed offline (e.g., when the system is not connected to a wide-area network). Private keys may never leave the secure element or SEP embedded in a mobile device, which may prevent tampering. Further, the disclosed techniques may reduce the number of exchanges needed for access transactions relative to conventional techniques. The disclosed techniques may provide security even over an untrusted channel. Also, the disclosed techniques may provide protection against both active and passive eavesdroppers.

The following table provides non-limiting exemplary cryptography algorithms that may be used for various operations disclosed herein, according to some embodiments:

| | |
|---|---|
| Ephemeral key pair generation on system (system.ePK, system.eSK) | ECC on NIST P-256 (may have support for compact or compressed representation) |
| Ephemeral key pair generation on phone (phone.ePK, phone.eSK) | |
| Long term key pair generation on system (system.PK, system.SK) | |
| Long term key pair generation on phone (phone.PK, phone.SK) | |
| Long term key pair generation on SE (se.PK, se.SK) | |
| Symmetric session keys (KENC. KMAC) | AES 256 GCM AES 256 CCM AES 128 GCM AES 128 CCM |
| KDF Key Derivation Function | SHA 256 AES 256 CBC |
| Symmetric session key generation | ECKA as defined in TR-03111, X9.63 KDF |
| PAKE for owner pairing | SRP |
| Immobilizer Token Sharing | ECIES with NIST P-256 |
| DH Diffie-Hellman | ECDH on NIST P-256 |
| Displayable text derivation for pairing | SHA-512 over shared secret |

Exemplary Online Operations

Various embodiments described above may be performed offline (e.g., without a wide area network connection) between devices that are near each other. In some embodiments, a system manufacturer may also allow communication over a wide area network (e.g., the Internet) for execution of remote operations. In some embodiments, the manufacturer or some other entity may act as a proxy to provide network access, such that the system is not directly exposed to the network. The entity may require system authentication to the entity's server. Online techniques are discussed below for adding friend keys to a system (friend keys may also be referred to herein as sharee keys and the term "friend" is used for convenience but not intended to imply any particular relationship between the sharee/friend and the owner). In other embodiments, similar online techniques may be used for any of the various other operations discussed herein, among others.

In some embodiments, public keys stored in control unit 137 are synchronized with the server, e.g., on a best effort basis. For example, each time a new owner is paired and each time a new friend key is added, system 110 may be configured to attempt to synchronize its stored public keys with the server. In some embodiments, system 110 is configured to provide a non-secret unique identifier and uniform resource identifier (URI) to be used as a way to reach system 110 over the internet. This may allow mobile device 130 to establish a secure session with the server (e.g., using a protocol such as transport layer security (TLS) to allow device 130 to authenticate the server). Once the session is established, device 130 may use SE 134 to sign challenges provided by system 110 and/or commands to be executed by system 110. The server may act as a proxy to check packet formatting and signatures before transmitting requests to system 110. The server may also provide firewall-type protection against denial of service attacks or ill-formatted packets. In some embodiments, server authentication of device 130 may include client authentication after device 130 successfully signs a server challenge with a valid key.

In some embodiments, an entity such as a system manufacturer may desire supervision of various operations descried herein, such as issuance of new keys or owner pairing, for example. In these embodiments, in addition to a signature provided by an owner device or friend device, system 110 may also require a signature from the entity's server(s) before performing specific operations. This supervision may prevent these operations from being performed offline, however.

For example, the server may be notified by mobile device 130, device 160, and/or system 110 that a new key has been issued, such that at least one of the parties involved needs to be online (connected with the server) to retrieve the server signature. If none of the devices involved are able to reach the server, system 110 may allow a new key to be used with limited functionality until a signature can be retrieved from the entity, in these embodiments. For example, a new friend user may be allowed to access the system, but only drive it up to a threshold speed and within a threshold distance of a specified location until the online authorization has been completed. In some embodiments, the server is configured to remotely disable requirements for the server signature, e.g., if the server becomes unavailable.

Figure 6A:
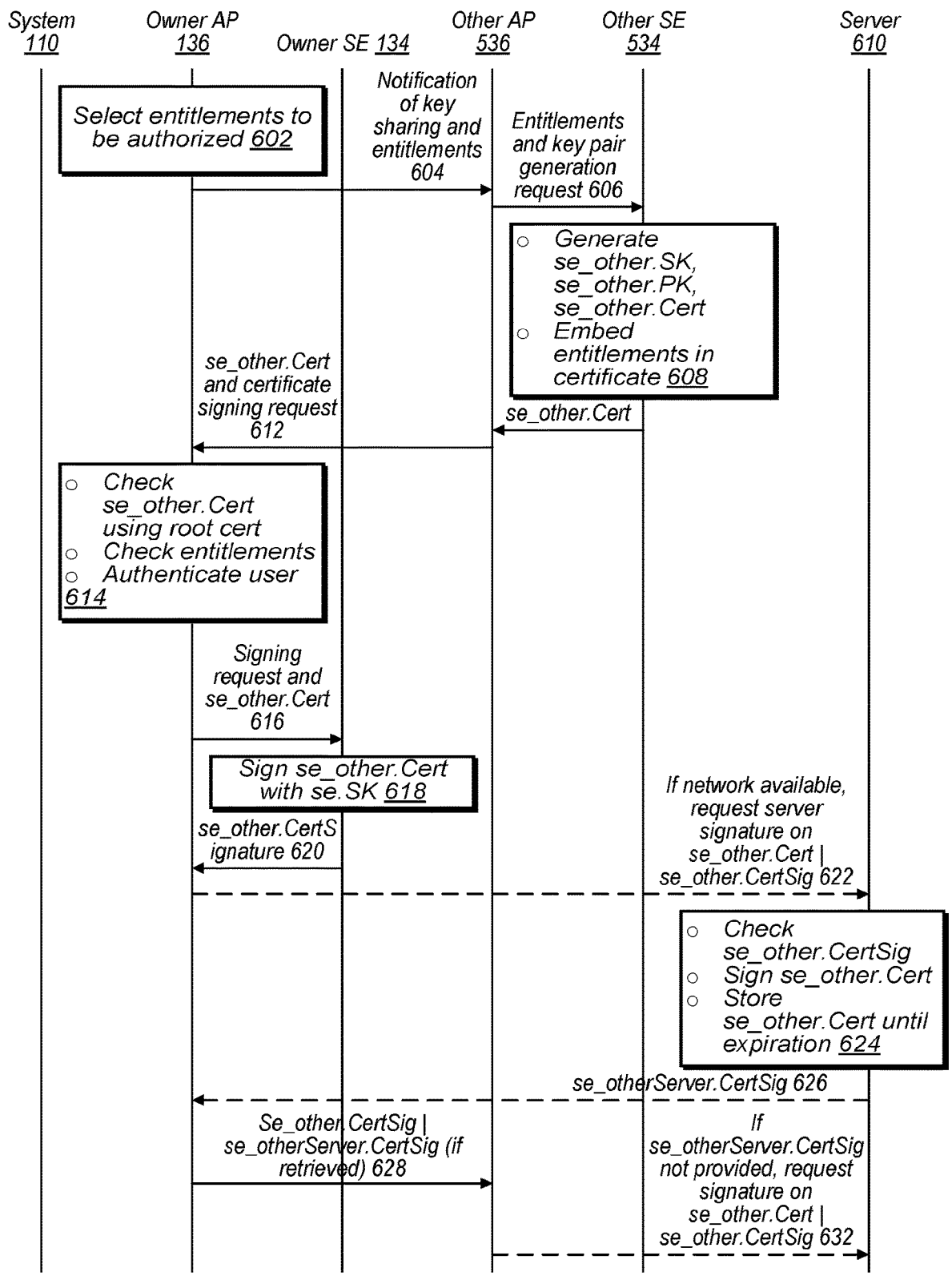
FIGS. 6A-6B make up a communication diagram illustrating exemplary techniques for server-based authorization of another device, according to some embodiments.
Figure 6B:
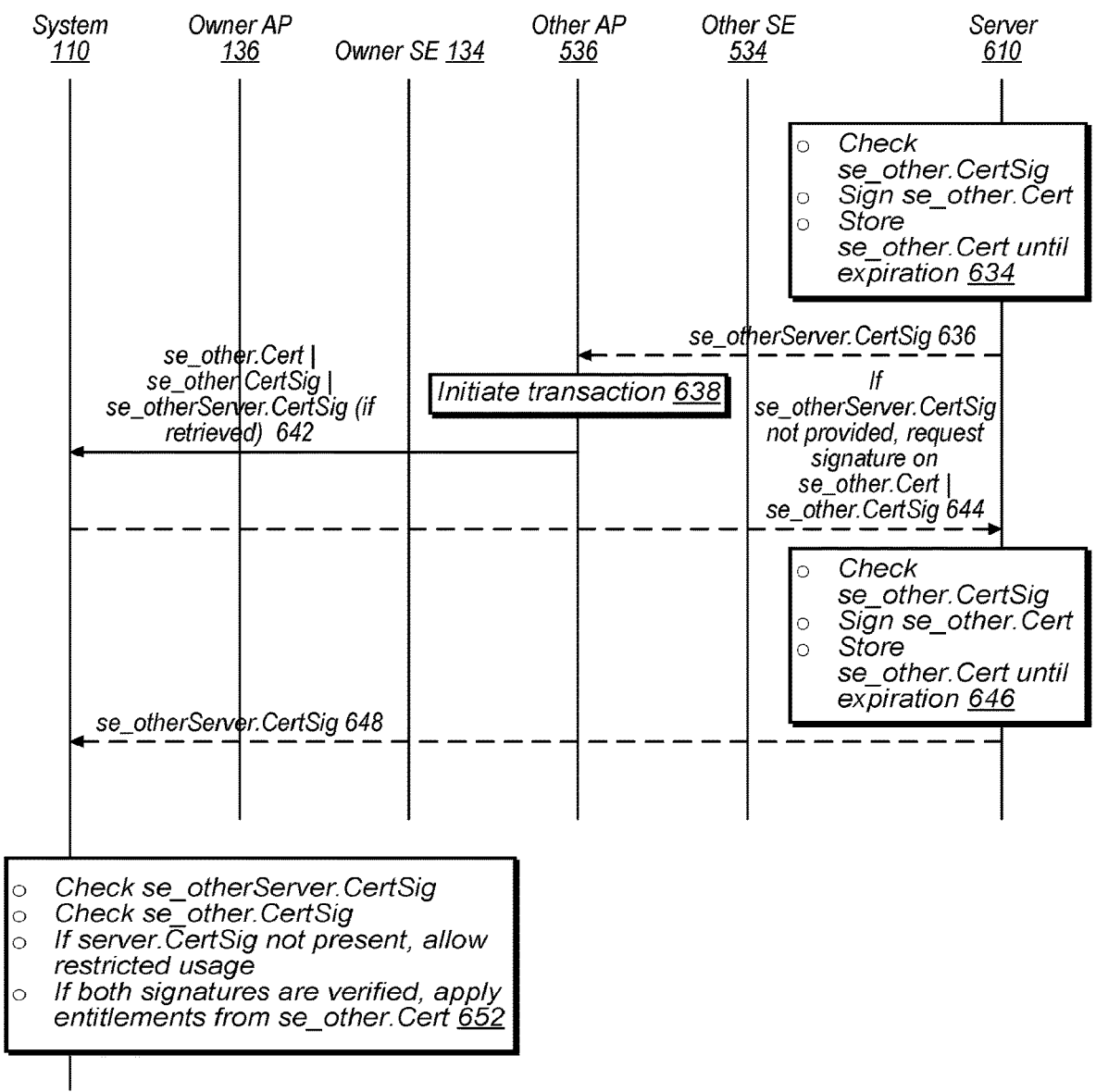

FIGS. 6A-6B illustrate exemplary communications with involvement of a server 610, according to some embodiments. Note that FIG. 6B is a continuation of the communications in FIG. 6A.

In the illustrated embodiment, communications proceed as described above with reference to FIG. 5 until AP 136 receives se_other.CertSignature at 620. At that point, in the illustrated embodiment, AP 136 requests server signature of se_other.Cert and se_other.CertSignature if a network connection (e.g., via the Internet) to server 610 is available at 622. If so, server 610 checks se_other.CertSignature and signs se_other.Cert if se_other.CertSignature is valid at 624. Server 610 also stores se_other.Cert until an expiration time, in the illustrated embodiment. Server 610 then sends se_otherServer.CertSignature to AP 136 at 626.

AP 136, in the illustrated embodiment, sends se_other.CertSignature and se_otherServer.CertSignature to the other AP 536 (if the server signature was received; otherwise AP 136 sends the first signature without the server signature) at 628. If se_otherServer.CertSignature is not provided, AP 536 is configured to request a signature from the server 610 in the illustrated embodiment at 632.

Turning now to FIG. 6B, server 610 may handle the request from AP 536 similarly to the request from AP 136 at 634. AP 536, in the illustrated embodiment, then initiates a transaction with system 110 at 638 and sends the se_other.Cert, se_other.CertSignature, and se_otherServerCertSignature (if the server signature has been received, otherwise it may be omitted).

System 110, in the illustrated embodiment, requests a server signature at 644 if it has not been received and receives a response from server 610 at 648 if a connection is available. System 110 then checks se_otherServer.CertSignature if present and also checks se_otherCertSignature at 652. If both signatures are verified, system 110 is configured to apply entitlements for se_other.Cert for the transaction. If the server signature was not obtained, system 110 may be configured to allow a more restricted set of entitlements for the transaction (or may deny the transaction altogether).

Although each device involved in the transaction in the example of FIGS. 6A-6B is configured to request signatures from server 610, this may not be the case in other embodiments. Further, similar techniques may be used by other devices to request server signatures. In various embodiments, the disclosed techniques may allow server 610 to supervise transactions with system 110 in a secure manner.

In some embodiments, large-scale pairing may allow an entity to manage a fleet of systems. For example, owner keys may be generated on the entity's server(s) and public keys may be stored individually in system processors (e.g., ECUs) during manufacturing. In some embodiments, the same public key may be pushed to all systems and subsequently transferred using the ownership transfer techniques described herein.

A system manufacturer may provision root certificates in system processors (e.g., ECUs) during production. The manufacturer may also push new certificates after production, e.g., in order to support other phone manufacturers. These certificates may include root certificates for: secure element manufacturers, phone manufacturers, and/or system manufacturers.

Exemplary Methods

Figure 7A:
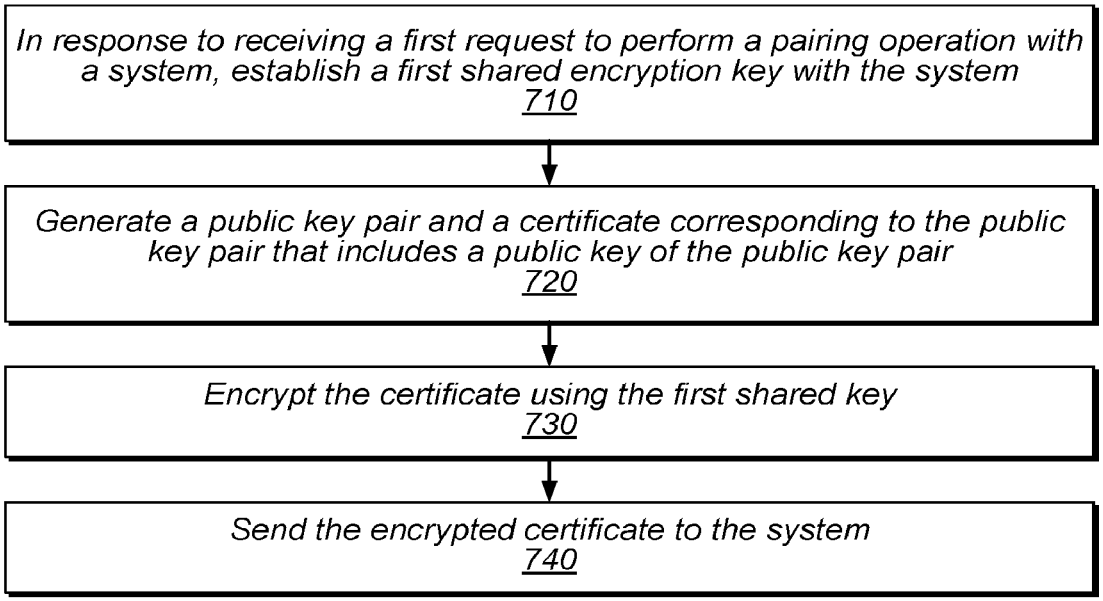
FIGS. 7A-7B are flow diagrams illustrating exemplary methods for pairing a mobile device and processing element of a system, according to some embodiments.

FIG. 7A is a flow diagram illustrating a method for pairing with a system, by a mobile device, according to some embodiments. The method shown in FIG. 7A may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, in response to receiving a first request to perform a pairing operation with a system, a mobile device establishes a first shared encryption key with the system. This may include establishing an ephemeral key pair and deriving a shared secret based on the ephemeral key pair. Deriving the shared secret may use ECDH or some other asymmetric encryption technique. The request to perform the pairing operation may be received from the system or from a user (e.g., via an input component). Note that various embodiments are described herein with reference to a vehicle and a mobile phone phone. These devices are included for purposes of illustration but are not intended to limit the scope of the present disclosure. In various embodiments, the disclosed techniques may be used for mutual authentication between two or more of various types of devices. For example, similar techniques may be used to authenticate devices with paired wearable devices, distributed sensors, internet of things devices, etc.

At 720, in the illustrated embodiment, a secure circuit (e.g., SE 134 or SEP 210) generates a public key pair and a certificate (e.g., se.Cert) corresponding to the public key pair that includes a public key of the public key pair. In some embodiments, this is performed by a secure circuit.

At 730, in the illustrated embodiment, the mobile device encrypts the certificate using the first shared key.

At 740, in the illustrated embodiment, the mobile device sends the encrypted certificate to the system. This may end the pairing process from the mobile device side. In other embodiments, the mobile device may receive an indication of successful pairing.

In some embodiments, the mobile device is configured to display a value generated based on the public key pair and request a user of the mobile device to confirm that the system also displays the value. This may avoid unintended or malicious pairing, in some embodiments.

In some embodiments, in response to a second request to permit another mobile device to access the system, the mobile device signs, using a private key of the public key pair, a certificate for another public key pair generated by a secure circuit of the other mobile device. In some embodiments, the mobile device requests, via a wide area network, a server signature of the certificate signed by the secure circuit and the server signature is usable by the system to determine whether to grant an operation requested by the other mobile device.

In some embodiments, the mobile device indicates whether the mobile device is allowed to ones of a set of entitlements specified by a user of the mobile device.

Figure 7B:
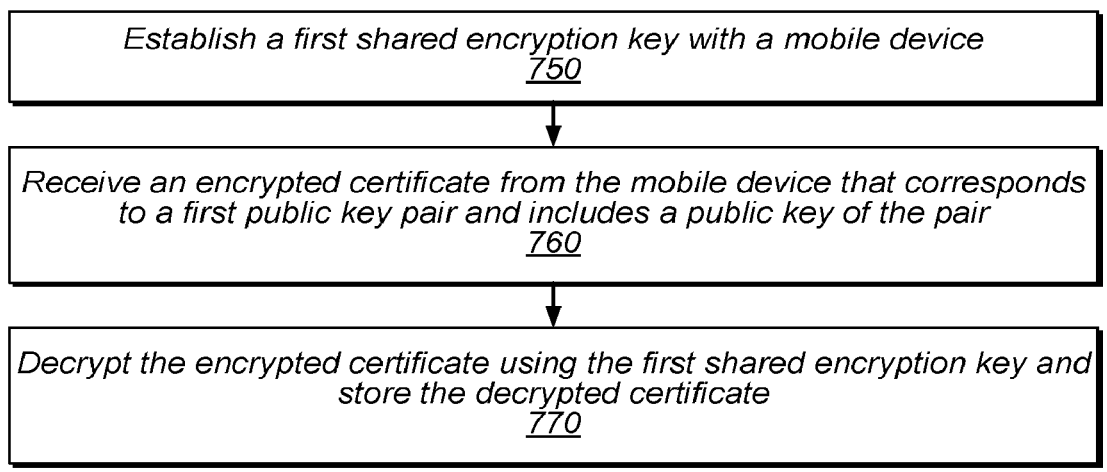

FIG. 7B is a flow diagram illustrating a method for pairing with a mobile device, by a system, according to some embodiments. The method shown in FIG. 7B may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 750, in the illustrated embodiment, a processing element of the system establishes a first shared encryption key with a mobile device (which may be, e.g., the key of element 710 of FIG. 7A).

At 760, in the illustrated embodiment, the processing element of the system receives an encrypted certificate from the mobile device that corresponds to a first public key pair and includes a public key of the pair. The public key pair may be generated by a secure circuit of the mobile device, for example.

At 770, in the illustrated embodiment, the processing element of the system decrypts the encrypted certificate using the first shared encryption key and stores the decrypted certificate.

Figure 8A:
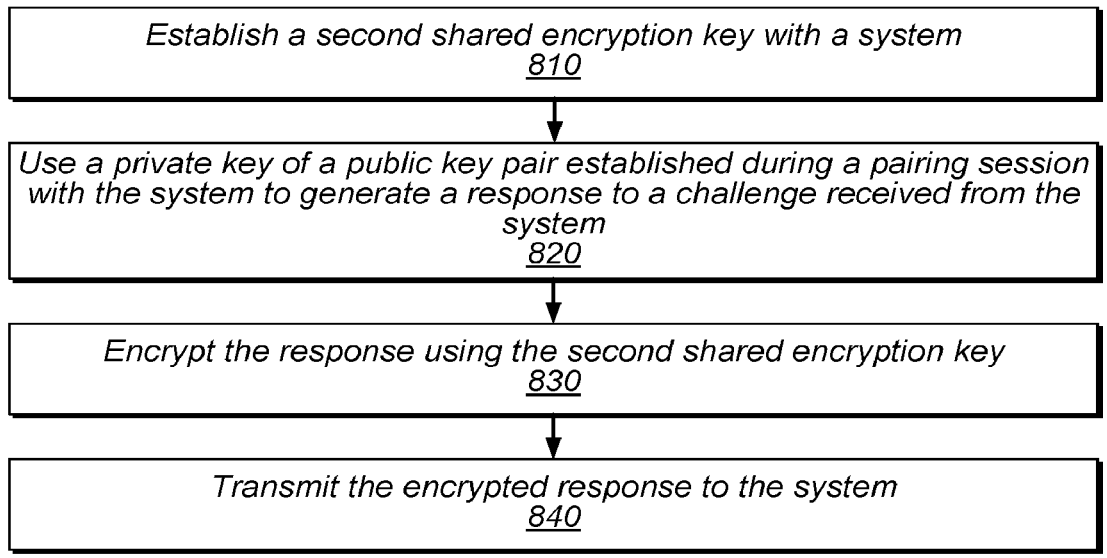
FIGS. 8A-8B are flow diagrams illustrating exemplary methods for authenticating a mobile device to authorize one or more operations by the system, according to some embodiments.

FIG. 8A is a flow diagram illustrating a method for authentication, by a mobile device, according to some embodiments. The method shown in FIG. 8A may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 810, in the illustrated embodiment, the mobile device establishes a second shared encryption key with a system (which may be different than a first shared encryption key used for pairing, for example). This may be performed based on a communication from the system, based on detecting proximity of the system, etc. This may include use of an ephemeral key pair and ECDH, for example.

At 820, in the illustrated embodiment, the mobile device receives a challenge from the system and uses a private key (e.g., se.SK) of a public key pair established during a pairing session with the system to generate a response to a challenge received from the system. For example, a secure circuit may sign the challenge using the secret key.

At 830, in the illustrated embodiment, the mobile device encrypts the response using the second shared encryption key.

At 840, in the illustrated embodiment, the mobile device transmits the encrypted response to the system.

Figure 8B:
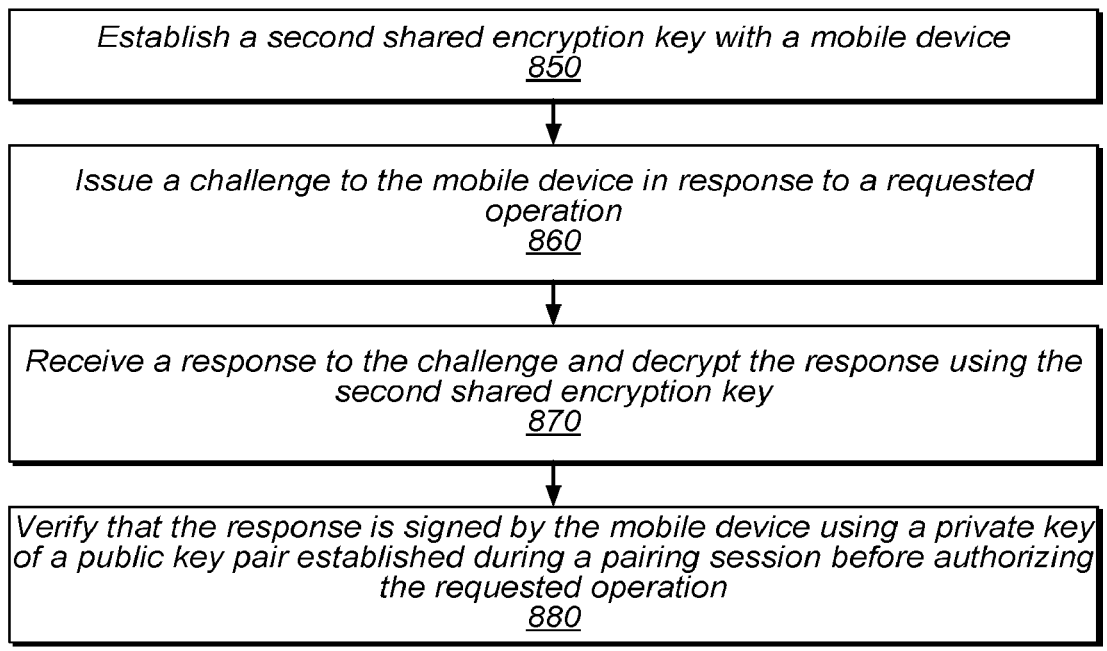

FIG. 8B is a flow diagram illustrating a method for authenticating a mobile device, by a system, according to some embodiments. The method shown in FIG. 8B may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 850, in the illustrated embodiment, a processing element of a system establishes a second shared encryption key with a mobile device (e.g., the key of element 810 of FIG. 8A).

At 860, in the illustrated embodiment, the processing element issues a challenge to the mobile device in response to a requested operation. The operation may be automatically requested by the mobile device (e.g., based on proximity to the system), based on use input to the mobile device, based on information received from the system, etc. The challenge may be included in an operation dictionary, for example. The challenge may be encrypted using the shared encryption key. In some embodiments, information indicating a requested operation is included in the challenge, which may enable the mobile device to confirm whether the requested operation is actually desired.

At 870, in the illustrated embodiment, the processing element receives a response to the challenge and decrypts the response using the second shared encryption key.

At 880, in the illustrated embodiment, the processing element verifies that the response is signed by the mobile device using a private key of a public key pair established during a pairing session before authorizing the requested operation. For example, the processing element may use se.PK to verify that the response was signed using se.SK. In some embodiments, the processing element denies a requested operation if one or more elements of FIG. 8B fail (e.g., a shared encryption key is not successfully established, the response to the challenge is incorrect, the response to the challenge is not appropriately signed, etc.

Exemplary Multi-Transaction-Type Embodiments

Figure 9A:
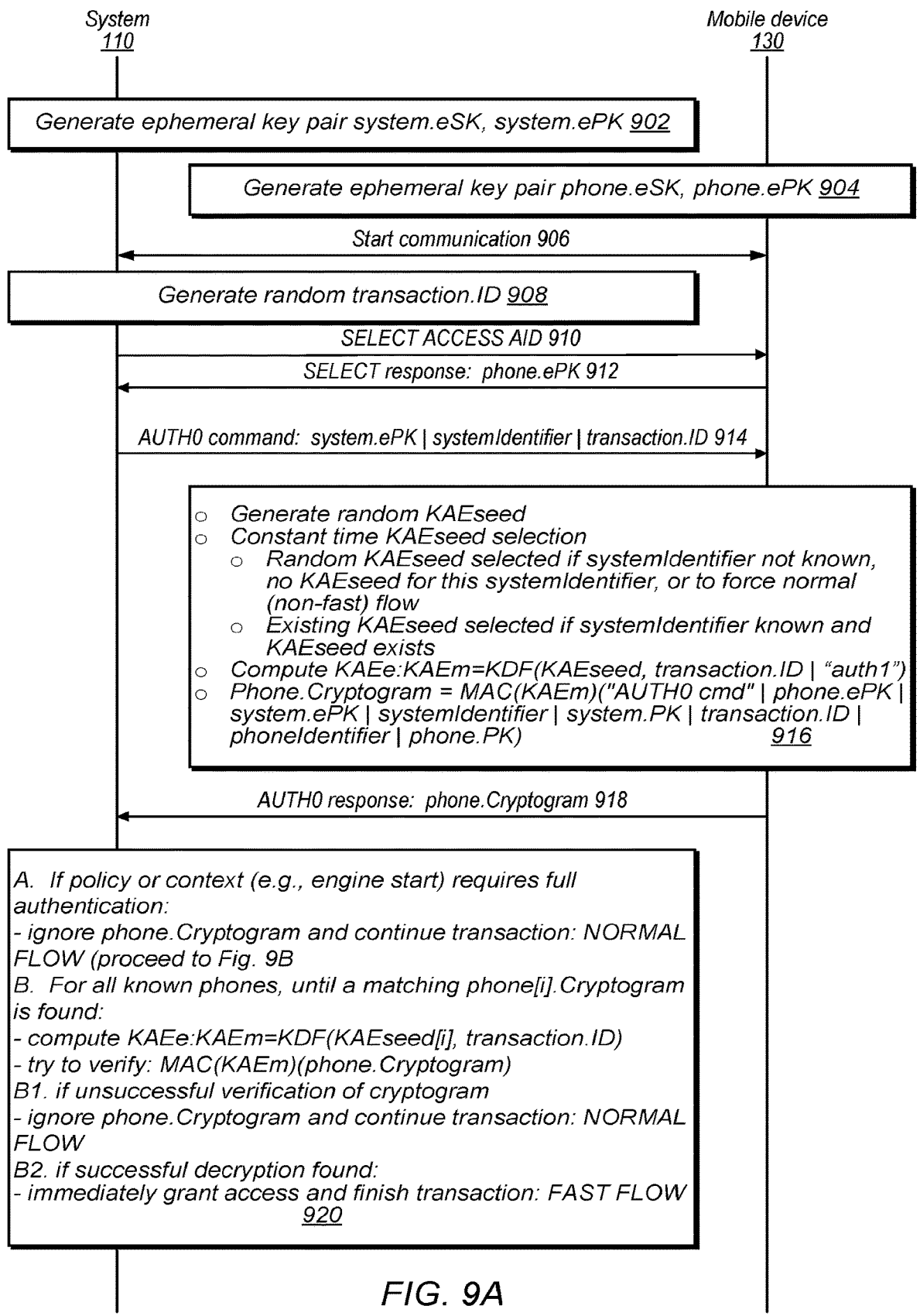
FIGS. 9A-9C make up a communication diagram illustrating exemplary techniques for authorizing an operation with multiple transaction types, according to some embodiments.
Figure 9B:
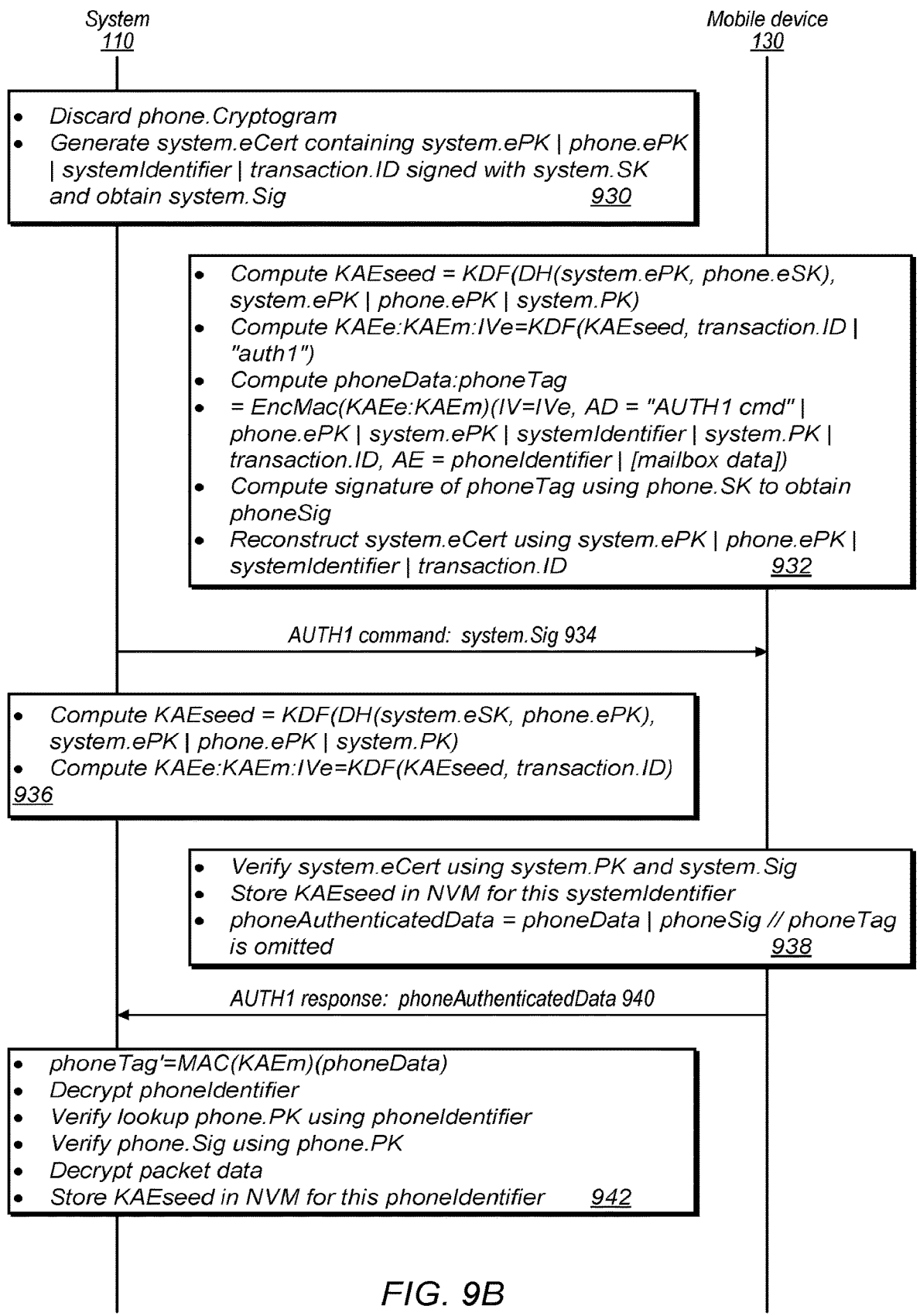
Figure 9C:
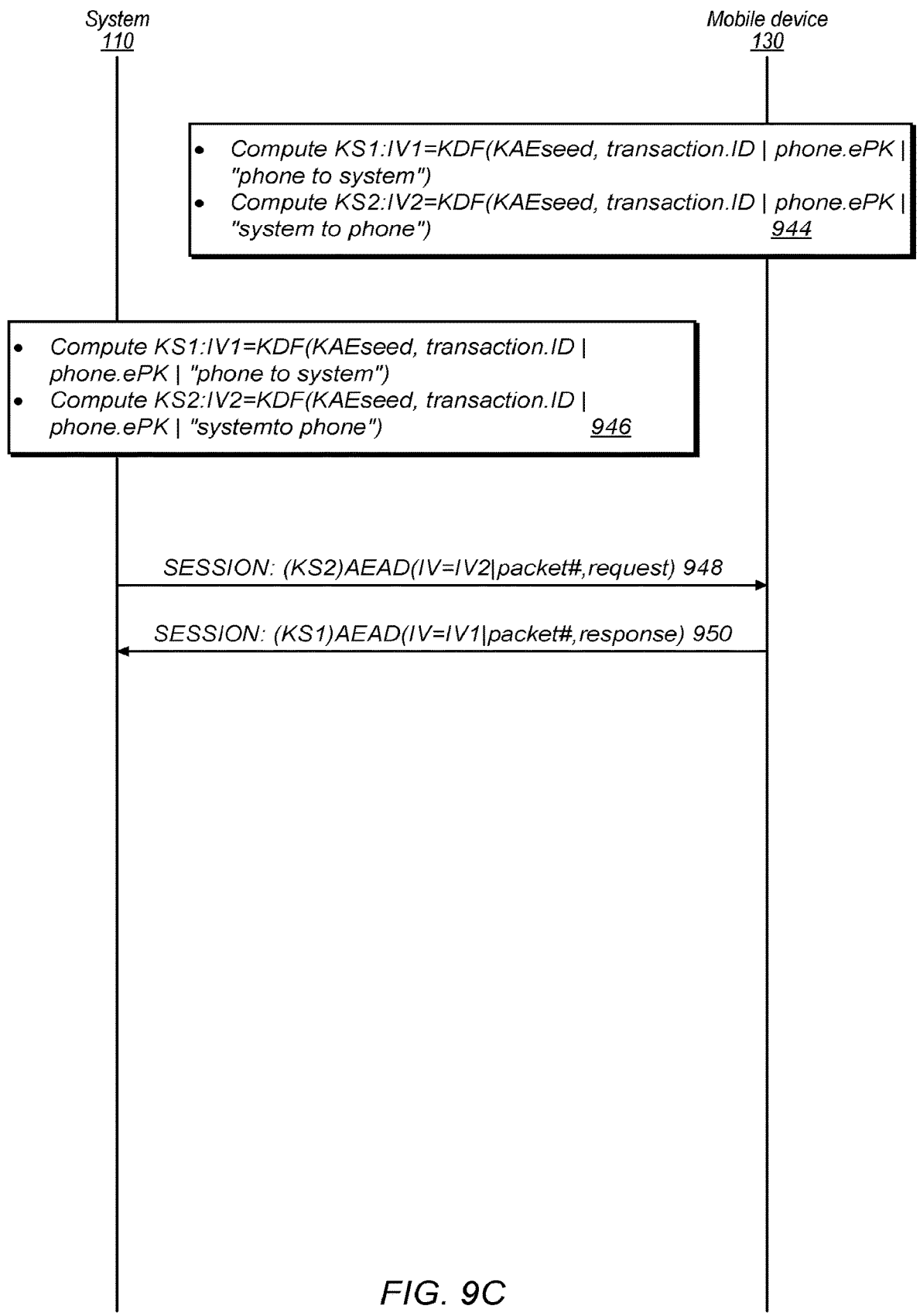

In some embodiments, multiple types of authentication transactions are supported. FIGS. 9A-9C are communication diagrams that illustrate an exemplary transaction flow with two types of transactions (which may be referred to herein as "standard" and "fast" transactions). In some embodiments, a standard transaction does not involve a pre-established symmetric key, but may be used to generate such a key that is stored and available for use in one or more subsequent fast symmetric transactions. Note that FIGS. 9B and 9C are continuations of the communications initiated in FIG. 9A.

In FIG. 9A, system 110 and mobile device 130 generate respective ephemeral key pairs and begin communications at elements 902-906. Note that the ephemeral key pairs may be generated before and/or after beginning communications. Because this process takes time, it may be desirable to generate keys before a transaction begins in order to reduce user-visible transaction time, in various embodiments. Beginning communications may include the system 110 using NFC anti-collision with ECP, for example, to initiate communications. At 908 system 110 then generates a random (or pseudo-random) transaction.ID for the current transaction and sends a message 910 (in the illustrated embodiment, this is a SELECT ACCESS message, but various types of messages may be used in other embodiments). In some embodiments, this message indicates an applet ID of an applet executable on mobile device 130 (e.g., by SE 134) to perform the transaction.

The following terms and notations may be used herein:

AP, in some embodiments, is an application processor, e.g., of a mobile device.

CASD, in some embodiments, is a Controlling Authority Security Domain and certificates stored in it may be referred to as "SE certificates."

DoS refers to denial of service.

ECP refers to enhanced contactless polling

HCI refers to host communications interface

IVe, in some embodiments, is an initial vector for symmetric cryptography. This vector may change in every transaction, e.g., due to varying transaction.ID.

KAEseed, in some embodiments, is a symmetric long-term key that is used to derive encryption and MAC session keys. It may be stored in NVM on both sides and may be used as root key for the Fast transactions. Its lifetime may be determined by a security policy implemented on system side (e.g. 10 transactions maximum until renewal, renewal always at engine start, etc.).

KAEe, in some embodiments, is a derived symmetric key used to encrypt phoneIdentifier and confidential payloads.

KAEm, in some embodiments, is a derived symmetric key used to calculate phoneTag.

KDF, in some embodiments, is a key derivation function. In various embodiments, different derivation constants may be used for derivations from the same input secret.

KTS, in some embodiments, is a key tracking server.

LPM refers to a low power mode.

PAKE refers to password authenticated key exchange.

phone.Cryptogram, in some embodiments, is a MAC value calculated over unique, public transaction data. It may show that the device is in possession of the same symmetric key as the system. It is used in the Fast transaction only, in some embodiments.

system.Sig, in some embodiments, is used to show that the system is in possession of system.SK. It may be signed over both ephemeral keys, system Identifier, and transaction.ID.

DH, in some embodiments, is a Diffie-Hellman key exchange function.

transaction.ID, in some embodiments, is a unique identifier of the transaction which is used as a variable element on both sides for symmetric key derivation and MAC/signature generation.

systemIdentifier, in some embodiments, is a unique identifier of the system. For NFC transactions it may be protected by the reach of the RF field. For BT transactions, it may rely on the privacy protection of the BT channel. On device side it may be used to determine the long term public key of the system.

phoneIdentifier, in some embodiments, is a unique identifier of the device. In some embodiments, it is protected for privacy during the transaction by sending it in a secure channel after the phone has verified the system identity. It may be used on system side to select the device public key to verify the signature transaction.Type reader-determined value that indicates which flow shall be taken, fast or standard/full.

transaction.Type, in some embodiments, is a reader-determined value that indicates which flow shall be taken, e.g., fast or standard/full (among other possible types of transactions).

phoneData, in some embodiments, is an encrypted phone identifier and optional mailbox data.

phoneTag, in some embodiments, is a MAC calculated over transaction relevant data.

phoneAuthenticatedData, in some embodiments, is a includes phone identifier and phone signature.

The notation KAEe:KAEm:IVe=KDF( . . . ) means that all three values are derived from the same KDF using different derivation constants. The constants are not specified in the present document.

The notation phoneData:phoneTag=EncMac(KAEe: KAEm)(IV=IVe, AD= . . . , AE= . . . ) means that phoneData is the data AE encrypted with KAEe and phoneTag is the MAC value over AD using KAEm.

At 912, in the illustrated embodiment, mobile device 130 executes the indicated applet to send a SELECT response with the ephemeral phone public key phone.ePK. In some embodiments, system 110 may use a BUS-S1 transfer to send the phone.ePK to a processor configured to perform the disclosed operations. In various embodiments, system 110 may include one or more NFC devices (e.g., in door handles, near an ignition, etc.) that may operate as secure element readers and may communicate with one or more processors configured to perform cryptographic operations. The buses used for these communications may be relatively slow, in some embodiments, so fast transaction techniques may reduce the amount of data transmitted on these buses, relative to standard transaction techniques.

At 914, system 110 then sends an AUTH0 command that includes the system public key system.ePK a "system Identifier" value (which may be unique to system 110) and the transaction ID. The AUTH0 command may also indicate which type of transaction should be executed, e.g., standard or fast. In response, the mobile device 130 generates a random shared secret KAEseed or selects a previously-negotiated KAEseed for the transaction. In some embodiments, the generation/selection is performed using a constant time interval to avoid conveying information about the system identifier (e.g., to avoid indicating whether the system identifier is already known to the device). In the illustrated embodiment, an existing KAEseed may be selected if the system Identifier is known and a corresponding KAEseed exists. This may be used for fast-path transactions, as discussed in further detail below. Otherwise, the generated random KAEseed may be selected.

At 916 mobile device 130, in the illustrated embodiment, then computes KAEe and KAEm using the same KDF using the selected KAEseed, the transaction.id, and a string "auth1" (note that this string is used for purposes of illustration, but any of various values known to both sides may be implemented in various embodiments). (Note that mobile device 130 may not generate the KAEe for fast transaction types). Mobile device 130 further determines phone.Cryptogram as the MAC(KAEm) of ("AUTH0 cmd" |phone.ePK|system.ePK|systemIdentifier|system.PK|transaction.ID|phoneIdentifier|phone.PK) and sends AUTH0 response with the phone.Cryptogram. The phone.Cryptogram may involve another bus transfer BUS-S2 by system 110. In some embodiments, mobile device does not compute KAE values or generate a cryptogram for standard transactions.

At 920, based on the AUTH0 response, system 110 may proceed differently for standard and fast techniques. For standard techniques (e.g., if a policy or context requires standard authentication or if phone.Cryptogram cannot be verified), system 110 ignores phone.Cryptogram (or simply receives an acknowledgment message with no cryptogram) and proceeds to the elements of FIG. 9B. For the fast technique, system 110 searches through known phones until a matching phone.Cryptogram is found. System 110 then computes KAEm (and KAEe for standard transactions) as a KDF of the pre-negotiated seed for that mobile device (KAEseed[i], e.g., from a prior standard transaction) and the transaction.ID. This technique of searching through known mobile devices may avoid publishing an identifier of the mobile device 130, which may increase privacy and avoid tracking of mobile device 130, for example. Speaking generally, the disclosed techniques may avoid release of a public key certificate, public key hash, or other key/device unique identifiers that might be used to track a device.

System 110 then attempts to verify the phone.Cryptogram MAC and may immediately authenticate and authorize a requested action in response to successful verification (this may end a fast transaction). If verification of phone.Cryptogram is unsuccessful, standard transaction techniques may proceed.

Turning now to FIG. 9B, at 930 system 110 discards phone.Cryptogram (because this is not a fast transaction) and generates a system.eCert containing system.ePK, phone.ePK, system Identifier, and the transaction.ID that is signed with system.SK to generate system.Sig. System 110, in the illustrated embodiment, then sends an AUTH1 command 934 that includes system.Sig. This may involve another bus transfer of the system.Sig BUS-S3 by system 110.

System 110, in the illustrated embodiment, then computes a KAEseed using a KDF of a DH key exchange of system.eSK and phone.ePK, system.ePK, phone.ePK, and system.PK. This KAEseed may be stored as a shared symmetric key and used for subsequent fast transactions, in some embodiments. This shared secret may be used indefinitely or may be limited-use (e.g., may expire after a certain time interval or number of uses). Speaking generally, KAEseed is an example of a shared secret calculated using elliptic curve cryptography over ephemeral keys and a KDF that includes a system public key (e.g., system.PK). System 110 then computes a KAEe, KAEm, and IVe using a KDF of the KAEseed and the transaction.ID.

Mobile device 130, in the illustrated embodiment at 932, verifies the system.eCert using the public key system.PK and the received system.Sig. Mobile device 130 then stores the KAEseed in non-volatile memory for the systemIdentifier of system 110. Mobile device 130 then generates phoneAuthenticatedData as the previously-computed phone data and phoneSig if the verification is successful and sends AUTH1 response 940 with the phoneAuthenticatedData. In some embodiments, this may involve another bus transfer of phoneAuthenticatedData by system 110.

System 110, in the illustrated embodiment, then generates phoneTag' at 942 by MACing phoneAuthenticatedData using the KAEm, decrypts the phoneIdentifier, looks up and verifies phone.PK using phoneIdentifier, verifies the phone.Sig using the public key phone.PK, decrypts any packet data, and stores the KAEseed in non-volatile memory for the phoneIdentifier of mobile device 130. Once verification has been successful, system 110 may authorize a requested action such as starting a motor or engine, etc.

In some embodiments, a standard transaction type is required for certain types of actions such as starting an engine or shifting system 110 out of park. In some embodiments, the fast transaction type may be used for NFC readers that have slower buses (e.g., readers located in doors rather than an interior console), relative to other readers in system 110.

Turning now to FIG. 9C, the system 110 and mobile device 130 may compute KS1, KS2, IV1, and IV2 using KDFs of the KAEseed, transaction.ID, phone.ePK, and one or more known values or strings, as shown at 944 and 946. In some embodiments, these values may be used for a session to transfer additional information between system 110 and mobile device 130.

In some embodiments, mobile device 130 includes one or more mailboxes used to store data from system 110. Exemplary mailbox implementations are discussed below with reference to FIG. 18. In some embodiments, a privacy protected mailbox is accessible to AP 136 without encryption while a confidential mailbox is accessible only to system 110 via secure NFC. Speaking generally, the mailbox(es) may be used to store various information, which may be in a format defined by a manufacturer or designer of system 110. In some embodiments, the information may include an immobilizer token. In some embodiments, the information may include settings indicating parameters for performing one or more actions (e.g., comfort settings relating to seat and mirror position, etc.). Thus, the disclosed techniques for mobile device 130 may enable communications with various different types of systems.

In some embodiments, system 110 uses the confidential mailbox to store an immobilization key during pairing with mobile device 130. Before performing certain actions (such as starting an engine, for example), system 110 may retrieve and validate one or more immobilization keys from the confidential mailbox. System 110 may discard the keys as soon as they are used to authorize the requested action.

In some embodiments, the private mailbox is used to store user settings, e.g., for third party applications, diagnostics, commands, wireless pairing information, etc. The private mailbox supports random access, in some embodiments.

In some embodiments, the KAEseed may also be used as a symmetric key for ultra-wideband (UWB) communications. These communications may utilize time-of-flight to verify the proximity of mobile device 130 and system 110. The shared secret techniques discussed herein may be used to authenticate that such communications are actually being performed with an authorized device.

In some embodiments, the validity of keys shared with other mobile devices is managed through a generation counter that is incremented automatically when system 110 receives a full access list (although the counter may remain unchanged when an incremental addition to the list is performed, e.g., that allows existing entries to remain valid). The counter may be monotonic and sized to avoid rollover. In these embodiments, any previous or pending request signed with a generation counter lower than the value of the counter may be rejected by system 110. This may avoid users accidentally leaving friend's mobile devices with access to system 110 when the user had intended for their access to expire.

Exemplary Standard Transaction with KDF

Figure 10:
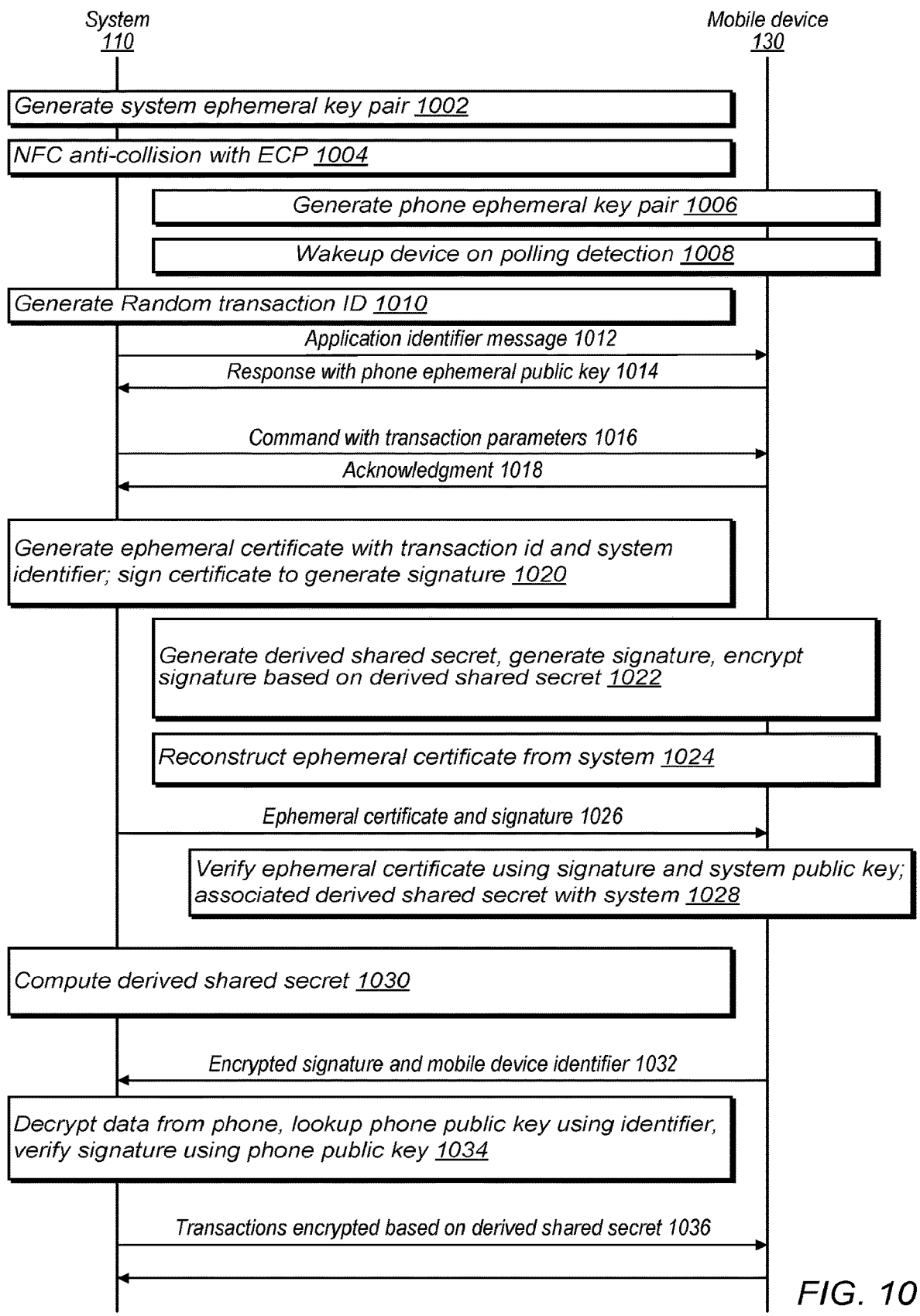
FIG. 10 is a communication diagram illustrating exemplary techniques for authorizing an operation with a standard transaction type, according to some embodiments.

FIG. 10 illustrates an asymmetric transaction, according to some embodiments. In some embodiments, the shared secret (e.g., the KAEseed discussed below) established during such a transaction may be saved by the devices for subsequent fast-path (e.g., symmetric) techniques. In some embodiments, the techniques shown in FIG. 10 are similar to those shown in 9A-9C, but focusing only on the standard technique (and omitting details relating to the fast-path technique). In some embodiments, the asymmetric cryptography provides relatively stronger authentication and forward secrecy while the fast transaction may provide increased performance (e.g., when processing resources are limited). In some embodiments, the standard transaction is always used for the first time a friend device (also referred to herein as a "sharee") contacts system 110 for the first time. The standard transaction may be forced by the mobile device 130 (e.g., for first contact or an unknown system) or by the system 110 (e.g., when a symmetric key is not established) even when a fast transaction is requested.

Speaking generally, in the illustrated embodiment, ephemeral key pairs and previously-determined long-term keys (from pairing) are used to negotiate a shared secret (KAEseed). The shared secret is used by the mobile device to generate a signature (signed using the long-term secret key) and the signature is encrypted along with other phone data such as the phone ID. The mobile device sends the data to the system after verifying a signed certificate from the system. The system verifies the phone data, decrypts it, looks up the phone.PK using the phone ID, and then verifies the signature using the phone.PK. In the illustrated embodiment, the system and mobile device then use the values established during the standard transaction to transfer mailbox data, which may be used for various communications and purposes.

Even more generally, FIG. 10 involves the system generating authentication material, sending the material to the mobile device 130 which authenticates the material, creates a private channel, and generates endpoint authentication material. The system 110 then authenticates the mobile device and may create a secure channel. The authentication may be used to authorize one or more actions and the private and/or secure channels may be used to exchange various types of information. The disclosed techniques may allow authentication of the system 110 before the mobile device 130 provides any identifying information and may also provide encryption for identifying information for mobile device 130 using the secure channel.

More specifically, at 1002, in the illustrated embodiment, system 110 generates a system ephemeral key pair (e.g., system.eSK and system.ePK). At 1004, system 110 performs NFC anti-collision with enhanced contactless polling (although other techniques may used in other embodiments). At 1006, mobile device 130 generates a phone ephemeral key pair (e.g., phone.eSK and phone.ePK) and wakes up on polling detection at 1008.

At 1010, in the illustrated embodiment, the system 110 generates a random transaction id and sends an application identifier message 1012 to mobile device 130. For example, the message may be a SELECT ACCESS AID message that indicates an application identifier to select the appropriate application on the mobile device 130. Mobile device 130 responds with the phone ephemeral public key phone.ePK at 1014. In some embodiments, the transaction includes a SELECT command/response, an AUTH0 command/response, an AUTH1 command/response, and optionally one or more SET/GET command/responses (the AUTH and SET/GET messages are discussed in further detail below).

At 1016, in the illustrated embodiment, system 110 sends a command with transaction parameters. This may be referred to as an AUTH0 command, in some embodiments. In some embodiments, this command includes: system.ePK-|systemIdentifier|transaction.ID transaction.type=standard. In other examples, the transaction.type may indicate a fast transaction or some other type of transaction. Therefore, the AUTH0 command may provide system public information (static identifier and random session information) needed by the device to, if applicable, calculate a cryptogram based on the already established symmetric secret for a fast transaction. For the illustrated standard transaction, the response at 1018 may only be an acknowledgement without data.

At 1020, in the illustrated embodiment, system 110 generates an ephemeral certificate with a transaction id and a system identifier and signs the certificate to generate a signature. This may include, for example, generating an ephemeral certificate system.eCert containing system.ePK-|phone.ePK|systemIdentifier|transaction.ID. This may be signed with a secret key from pairing (e.g., system.SK) to obtain a signature system.Sig.

At 1022, in the illustrated embodiment, mobile device 130 generates a derived shared secret, generates a signature, and encrypts the signature based on the derived shared secret. In some embodiments, this includes to generate KAEseed=KDF(DH(system.ePK, phone.eSK), |system-.ePK|phone.ePK|system.PK). In this example, the Diffie Hellman function DH is one example of a key exchange function used to generate a shared secret and the key derivation function KDF generates a derived shared secret based on the output of the key exchange function, and the public keys system.ePK, phone.ePK, and system.PK. In some embodiments, mobile device 130 also defines a diversifier=transaction.identifier|phone.ePK|system.ePK|systemIdentifier|system.PK. In some embodiments, mobile device 130 computes KAEe1:KAEm1:IVe1=KDF (KAEseed, diversifier|"phone to system") and computes KAEe2:KAEm2:IVe2=KDF(KAEseed, diversifier|"system to phone"). These derived symmetric keys may be used to encrypt information identifying the phone and/or confidential payloads, which may increase security of such information.

In some embodiments, mobile device 130 generates the signature phone.Sig=Sign(phone.SK, transaction.Identifier|phone.ePK|system.ePK). In some embodiments, mobile device 130 computes phone.Data:phone.Tag=EncryptMac (KAEeL:KAEmL:IVe1: counter=0) (phone.Identifier|phone.Sig|[mailbox data]).

At 1024, in the illustrated embodiment, mobile device 130 reconstructs the ephemeral certificate from the system system.eCert using system.ePK|phone.ePK|systemIdentifier|transaction.Identifier. This may facilitate verification of the ephemeral certificate from the system, as discussed below.

At 1026, in the illustrated embodiment, system 110 sends the ephemeral certificate and signature generated at 1020. This message may be referred to as an AUTH1 command. In some embodiments, the system 110 authenticates itself to the device in this message by sending the signature.

At 1028, in the illustrated embodiment, mobile device 130 verifies the ephemeral certificate system.eCert using the signature system.Sig and the system public key system.PK. When the device is able to verify the signature it may associates the new symmetric shared secret KAEseed with the verified identifier of system 110.

In parallel, the system 110 calculates the same symmetric shared secret, in the illustrated embodiment. In particular, at 1030 in the illustrated embodiment, system 110 computes the derived shared secret KAE seed=KDF(DH(system.eSK, phone.ePK), system.ePK|phone.ePK|system.PK). System 110 may also compute KAEeL:KAEm1:IVe1=KDF(KAEseed, diversifier|"phone to system").

At 1032, mobile device 130 sends a response (which may be referred to as an AUTH1 response) with the encrypted signature and mobile device identifier. More specifically, mobile device 130 may send phone.Data and phone.Tag in this message, which may include various pre-calculated encrypted and MACed data, as discussed above.

At 1034, system 110 decrypts data from mobile device 130, looks up a public key of the phone using the identifier, and verifies the signature phone.Sig using the public key. In particular, this may include verifying phone.Tag, decrypting phone.Data, looking up phone.PK using phone.Identifier, verifying phone.Sig using phone.PK, and storing KAEseed in association with phone.Identifier. Thus, when the system 110 is able to validate the device signature (phone.Sig) successfully, it associates the symmetric secret to the device. Additional mailbox data can be decrypted and used on system side.

In various transactions, the device 130 may request the contents of the private and/or confidential mailboxes at the end of the transaction, e.g., using derived keys (KAEm, KAEe) to create a secure channel.

Thus, in the illustrated embodiment, the device 130 calculates the shared secret (KAEseed) using a DH over ephemeral keys, and a KDF including the long term system key system.PK. It also calculates the device signature (phoneSig) using phone.SK. In the meantime the system generates an ephemeral certificate signed by the long-term system key system.SK and transmits its signature to the device. The device, having reconstructed the same ephemeral certificate, verifies the signature and, if successful, stores the shared secret (KAEseed) related to the system identifier. KAEseed may then be used for upcoming Fast transactions, as well as to secure the final payload transfer using derived symmetric keys (KAEe, KAEm). When receiving the AUTH1 response, the system looks up the device's public key to verify the phone signature, using the decrypted phone identifier received as part of the phoneAuthenticatedData. If successful, the system decrypts the optional payload (e.g. immobilizer token) and stores KAEseed for this device in persistent memory. Optionally, derived session keys can then be used to transfer a payload (e.g. the immobilizer token) from the device to the system. In a UWB system, the secure ranging master key (SASK) can be derived from KAEseed.

In some embodiments, a privacy problem solved by this transaction is to prevent the phone from releasing the phoneIdentifier to non-authorized readers. Releasing a public key certificate, a public key hash or any kind of key/device unique identifier could be considered as a potential way to track a device without user's consent. The selection of KAEseed on device side may be implemented in a constant-time design to not disclose any knowledge about whether the systemIdentifier is known by the device to the attacker. In some embodiments, forward secrecy is provided in various transactions discussed herein, e.g., due to the use of ephemeral keys.

In some embodiments, various modification may be made to the transactions of FIG. 10 to increase performance. For example, compact or compressed form may be used for ECC points, e.g., to reduce public key sizes. In some embodiments, a minimum amount of data may be transferred that is needed to reconstruct system.eCert (e.g., rather than the fill eCert). In some embodiments, data may be prefetched, such as the ephemeral keys, systemIdentifier, transaction.ID, etc. Further, selection of an efficient EC curve may also improve performance.

Exemplary Pairing Embodiments

Figure 11:
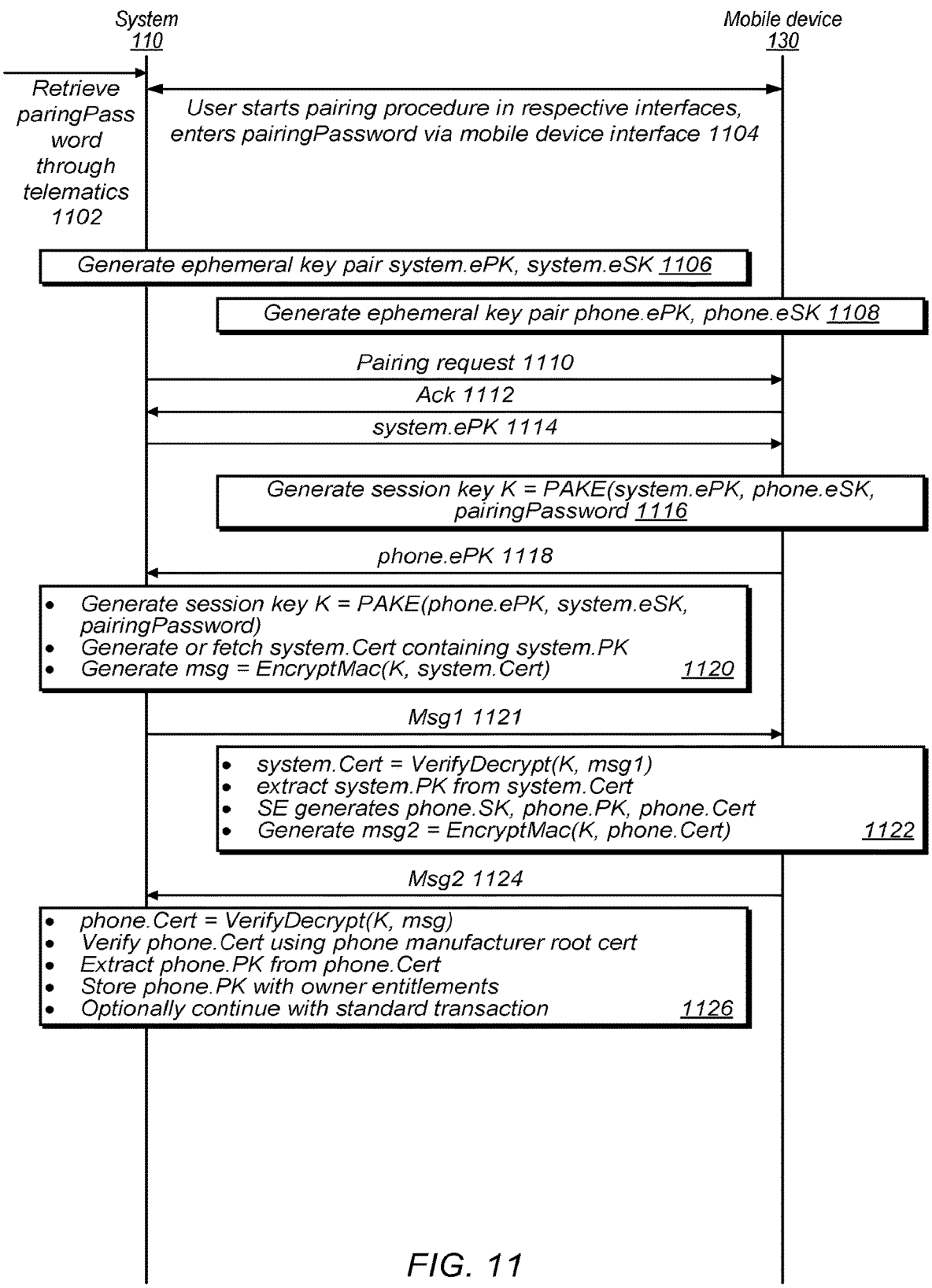
FIG. 11 is a communication diagram illustrating an exemplary pairing technique, according to some embodiments.

FIG. 11 is a communications diagram illustrating a pairing transaction that uses PAKE to generate a session key, according to some embodiments.

In some embodiments, before pairing the system 110 stores a device manufacturer's root certificates in order to verify the origin of public keys it receives. In some embodiments, the system uses a root certificate stored in the OEM backend (and should be online during pairing, in these embodiments). In other embodiments, the certificate may be provided by the device. In this case it should be signed by an authority that can be verified by the system. In some embodiments, before pairing, the system received a secret (pairingPassword) from the system manufacturer's backend via telematics at 1102 and the user obtained a secret (pairingPassword) from the system manufacturer's web portal/app/dealer/user manual and uses it at 1104. In the illustrated embodiment, K is a symmetric session key generated on both sides by a PAKE algorithm.

In some embodiments, using a PAKE protocol, a secure channel is established based on a session key K at 1116 and 1120. In the illustrated embodiment, ephemeral keys are generated on both sides (at 1106 and 1108), a pairing request 1110 and acknowledgemenet 1112 are exchanged before establishing the secure channel. In messages 1121 and 1124, the certificates system.Cert and phone.Cert are securely exchanged through this channel. After the certificate exchange and verification, the system might then execute the standard transaction described herein (e.g., in FIG. 10) in order to provision data.

In some embodiments, when put into pairing mode, the system reaches out to the backend and requests a pairingPassword value. The conditions to enter the pairing mode may be defined by the system OEM. The backend then generates the pairingPassword, transmits it to the system and provides it in parallel to the user through the OEM user account. The user retrieves the pairingPassword (e.g., in a web browser or through an installed OEM app). The user then starts pairing mode on the mobile device, either in the OEM app or in OS and enters the pairingPassword. Note that pairingPassword may also be referred to as a PIN herein. The OEM app may transmit the pairingPassword directly to the applet through an appropriate OS API. When device and system both have generated an ephemeral key pair, based on the pairing password, both UIs invite the user to tap his device on the NFC console reader, in some embodiments. In some embodiments, the system 110 may implement one or more policies for the pairingPassword, including, for example: number of failed pairing attempts allowed, behavior after successful pairing, behavior after too many failed attempts, recovery procedures after too many failed attempts, secret delivery to the system, and/or secret delivery to owner.

Figure 28:
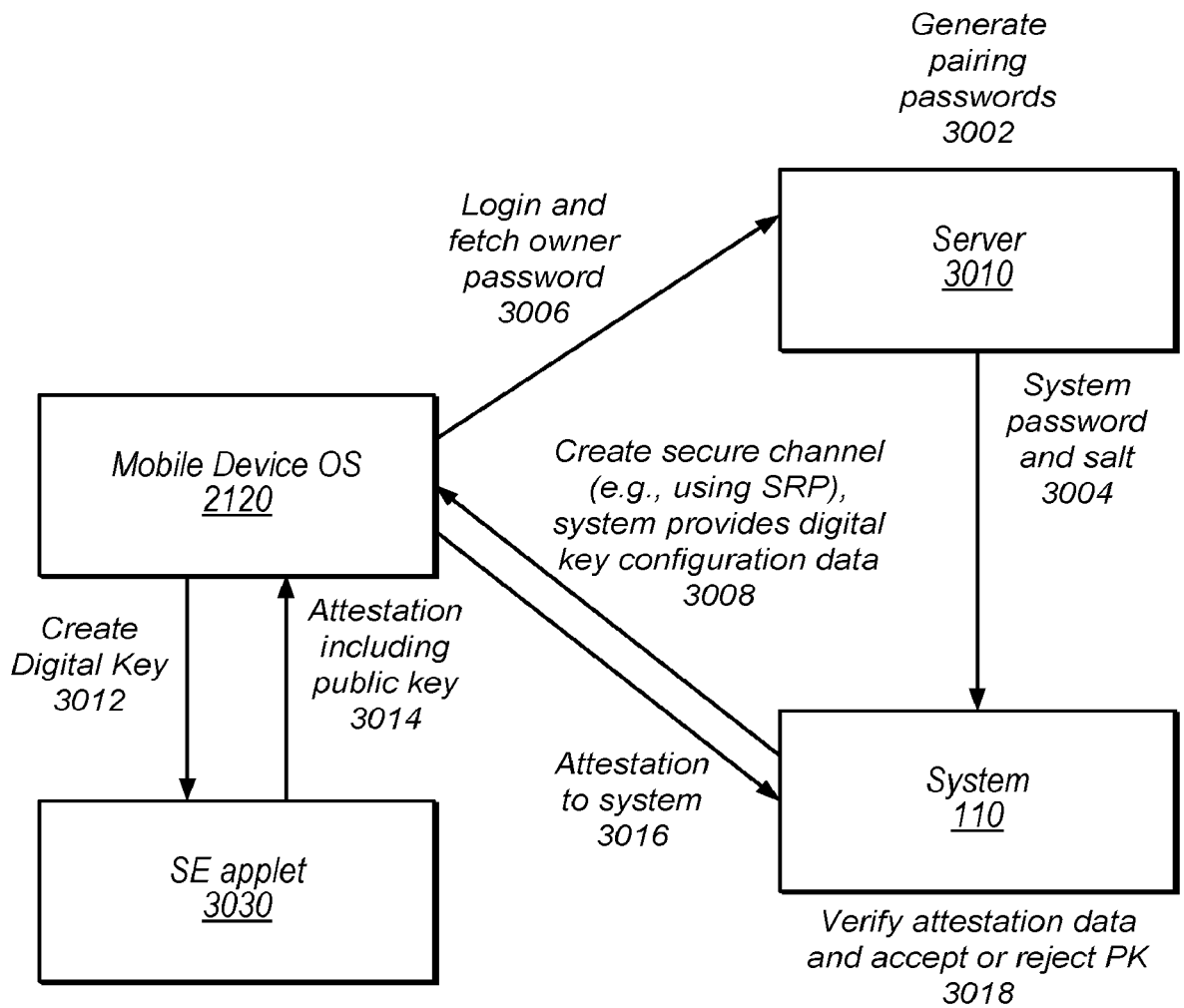
FIG. 28 is a block diagram illustrating an exemplary technique for digital key structure attestation at pairing, according to some embodiments.

In some embodiments, the vehicle sends configuration information, during pairing, that specifies how a digital key should be set up by the mobile device. This configuration information may include various fields, e.g., indicating what type of transactions are allowed, system metadata, start date, expiration date, etc. An operating system of the mobile device may instruct one or more applets on a secure element to create the digital key according to the configuration. The SE may also generate the long-term public key pair phone.PK and phone.SK. In some embodiments, the SE generates a certificate with the configuration information (as an attestation that the digital key has been created according to the configuration) and signs it using the phone.SK. In these embodiments, the system 110 may verify that the digital key was properly created by verifying the certificate and confirming that the configuration information is correct. A more detailed example with attestation is shown in FIG. 28, discussed in detail below.

Overview of Exemplary Systems and Components

Figure 12:
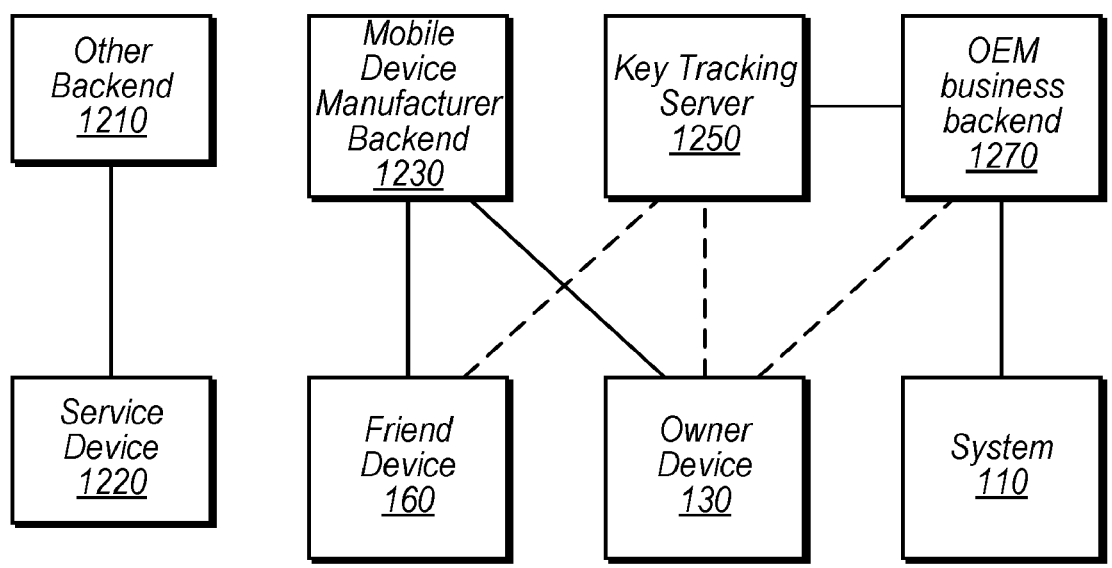
FIG. 12 is a block diagram illustrating exemplary system elements, according to some embodiments.

FIG. 12 is a block diagram illustrating an exemplary distributed system, according to some embodiments. In the illustrated embodiment, the system includes mobile device manufacturer backend 1230, key tracking server 1250, OEM business backend 1270, and other backend 1210. In the illustrated embodiment, ones of these backend systems communicate with owner device 130, system 110, friend device 160, and service device 1220.

In some embodiments, the system 110 is linked to the OEM Business Backend via a telematics link. This link may provides a secure communication channel and may be fully controlled by the system OEM. In some embodiments, the system is equipped with NFC readers to communicate with the mobile devices for actions such as owner pairing, system locking/unlocking, engine start, etc. In the illustrated embodiment, the devices may also communicate with the Key Tracking Server 1250 to track, sign and revoke issued digital keys. In some embodiments, the owner device communicates to the OEM business backend (e.g., which may host an owner account) through an OEM App. In some embodiments, friend and service devices don't need to link to the OEM business backend for main services. In some embodiments, these devices may use the OEM App to access optional accounts. Devices may be manufactured by various manufacturers and may communicate with multiple respective mobile device manufacturer backends.

In some embodiments, the KTS 1250 may trust the business backend to provide checking and signature functionality, while logging changing in keys associated with a vehicle. In some embodiments, for key sharing, the KTS 1250 records: a friend's public key, access rights for the friend, a generation counter for the friend, start and expiration dates, a key identifier, an SE signature, an owner signature, and a KTS signature.

The manufacturer backend 1230, in some embodiments, is responsible for managing the life cycle of a system key application (or applet) on the devices and provisioning the root Apple OEM certificate into the application. It may also provide services to suspend, restore and wipe devices. In some embodiments, the device OEM backend(s) may not be strongly integrated with the system OEM business backend 1270. In some embodiments, some connections may be used for OEM-based revocation or device lost/stolen notifications to the owner. The backend 1230 is not real-time connected to the other backends, in some embodiments. In some embodiments, an exchange of device OEM SE root certificates is done only once between all device OEMs in order to verify and sign all not owned root certificates and provision them into the mobile devices. In some embodiments, all devices using the disclosed techniques should contain a secure circuit (such as a certified secure element) and short-range wireless (e.g., NFC) capability to be able to communicate with the system. Whitelisting of devices may be performed by each system OEM.

Figure 13:
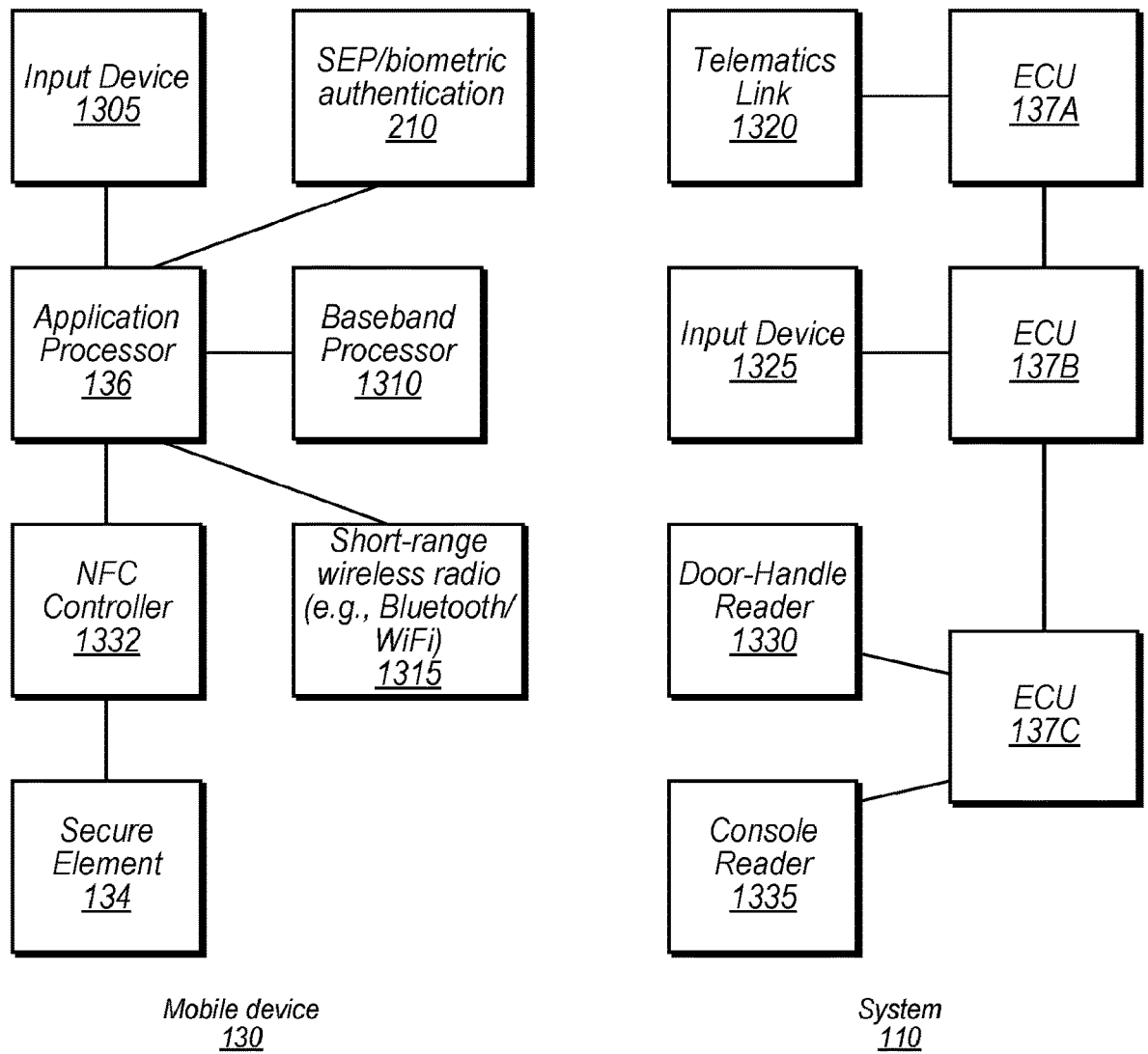
FIG. 13 is a block diagram illustrating exemplary components of a mobile device and system, according to some embodiments.

FIG. 13 is a block diagram illustrating exemplary short-range wireless (e.g., NFC) connectivity, according to some embodiments. In the illustrated embodiment, mobile device 130 includes application processor 136, which is connected to an NFC controller 1332. The NFC controller, in the illustrated embodiment, connects to the secure element 134 and controls the routing from an NFC antenna to either the secure element or the application processor 136. The application processor 136 does not need to be awake for NFC transactions, in some embodiments. In some embodiments, the system is equipped with at least two NFC readers, e.g., the illustrated door-handle reader 1330 and console reader 1335. In some embodiments, one ECU 137C controls all readers and includes software that executes the communication protocols though NFC, including various cryptographic operations discussed herein. In the illustrated embodiment, another ECU 137B controls screen output and one or more user input devices 1325. Another ECU 137A may also establish a secure channel to the system OEM backend via telematics link 1320. Note that the ECU deployment may be different for different OEMs, in various embodiments.

In some embodiments, an NFC component uses a card emulation mode and supported ECP (e.g., ECP 2.0) and field detect mode. In some embodiments, SE 134 supports symmetric and asymmetric cryptography, stores a local certificate authority (CA) for identification and public key signing, includes the system key application, and/or includes a card content application. In some embodiments, the system key application is configured to implement fast and standard transactions, stores and manages immobilizer tokens, and manages owner pairing, sharing, and revocation. In some embodiments, the application allows an operating system to query the number of available keys for sharing/immobilizer tokens, the number of keys already shared, information about keys already shared, and/or information regarding keys that have been received from another owner. The application may track shared keys and may verify signatures from SEs of other manufacturers. The application may be configured to temporarily disable usage of a specified key. In some embodiments, the application may be validated before being loaded onto SE 134.

The operating system, in some embodiments, implements natively main features such as owner pairing, transaction, key sharing and revocation. In some embodiments, it is configured to: send and receive a key through proximity sharing (e.g. air-drop), send and receive a key through remote sharing (e.g. iMessage), send and receive a key to/from other phone OEM devices, show a list of issued friend keys, show a number of keys available for sharing, show when a key has been used on the system, store manufacturer-signed root certificates of other manufacturer SEs to verify SE signatures of a public key used for key sharing, open a secure session to the system OEM server to remotely communicate with the system (not using the OEM user account credentials). In some embodiments, the operating system provides APIs to the system OEM application that allow: passing owner PIN during pairing process from backend to device SE, reading and writing to a private mailbox slot for each associated system's digital key individually, writing to confidential mailbox slot for each associate system's digital key individually, accessing the application for remote command execution, sharing a friend key with a server instead of a device (e.g., for professional services), receiving a friend or ad-hoc key from a server instead of a device (e.g., for sharing or professional services), retrieving non-confidential information about shared keys on the device, and/or revoking a key.

In some embodiments, the operating system is configured to request authentication (or a certain authentication type, such as biometric authentication) for certain types of actions. These actions may include, for example, owner pairing, full key sharing, service key sharing, key revocation (including on the owner device as requested by owner, on a friend device as requested by a friend, on a friend device as requested by the owner, on the owner device with a request sent to a friend). In some embodiments, all requests go to the system 110 as well via the backend. In some embodiments, examples of actions that do not require authentication (e.g., unless explicitly configured by the user on the device) may include door lock/unlock transactions, engine start transaction, first transaction of a friend in certain situations, and reception of a key revocation request from KTS 1250 or owner/friend device (e.g., for silent revocation).

Note that various functionality described herein as being performed by a particular processor, software component, or hardware component is discussed for purposes of illustration but is not intended to limit the scope of the present disclosure. In other embodiments, various functionality may be performed by other elements than those described herein.

In some embodiments, the mobile device 130 is a wearable device such as a watch, which may be paired with a cellular phone, for example. Functionality described herein with reference to device 130 may be split between such devices, in some embodiments.

In some embodiments, the system 110 is configured to provide owner pairing information such as the owner public key and/or devices information to KTS 1250. In some embodiments, system 110 may support changing the owner device via backup of nonconfidential key sharing information.

In some embodiments, a cloud services system may be configured to temporarily disable digital key functionality on a lost or stolen device (if online), remotely wipe digital keys on a lost or stolen device (if online), securely bind user identity to device identity, and/or backup digital key sharing information to facilitate restoration of shared keys on a new device.

Key tracking server 1250, in some embodiments, is configured to provide privacy protection for stored data. In some embodiments, KTS 1250 is only accessed for data query when a system has been stolen and the owner has authorized the access. In some embodiments, KTS 1250 has a privacy separation from the system OEM business backend, records and signs keys, and checks service validity and key policy before signing (e.g., it may not sign and send ab error code with specific reason such as service expired, no more digital keys, check service subscription, check the number of signed keys for a service, check validity of an owner signature (e.g., using owner.PK received from system 110 during pairing), and/or check validity of an SE signature (using access to the manufacturer OEM root certificate, for example). KTS 1250 may also revoke keys on devices when they have been deleted in the system or in the system OEM backend, revoke keys in the system through the system OEM backend when they have been deleted on a device, and/or provide a notification to the friend device that the shared friend key information is already provisioned into the system before the first friend transaction.

In some embodiments, the proposed system uses asymmetric cryptography to mutually authenticate system and device. The device reveals its identity only to known systems, in some embodiments. For situations where faster transaction is needed, follow-up transactions can use the shared secret agreed in the asymmetric transaction to authenticate the device through symmetric cryptography. No TSM is needed to provision keys into the devices. Public keys may be mutually exchanged through pairing of the owner device to the system. The owner can then distribute digital keys to friends and family members. The system is conceived to work fully offline (i.e. no server connection needed) for all relevant features. Where regulatory or business constraints require online connections in some situations, their addition is supported by the system design.

In some embodiments, multiple types of keys are implemented and a given device may hold keys for multiple systems (and may have different rows for these systems). In some embodiments, the following key types are implemented: owner, friend, professional service provider, system sharing, and ad-hoc service.

In some embodiments, the system accepts only one owner device. While in unpaired state the device to be associated with the system is considered an owner device. After an owner device is associated with the system, system switches from unpaired to paired state. The owner device key is tracked by the key tracking server through the owner pairing process. It is up to the system OEM to define and assign appropriate entitlements (see below). The system may accept several friend devices. Friend devices may have restricted entitlements on the system. They are assigned by the owner when issuing the key and are checked by the system according to the system OEM policy for friend keys. They also might need to be registered in a tracking server in order to be accepted by the system. The issuance of professional service provider keys is not managed natively but through the app. The app provides a way for the owner to share the key with the professional service provider (PSP). The PSP, which is represented by a server, is similar to a friend, but not needing an immobilizer token for its use. It issues a key to an employee, which contains an immobilizer token and which is tracked by the KTS as the PSP is assumed to be always online. The employee device is not able to share a key. In the system sharing model, the owner is the server of the system sharing company. It issues friend keys to system sharing users and takes system e that the keys are tracked. The system sharing user can issue ad-hoc service keys from his device. For system online/offline situations the same rules as for friend keys apply regarding the first transaction with the system. For ad-hoc implementations, the system accepts a single service device active at the same time. Service devices cannot issue further keys to other entities, in some embodiments. They may have other restricted entitlements.

In some embodiments digital key is represented by a data structure that includes one or more of various fields (e.g., depending on its type), such as a key identifier, a key friendly name, a VIN, a system public key, a key immobilizer token, spare immobilizer tokens, owner entitlements, device public key, device and OS information, key type, receiver account identifier, key tracking service URL, system metadata, start date, expiration date, receiver entitlements, SE signature, keytracking signature, etc. In some embodiments, digital keys are represented by one instance of the data structure. Different types of keys may also have different sets of fields.

In some embodiments, the entitlements are stored by the system along with the corresponding public keys of each device associated with the system. Depending on the system OEM policy, the entitlements may be changed by owner over the network if a connection is available. When a change of entitlements is not allowed, a current key may be revoked and a new key must be issued to reflect a change in entitlements.

Exemplary First Use of a Shared Key

In some embodiments, when a key has been shared with a friend or family member, the system 110 should store a new public key of the friend, after having verified required signature (discussed in further detail below). In some embodiments, the standard transaction flow is used in this situation. In some embodiments, the following additional cryptographic elements are used, relative to a standard transaction flow for the owner: SE.sig, owner.SK, owner-.Sig, friend.ePK/friend.eSK, friend.PK/friend.SK, friend.Cert, and KTS.sig. In some embodiments, SE. Sig is the signature of a public key that proves that the key has been generated by an authentic secure element. In some embodiments, owner.SK is a long term private key in the owner's device used to sign the public key of a friend when sharing access to the owner's system. This key may be the same key as the one used in the standard transaction flow (named phone.SK). In some embodiments, owner.Sig is generated when the owner signs the friend's public key when the owner has verified that the identity, and the entitlements, are correct and that the key has been generated on an authentic secure element. In some embodiments, friend.ePK/friend.eSK are an ephemeral key pair generated on each transaction, and may be deleted after each transaction. In some embodiments, friend.PK/friend.SK is a long-term key pair generated by a friend's phone during device pairing. One key pair may be generated per associated system. In some embodiments, friend.Cert is a certificate embedding friend.PK. In some embodiments, it is signed by se_friend.SK, owner.SK and (optionally) tracking.SK. In some embodiments, once friend.PK is successfully stored in the system, the certificate becomes obsolete. In some embodiments, KTS.Sig is an optional signature added by the key tracking server that informs the system that the new key has been recorded.

In this transaction variant it may be assumed that the friend's public key has not been pushed into the system by the backend before the friend approaches the system for the first time. The payload can be transmitted on device side as [mailbox-data] in the AUTH1 response or in one of the SESSION messages. For example, the mailbox_data may=friend.Cert containing SE signature, owner signature, and key tracking signature. When sending the data device 130 may prepare the data based on the received system identifier. When the backend has managed to provision all data already into the system before the first friend transaction, then the device may get a notification through the KTS link and refrain from sending data. In some embodiments, the payload consists of the data elements obtained by the friend in the key sharing process, which may include: the friend's public key, a signature of the friend's public key by the secure element, the signature of the friend's public key by the owner, an optional signature of the friend's public key by the key tracking server, the entitlements that the owner has attached to the public key before signing it, •the friend's SE certificate that allows verification of the friend's SE signature, and/or the owner's SE certificate that allows verification of the owner's SE signature.

Exemplary Immobilizer Token Techniques

In some embodiments, an immobilizer token may be used to increase security. In some embodiments, mobile device 130 may store and release a secret piece of data called ImmobilizerToken in every engine start transaction with the system 110. The ImmobilizerToken may be validated by various ECUs in order to allow starting the engine but may not be permanently stored within the system, e.g., as an anti-theft counter-measure. As a result, the system cannot be started until an ImmobilizerToken has been distributed by a key fob or an associated mobile device, in some embodiments. In some embodiments, an immobilizer token should never be duplicated. In some embodiments, a system 110 may embed a secure element able to locally store the ImmobilizerToken and release it to ECUs upon verification of a signature computed by a mobile device 130. In that case the device may not need to store and release this token, e.g., because the system may simply rely on digital signature verification and the security of its secure element.

Note that, although immobilizer tokens are discussed herein for purposes of illustration, this discussion is not intended to limit the scope of the present disclosure. Rather, immobilizer tokens are one example of a security token or second level security token that may be handled using the disclosed techniques.

Various techniques may be used to store an immobilizer token into a mobile device's secure element, and may vary among system manufacturers. In some embodiments, an (or a set of) immobilizer token(s) is generated by the system 110 during the owner pairing step and pushed to the device 130 through a secure channel opened with the standard transaction. In some embodiments, an (or a set of) immobilizer token(s) is generated by the system manufacturer backend during the owner pairing step and pushed to the device through a network. In some embodiments, an immobilizer token is provided by owner to friend and encrypted with friend's public key during key sharing. In some embodiments, when the friend creates a service key he or she provides his immobilizer token to the service key owner. In the next transaction with the system or through the network, the friend receives a new immobilizer token, which is registered with his or her public key. When the owner revokes or the friend deletes his mobile key, the immobilizer token is deleted as well. In that case the owner may obtain a new immobilizer token so that he can share a new friend key. The issuance of a new immobilizer token to the owner may be related to the owner producing a revocation receipt from the friend's device and/or the system confirming that the friend's public key and the corresponding immobilizer token have been deleted. In some embodiments, the device stores the immobilizer tokens in the confidential mailbox. The mailbox may be organized into slots. This may allow associating a slot that contains one immobilizer token package (e.g., friend+ad-hoc) with a public key received from a verified friend device having a valid SE signature (e.g., through key sharing).

Figure 14:
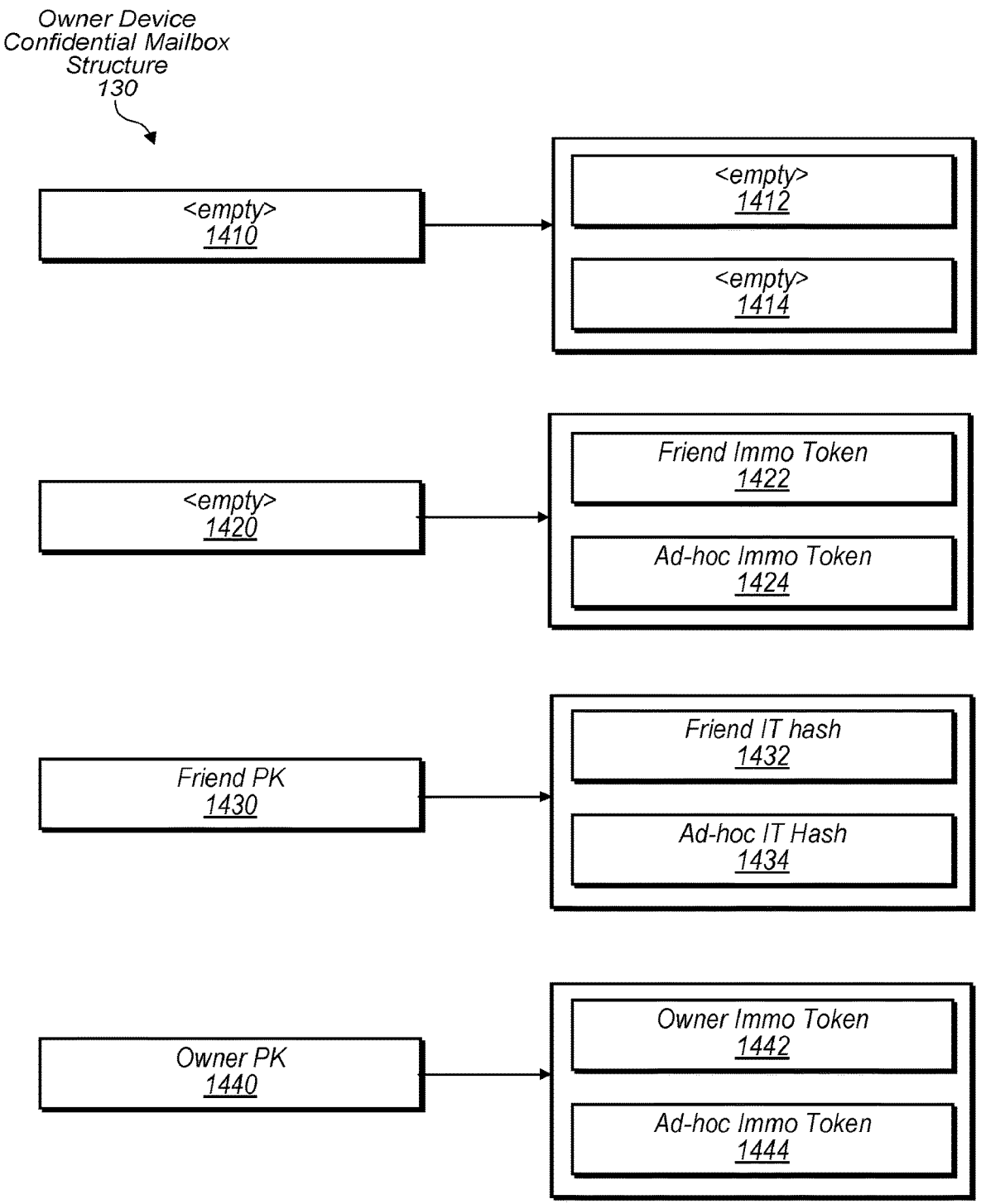
FIG. 14 is a diagram illustrating an exemplary mailbox structure, according to some embodiments.

FIG. 14 is a block diagram illustrating an exemplary mailbox organization, according to some embodiments. In the illustrated embodiment, there are four slots for the owner's confidential mailbox with three slots filled (although any number of slots may be implemented in other embodiments). In the illustrated embodiment, each slot is configured to store up to two immobilizer tokens. In some embodiments, each slot can be assigned to a public key (e.g., the friend PK 1430 or the owner PK 1440). In the illustrated example, the first slot 1410 has not been provisioned and the fourth slot with owner PK 1440 is reserved for the owner. The second slot 1420, in the illustrated embodiment, has received non-assigned immobilizer tokens 1422 and 1424, e.g., during owner pairing. The third slot with friend PK 1430 includes a friend public key and hashes of the immobilizer tokens as proof of sharing. When a key is revoked on the friend device of the system, a synchronization process may provide a revocation receipt to the owner. The receipt may be signed or otherwise authenticated by a secure element of the friend device. In response to receiving the receipt, the owner device application may delete all contents of the mailbox slot corresponding to the public key in the receipt and the revoked public key itself.

In some embodiments, the private mailbox may facilitate low power mode (LPM) operation, e.g., by making data available to system 110 without involving a main processor of mobile device 130. In some embodiments, a secure element, for example, may be able to provide access to private mailbox data while the device is in LPM.

Additional Key Sharing and Tracking Embodiments

Figure 15:
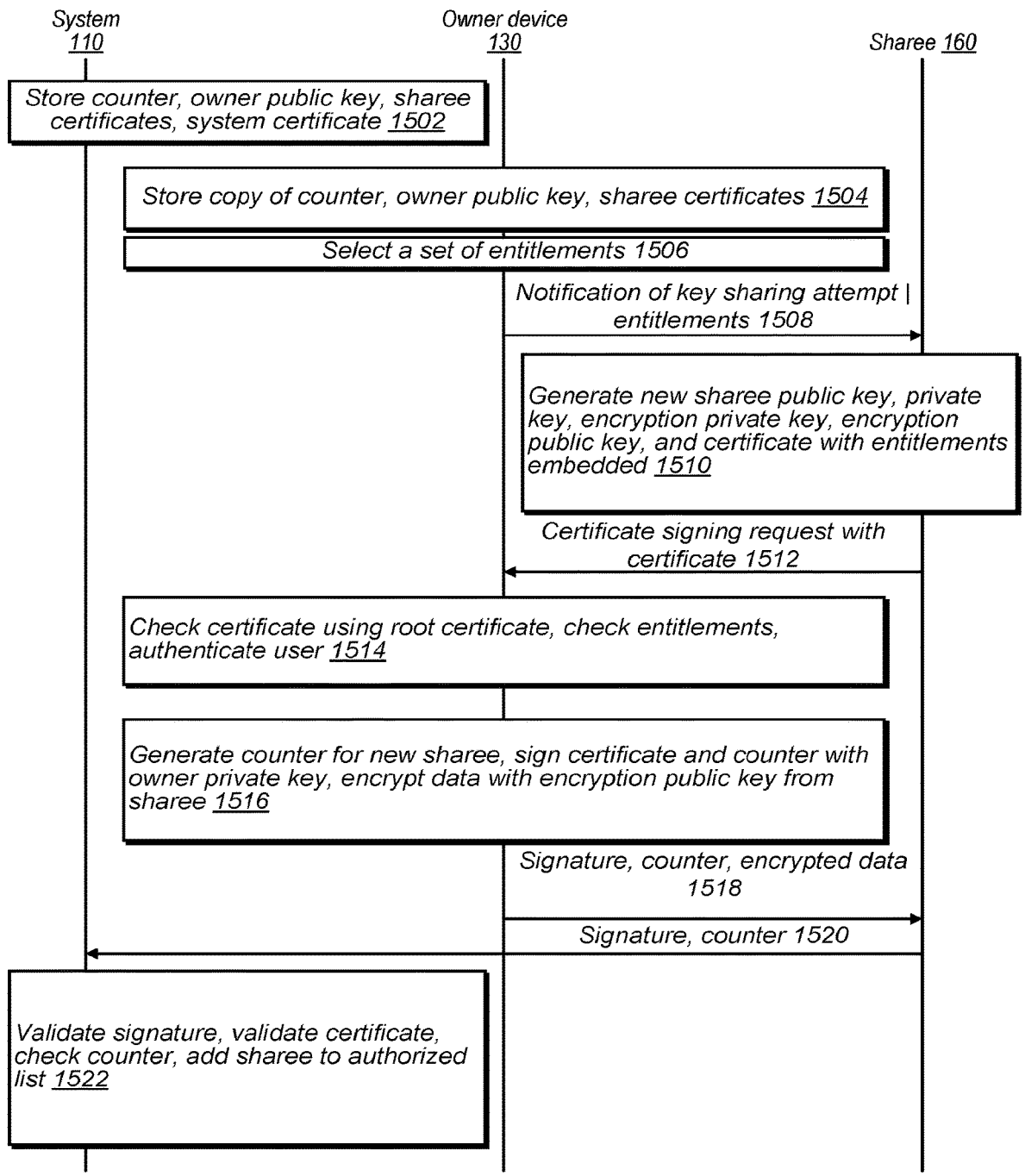
FIG. 15 is a communications diagram illustrating exemplary offline sharing with another device, according to some embodiments.
Figure 16:
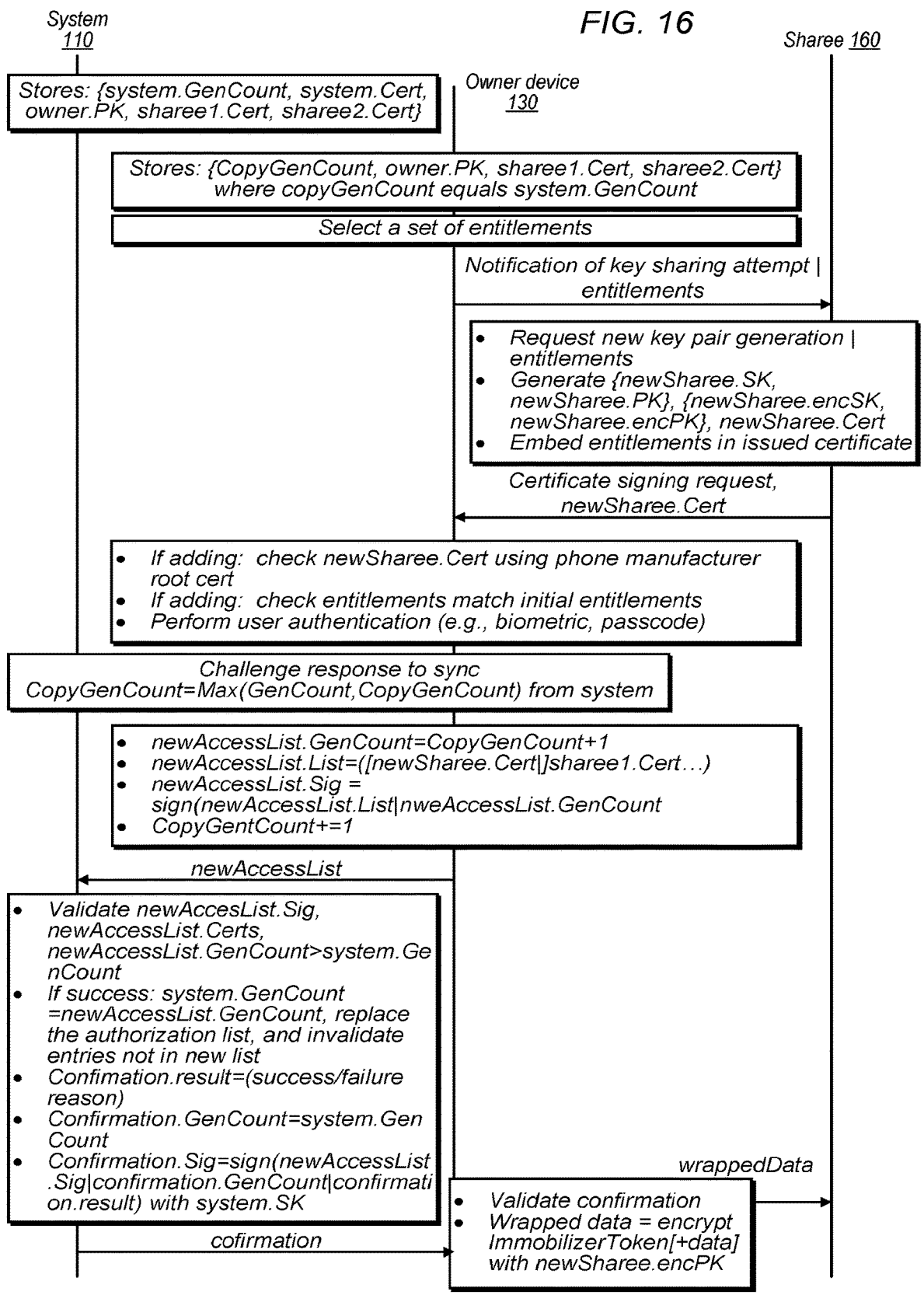
FIG. 16 is a communications diagram illustrating exemplary online sharing with another device, according to some embodiments.

In various embodiments, an owner would like to share a key with another person or entity. The owner might be an individual or a company. In some embodiments, the owner signs a public key generated by a friend and associates it with some specific entitlements. An offline technique may be used when the system 110 cannot be reached over a network (e.g., as shown in FIG. 15) while an online technique may be used when the system 110 can be reached (e.g., as shown in FIG. 16).

In the illustrated embodiment, at 1502 the system initially stores a counter system.GenCount (associated with the number of shared keys), an owner public key owner.PK, sharee certificates (if sharing has already occurred), and a system certificate system.Cert. The owner device 130 stores a copy of the counter CopyGenCount, the owner.PK, and any current sharee certificates. In some embodiments, key sharing maintains the current counter value while revoking a shared key increases the counter value. At 1506, the owner device 130 selects a set of entitlements and then notifies the sharee device 160 of the key sharing attempt and the entitlements at 1508.

At 1510, in the illustrated embodiment, the friend's device generates a long-term public key pair (e.g., referred to as newSharee.SK and newSharee.PK). In the illustrated embodiment, the sharee device 160 also generates a public and private key pair for encryption (e.g., newSharee.encSK and newSharee.encPK). The sharee device 160 also generates a certificate that embeds the indicated entitlements.

At 1512, the sharee 160 sends the certificate newSharee.Cert in a signing request to the owner device 130. When requesting the owner device 130 to share a digital key with the friend, the friend's SE may create a certificate newSharee.Cert containing the public key, signed by the local CA on the SE. The certificate may include data elements that allow the owner to verify the authenticity of the friend's public key. Detailed techniques for certificate chains for signature verification are discussed below.

At 1514, the owner device 130 checks newSharee.Cert using a root certificate (e.g., of a phone manufacture or phone OEM of the sharee device 160), checks that the embedded entitlements match those selected by the owner, and authenticates the user (e.g., using biometric authentication, a passcode, etc.). If authentication fails, in some embodiments, owner device 130 is configured not to proceed with sharing. This may prevent sharing by stolen owner devices, for example.

At 1516, the owner device 130 may add one or more data elements, such as the entitlements and the generation counter, to the digital key structure, sign it with the owner private key owner.SK and sends the complete data back to the friend as wrappedData. In some embodiments, this includes determining newSharee.GenCount=CopyGenCount; newSharee.Sig=sign(newSharee.Cert|newSharee.GenCount) with owner.SK; and wrapped data=encrypt ImmobilizerToken[+data] with newSharee.encPK. This may allow the system 110 to verify that the owner device 130 confirmed the entitlements, for example.

At 1518, the owner device 130 sends the signature, counter, and encrypted data to the sharee device 160. This may include newSharee.GenCount, newSharee.Sig, and wrappedData, for example.

At 1520, in the illustrated embodiment, the sharee 160 sends the signature and counter to the system 110. At 1522, the system validates the signature and certificate, checks the counter, and adds the sharee to the authorized list. For example, this may include to validate newSharee.Sig, validate newSharee.Cert, validate that newSharee.GenCount=system.GenCount, and if successful, add the sharee to an authorized list.

In some embodiments, the disclosed offline techniques may allow de-centralized key sharing, e.g., without a wide area network connection or any connection to a server, in various situations.

In some embodiments, the generation counter protects the re-use of revoked keys. In some embodiments, either owner or friend might reach out to the key tracking server to obtain a signature. In some embodiments, either the key tracking server or the owner device, reaching out to the system OEM business backend, provides one or more relevant elements of the shared digital key structure to the system, such as: friend's public key, entitlements, generation counter, start and expiration dates, a key identifier, a key friendly name, a SE signature, an owner signature, and/or a KTS signature.

FIG. 16 is a detailed communications diagram illustrating exemplary online communications. In the illustrated embodiment, several elements are similar to those in FIG. 15. In the illustrated embodiment, the owner device also generates a new access list for a set of current sharee devices and sends a signed copy of the new access list to the system 110.

In some embodiments, the system manufacturer may optionally allow the system 110 to be reached over a wide area network such as the internet by devices for execution of remote operations. In order to avoid the system to be directly exposed on the internet and more vulnerable to attacks, the system manufacturer servers might act as a proxy providing access to the system upon authentication of the device to the system manufacturer's server. In some embodiments, public keys stored in the system ECU are synced on the system manufacturer's server on a best effort basis. In some embodiments, each time a new owner is paired and each time a new friend key is added, the system attempts to synchronize its stored public keys as well as revocation list with the system manufacturer's server. During pairing with a device the system may provide, to the device, a non-secret unique identifier and an URI to be used with the system manufacturer's server as a way to reach the system over the internet. Using this URI and the unique identifier, the device may establish a secure session with the system manufacturer's server. The secure session may use standard protocol like TLS such that the device is able to authenticate the server. Once this session is established, the device may use the secure element to sign challenges provided by the system and commands to be executed by the system. The system manufacturer's server, acting as a proxy, may check packet formatting and signatures are correct before transmitting requests to the system. Firewall-type protection against denial of service or ill-formatted packet may also be handled by the system manufacturer's server. In some embodiments, TLS server authentication might be upgraded with client authentication after the device successfully signs a server challenge with a valid key, which may help filter DOS attacks at the cost of increased complexity.

In some embodiments, the following online remote operations are available within a secure session with the OEM server: door lock/unlock, trunk unlock, friend key revocation, owner device removal, owner device unpairing, and/or comfort actions such as air conditioning or heating.

The system manufacturer may desire track and/or control some of the operations herein, such as the issuance of new keys or owner pairing. In this context, in addition to the signature performed by the friend/owners device, a signature generated by the system manufacturer's servers might be required by the system to allow specific operations. Such requirements may, however, prevent offline capabilities regarding these operations. The system manufacturer's server may be notified by the owner's device, the friend's device or the system that a new key has been issued, such that at least one of the three parties involved should be online in order to retrieve a signature from the server. If none of the parties are able to reach the server, the system may still allow the key to be temporarily used, e.g., with limited capabilities until a signature can be retrieved from the system manufacturer's server. In some embodiments, the system manufacturer is able to remotely disable the need for additional server signature, e.g., in case its server becomes at some point unavailable.

In some embodiments, if the system is offline, the friend's device presents the data elements to the system in the first transaction as described above. The transfer of an immobilizer token may be performed as part of this transaction. In some embodiments, mailboxes may be used for this transfer. When the owner and friend use devices from different manufacturers, the sender may provide a certificate such as a Controlling Authority Security Domain (CASD) certificate used by the SE to sign the receiver's public key.

In some embodiments, for key tracking, The SE provides a temporary secure element identity (local CA), which is stable until the SE is wiped. This identity may be controlled by the device manufacturer and can be verified by the system OEM using a manufacturer local CA root certificate. The identity may be linked by the manufacturer backend to SE-ID, which is not exposed to external identities. The key tracking server 1250, in some embodiments, is responsible to verify device eligibility before signing a digital key. The verification may be performed using a device manufacturer temporary root certificate that allows verifying the signature of the secure element. In addition, the device may deliver the following information: device manufacturer, device hardware, device OS version, and/or a JCOP Platform Identifier.

In some embodiments, the KTS 1250 is physically and logically separated from the OEM business backend to provide privacy protection for stored data. In some embodiments, the KTS 1250 is only accessed for data query when a system has been stolen and the owner has authorized the access, and thus may not be exploited for business purposes. In some embodiments, any device having a mobile key is able to contact the KTS due to the URL being delivered in the mobile key from the system to the owner device and the owner device to friend and service devices. In some embodiments, the KTS has the following communication interfaces: KTS—Device, KTS—OEM Business Backend/system, KTS—Device.

In some embodiments, the KTS—Device interface allows both parties to start a communication, but the first step should be taken by the device after having received a mobile key. This interface may be used for the following operations when a friend device provides a new mobile key to the server: check service validity, check number of signed keys for a service, check validity of SE signature (e.g., with access to phone OEM root certificate), check validity of owner signature (e.g., using a copy of system PKs), register the mobile key and device information, sign the mobile key data presented to the system at first transaction, provide the mobile key data to the system OEM backend for provisioning into system (if system online), send either signed mobile key back to device or provides error and reason code. Examples of reason codes may include: SE signature invalid/SE not whitelisted, owner signature invalid/unknown, service subscription not valid, and/or maximum number of issued mobile keys reached. In some embodiments, this interface may be used when a friend deletes a key on the friend's device to send a revocation request to the server. In some embodiments, this interface may be used when KTS 1250 notifies an owner device regarding successful revocation. For example, when a change in the mobile key status occurs, KTS 1250 may contact the owner device to update the applet status (removing the friend public key and associated tracking data (e.g. a hash of friend mobile key data as shown in FIG. 14).

In some embodiments, the KTS—OEM Business Backend/system interface is used to notify the OEM business backend of a revocation request in the system and/or to request revocation of a key on a device when the deletion is initiated through the OEM owner or friend account or in the system.

Exemplary Key Revocation Techniques

Keys may be revoked at various locations, including the system 110 and the mobile device 130. In some embodiments, the validity of keys is managed using a generation counter that is incremented when the system receives a full access list. To remove a key, the new access list does not contain the key to be revoked and includes a generated counter incremented by at least one relative to the current access lists. In some embodiments, system 110 is configured to reject any previous or pending requests signed with a generation counter lower than the new current value. In some embodiments, the generation counter remains unchanged when an incremental addition to the list is performed, thus allowing existing entries to remain valid. In some embodiments, the counter is monotonic and configured to count to large enough values to avoid rollover.

Figure 17:
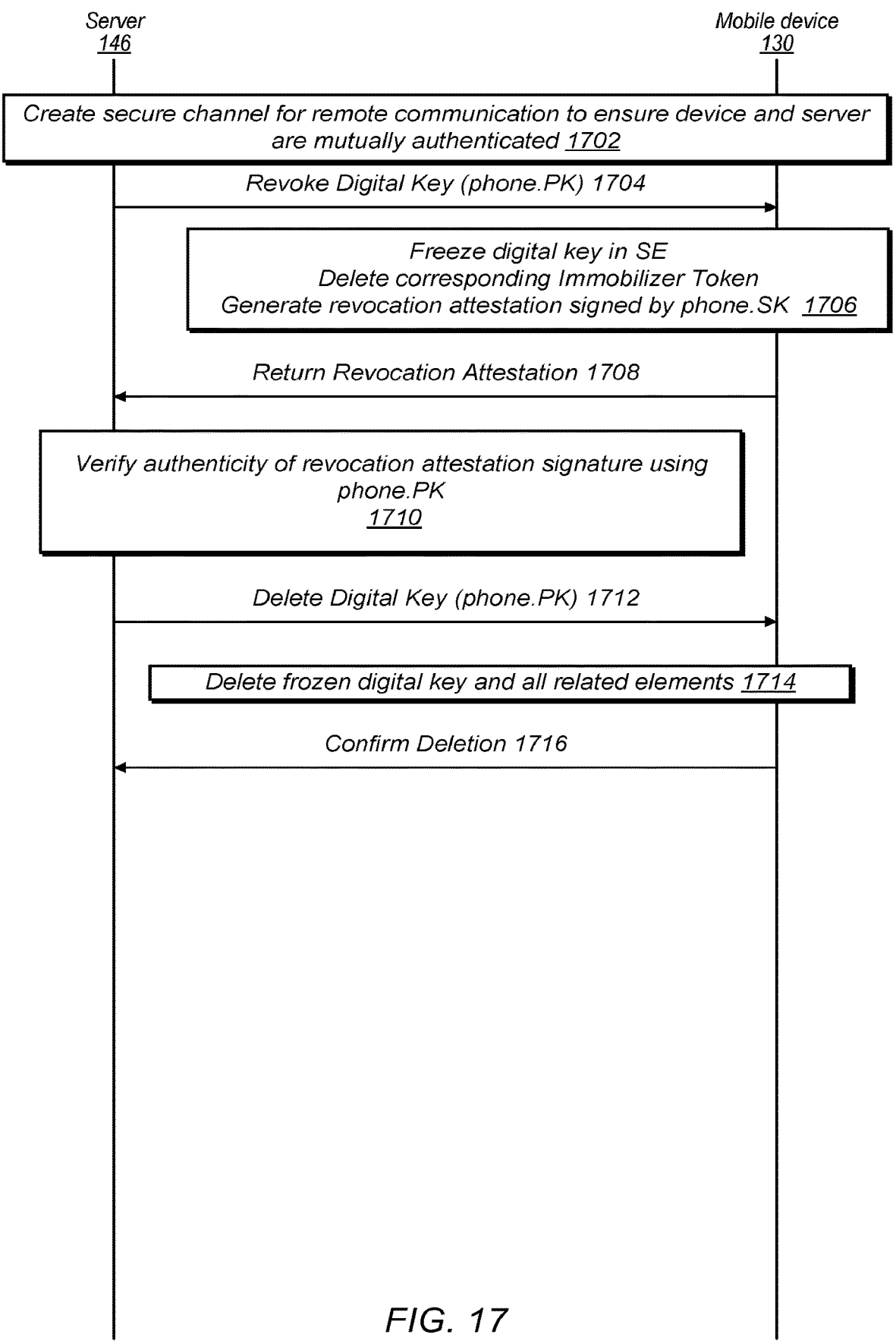
FIG. 17 is a diagram illustrating exemplary key revocation, according to some embodiments.

FIG. 17 is a communication diagram illustrating exemplary key revocation by mobile device 130. In the illustrated embodiment, the mobile device 130 receives a key revocation request at 1704 via a secure channel created at 1702. At 1706, the mobile device 130 then instructs the secure element (or some other secure circuit) to mark the key as revoked. In this state the key cannot be used in a transaction, but only for signing a revocation attestation. In some embodiments, the mobile device 130 is configured to request from the SE a revocation attestation on a revoked key, as shown in 1706, which may be signed by phone.SK. In the illustrated embodiment, the mobile device returns a revocation attestation 1708 and the server 146 verifies the authenticity of the revocation attestation using phone.PK at 1710. In some embodiments, the mobile device 130 is configured to instruct the SE to delete the keys in revoked state, as shown in elements 1712-1716. In other embodiments, any of various elements discussed herein may be configured to verify a revocation attestation. In some embodiments, the revocation flow is initiated by a push notification to the devices requesting to reach out to the OEM backend and synchronize key status.

In various embodiments, the disclosed techniques may allow for system, owner-device, and/or internet-based revocations with attestation that the revoked keys were actually removed or frozen on a sharee device. Revocation techniques may also be used on owner devices, e.g., before pairing with another owner device. In some embodiments, the disclosed revocation techniques of FIG. 17 may be used directly between friend and owner mobile devices, e.g., without involving a server. For example, the friend device may send a revocation receipt directly to owner device 130.

Exemplary Mailbox Techniques

Figure 18:
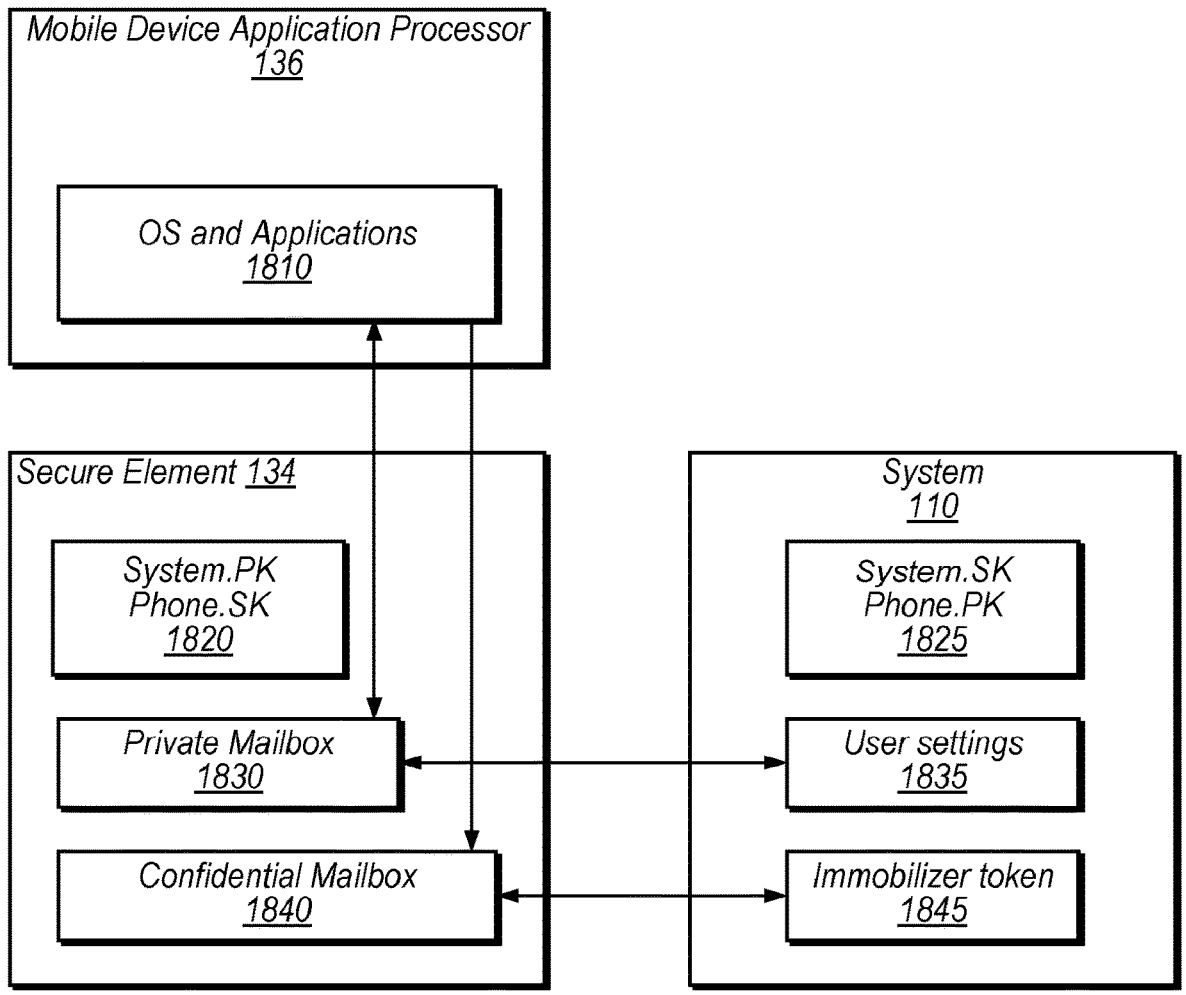
FIG. 18 is a diagram illustrating exemplary mailbox use, according to some embodiments.

FIG. 18 is a block diagram illustrating exemplary mailbox techniques, according to some embodiments. In the illustrated embodiment, application processor 136 executes an OS and application 1810 which have read and write access to private mailbox 1830 and write access to confidential mailbox 1840. Secure element 134, in the illustrated embodiment, also includes storage 1820 for the long-term system public key and the phone secret key. System 110, in the illustrated embodiment, includes storage 1825 for the system secret key and phone private key and also includes storage 1835 for user settings and 1845 for an immobilizer token.

In some embodiments, the mailbox mechanism allows the secure element to store small data buffers accessible by the application processor 136 and by the system 110. These data buffers may be stored in the secure elements volatile or non volatile memory and read/written during transactions or provisioning. In some embodiments, each key created on the device 130 is associated with two mailboxes with different security properties and targeted at different usage.

Private mailbox 1830, in some embodiments, is read and write accessible to the application processor 136, e.g., using a device internal wired link. In some embodiments, it is also read and write accessible by the system 110, e.g., using an RF interface once the secure channel described above is established with a registered system.PK. The data exchanged may be protected by the established secure channel to prevent phone tracking. In some embodiments, this mailbox may be used: to send user settings from the AP 136 to the system, to send diagnostic information from the system to the AP 136, to send specific commands to the system, and/or to send Bluetooth pairing information to the system. In some embodiments, this mailbox supports random access, and its content can be read/written using offset/length parameters.

Confidential mailbox 1840, in some embodiments, is read and write accessible to the system and write accessible by the application processor 136. In some embodiments, it can also be written by the application processor 136, e.g., over the internal wired link when data is encrypted with newSharee.encPK. In some embodiments, the content of a confidential mailbox might be exported encrypted with the certificate/pubkey of another trusted secure element if allowed by key object configuration and with user consent. In some embodiments, any data exchanged over RF is protected by an established secure channel to prevent user tracking. In some embodiments, this mailbox might be used for: immobilizer token provisioning from owner device to friend device, immobilizer token provisioning from system to device, and/or immobilizer token release device to system. In some embodiments, this mailbox supports random access, its content can be read/written using offset/length parameters. For example, a set of immobilizer tokens may be written/read at different offsets in the confidential mailbox, as discussed above with reference to FIG. 14.

Exemplary Certificate Chains

In some embodiments, public key infrastructure (PKI) mechanisms are used to build a chain of trust down to a particular digital key. In some embodiments, these chains include a device certificate chain, a system certificate chain, an owner pairing key attestation, and a key sharing key attestation.

In some embodiments, device manufacturers should provide a secure service to handle certificate signing requests (CSR) from other device manufacturers. Cross-signing of root certificates may be needed for all device manufacturers that are whitelisted for a given system manufacturer. The signed certificates may be embedded into the device OS by the owning device manufacturer only or by all other device manufacturers. The latter option may reduce data transfer for the certificate during key sharing, but require that all other devices store a device OEM's certificate. In some embodiments, system manufacturers should provide a secure service to honor CSRs from all whitelisted device manufacturers. In some embodiments, the signed certificates are stored in the device's OS and are provided during owner pairing for verification.

Figure 19:
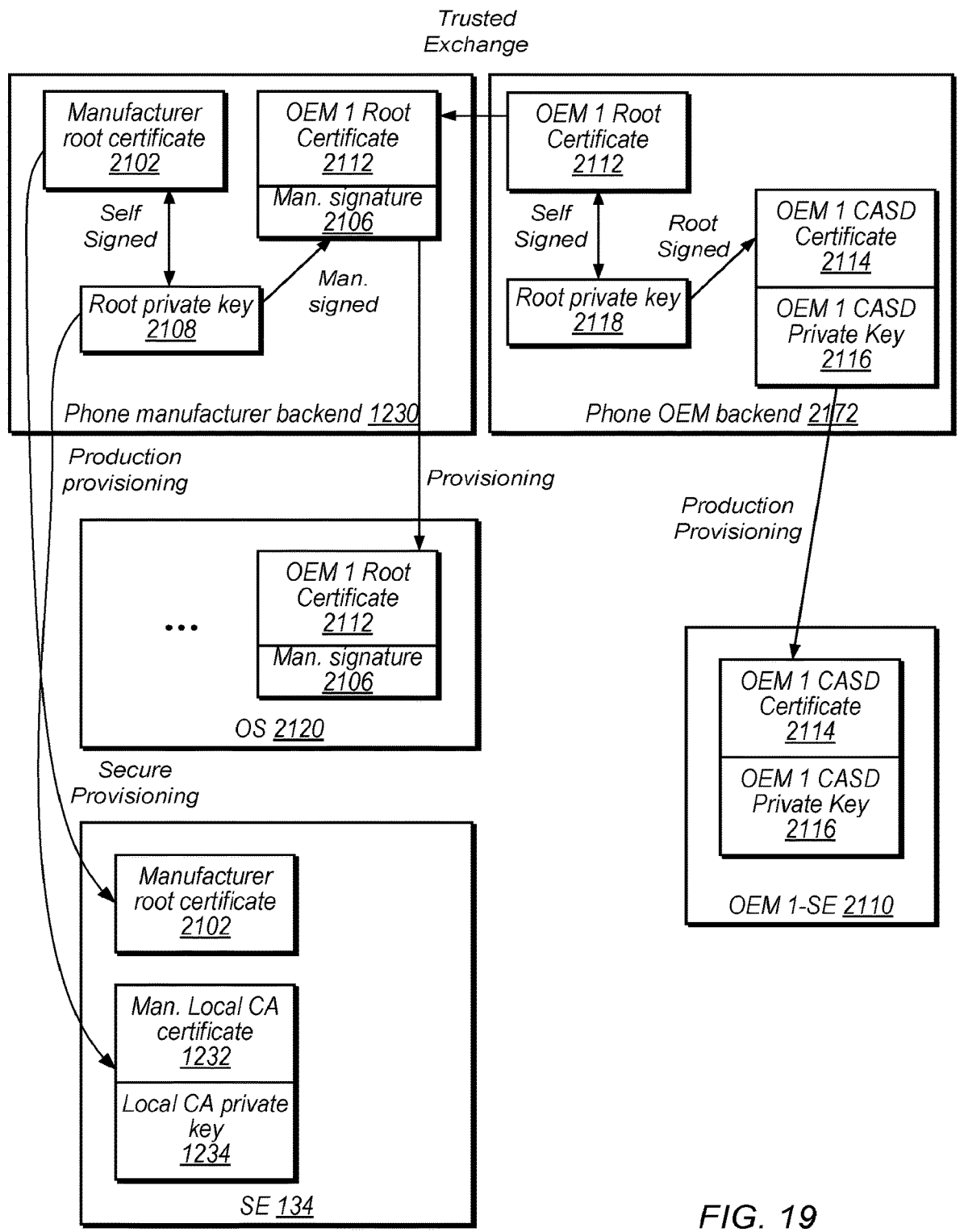
FIGS. 19-24 are block diagrams illustrating exemplary certificate chains, according to some embodiments.

FIG. 19 is a block diagram illustrating an exemplary device certificate chain, according to some embodiments. In the illustrated embodiment, the manufacturer root certificate 2102 is self-signed using foot private key 2108 and is used for secure provisioning of secure element 134 (the root private key is also used for production provisioning of a local CA certificate 1232 and local CA private key 1234.

In the illustrated embodiment, the OEM 1 root certificate 2112 is self signed using the OEM root private key 2118, which is also used to sign CASD certificate 2114 which is provided to SE 2110 during product provisioning. In the illustrated embodiment, the OEM 1 root certificate 2112 is also provided from phone OEM backend 2172 to phone manufacturer backend 1230 using a trusted exchange. The backend 1230 signs the root certificate 2112 with a signature 2106 and provisions the signed certificate to the OS 2120.

Thus, in some embodiments, each eligible secure element contains a production-provisioned public key pair (e.g., CASD) that allows the SE to attest that a public key has been created on a genuine SE. I the illustrated embodiment, the CASD public key is embedded in a certificate which is signed by a root key kept securely in the OEM backend. The manufacturer may sign a local CA certificate stored in the applet instance which attests the authenticity of an instance key pair, based on the CASD signature. This may allow elimination of static identifiers such as the SEID from the certificate chain. In order to allow a device to verify the SE signature of received keys, the root certificates of all eligible device OEMs are exchanged between the respective the backends, in some embodiments, and then signed with the receiving device OEM root private key 2118. The corresponding root certificate is securely provisioned into the SEs of all OEM devices. The signed OEM root certificate is stored in all OEM devices. No secure storage is needed as the authenticity of the certificate is verified before each use in the SE.

In various techniques, the disclosed techniques may facilitate use of mobile devices from various manufacturers to implement the techniques disclosed herein.

Figure 20:
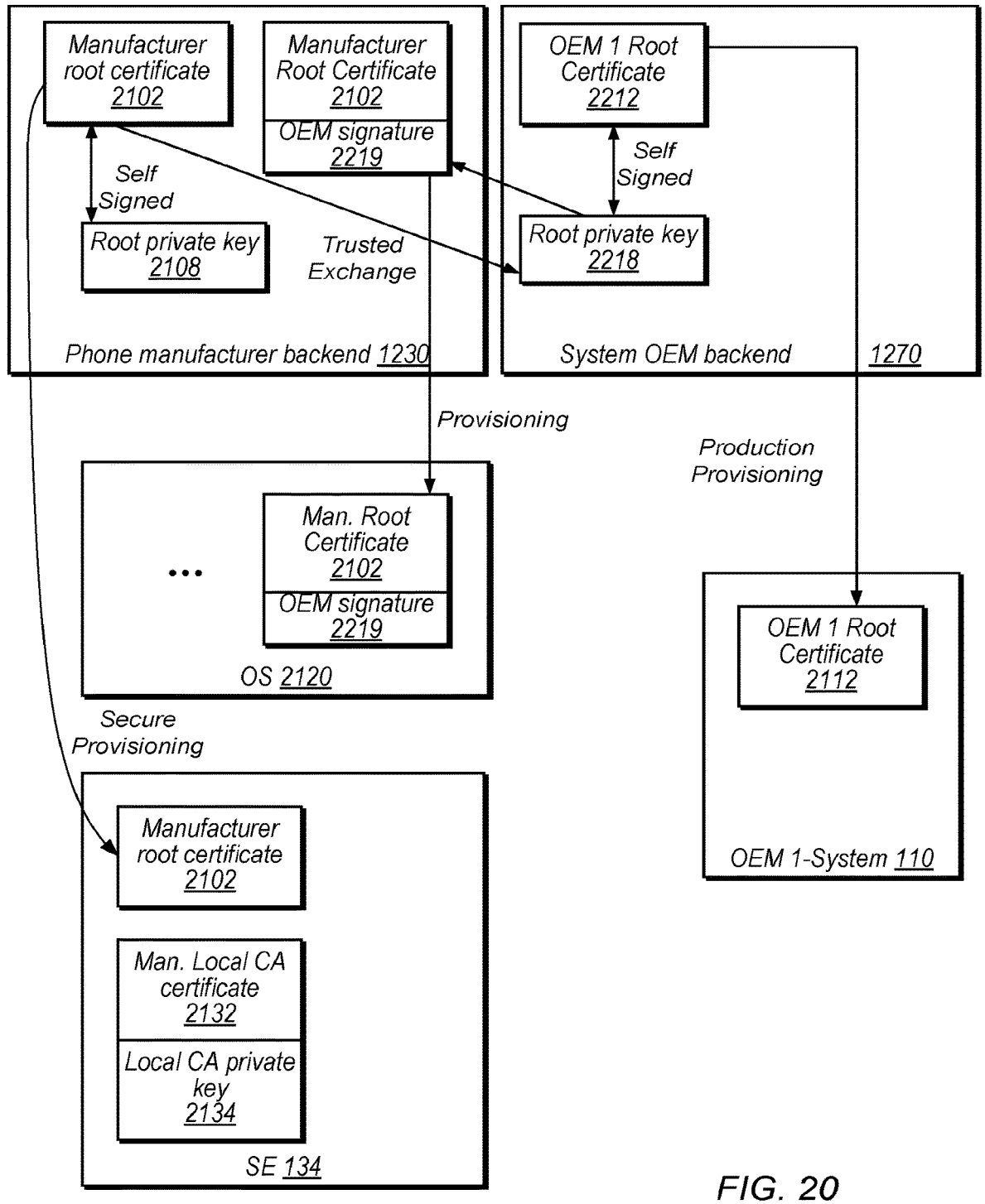

FIG. 20 is a block diagram illustrating an exemplary device certificate chain, according to some embodiments. In the illustrated embodiment, the manufacturer root certificate 2102 is signed (OEM signature 2219) using system OEM backend 1270's root private key 2218 (e.g., via a trusted exchange). In some embodiments, device root certificates are signed by the system OEM root private key once a device OEM is whitelisted by the system manufacturer or a system OEM is supported by the device manufacturer. In some embodiments, the OEM 1 root certificate 2212 is securely stored in each system 110. In the illustrated embodiment, the signed manufacturer root certificate 2102 is stored in the device operating system 2120.

In some embodiments, the owner pairing exchange can be simplified, e.g., when the system is configured to store the device root certificates. In that case there may be no need for the device OEM to store the system OEM signed root certificate 2102 in the device OS.

Figure 21:
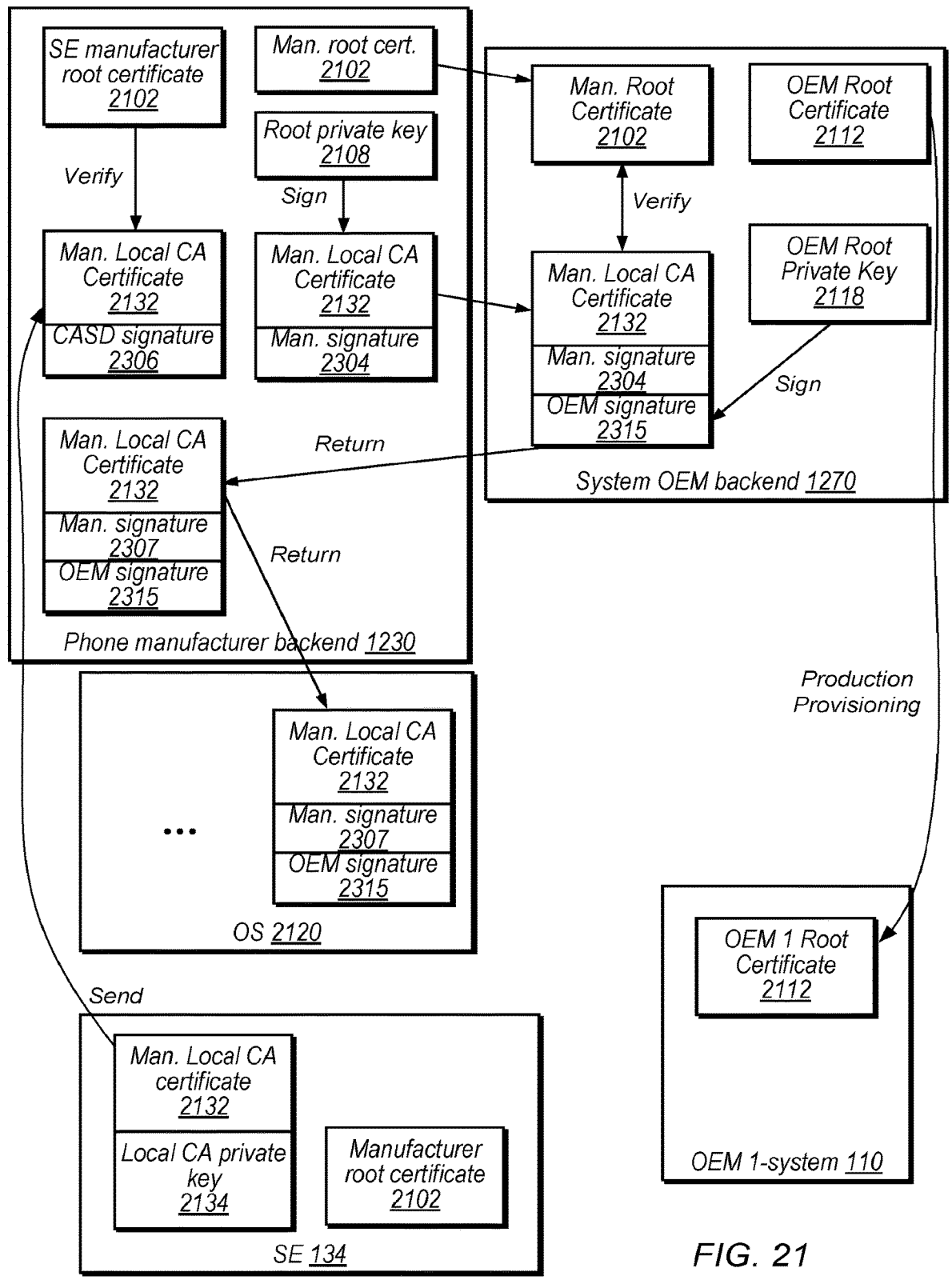

FIG. 21 is a block diagram illustrating an exemplary technique with a system OEM signed local CA, according to some embodiments. In some embodiments, when the local CA certificate is signed by the system OEM at setup, then the system 110 can verify the owner public key certificate directly using its embedded system OEM root certificate. In the illustrated embodiment, the manufacturer local CA certificate 2132 is stored in the device OS 2120 and signed by both the device manufacturer backend 1230 and the system OEM backend 1270.

Figure 22:
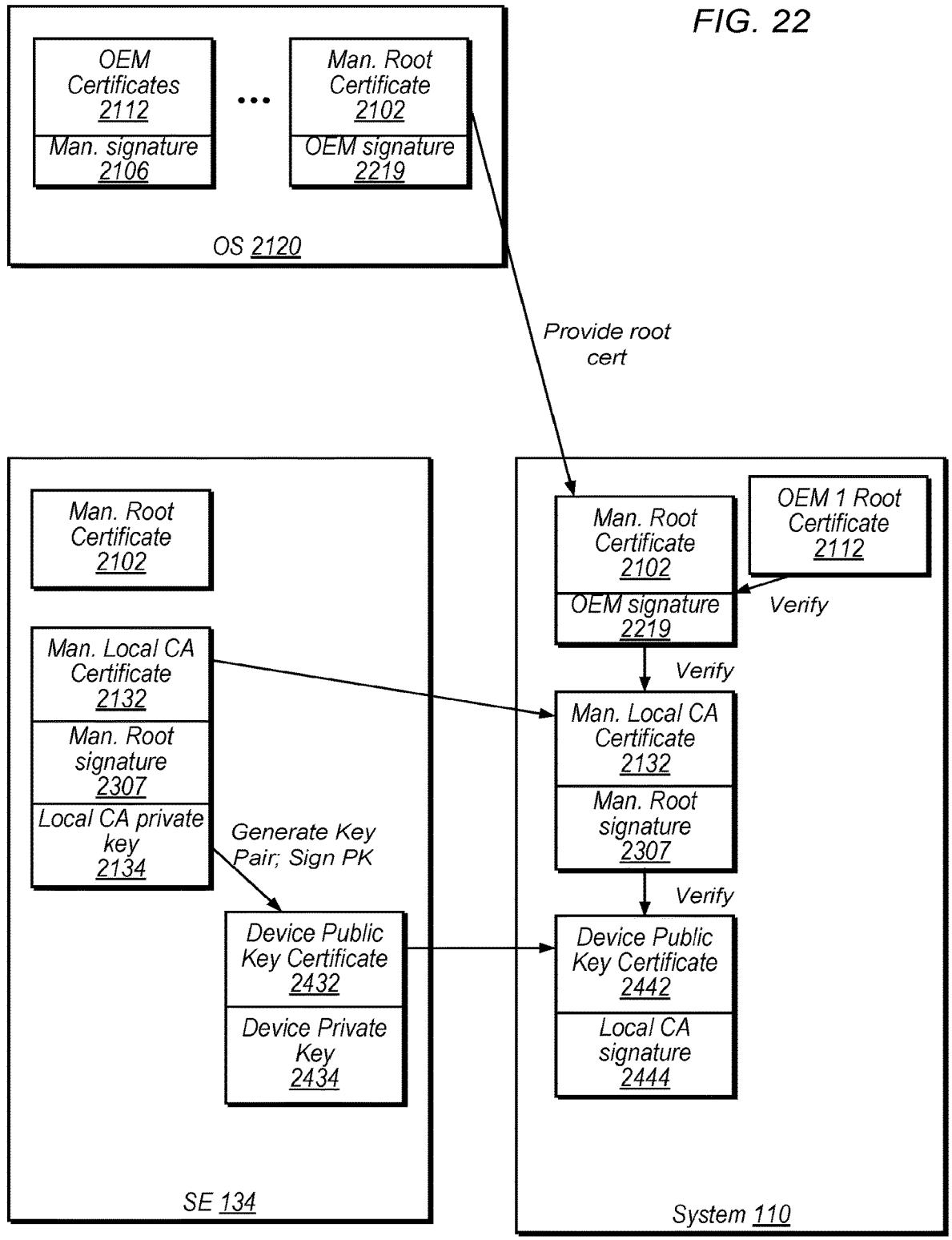

FIG. 22 is a block diagram illustrating an exemplary owner pairing certificate chain, according to some embodiments. During an owner pairing session the owner device 130 creates a long term key pair, in some embodiments. The public key is signed by the owner device SE to generate device public key certificate 2432 which is transferred to the system 110, together with the SE certificate 2132 and the system OEM-signed device root certificate 2102. The system can then verify the device OEM root certificate 2102 using the system OEM root certificate 2112, verify the SE certificate 2132 using the device OEM root certificate 2102 and verify the device public key using the SE certificate 2132. In some embodiments, when all verifications are successful, the device public key is stored in the system as the owner public key.

Figure 23:
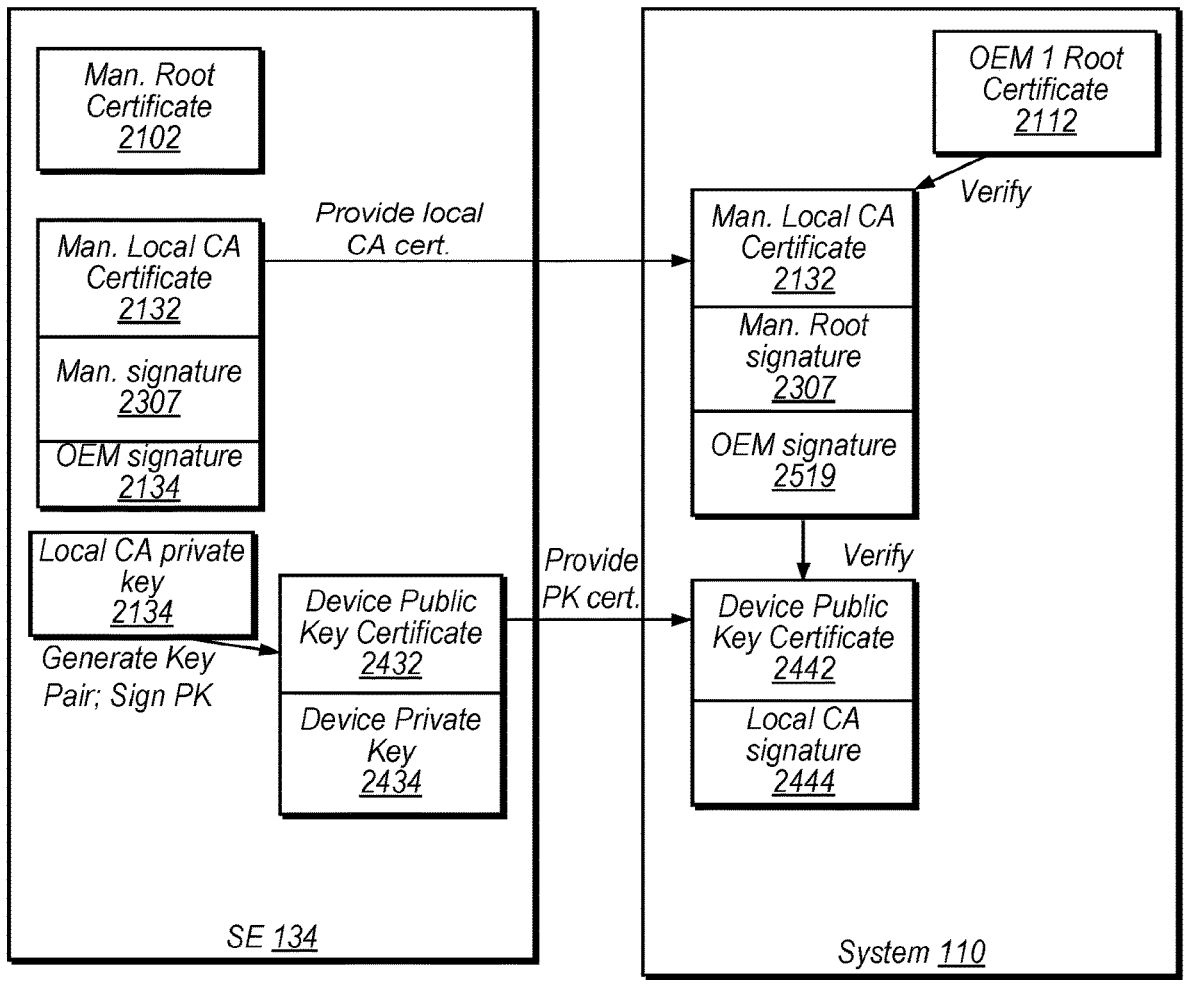

FIG. 23 is a block diagram illustrating exemplary owner pairing using a system OEM-signed local CA, according to some embodiments. In some embodiments in which the system is configured to store the (system OEM signed) root certificates of each whitelisted device OEM, then the need to provide the device OEM root cert as part of owner pairing may be eliminated, as well as the device OEM root certificate validation, provided that the device OEM root cert is stored in secured memory. The need to store all device OEM certificates in the system may be eliminated when the owner device provides a local CA certificate signed by the system OEM as shown.

In the illustrated embodiment, the manufacturer local CA certificate 2132 is signed by the manufacturer (signature 2307) and by the OEM (signature 2519), and is verified using the OEM 1 root certificate 2112 and then used to verify the device public key certificate 2442.

Figure 24:
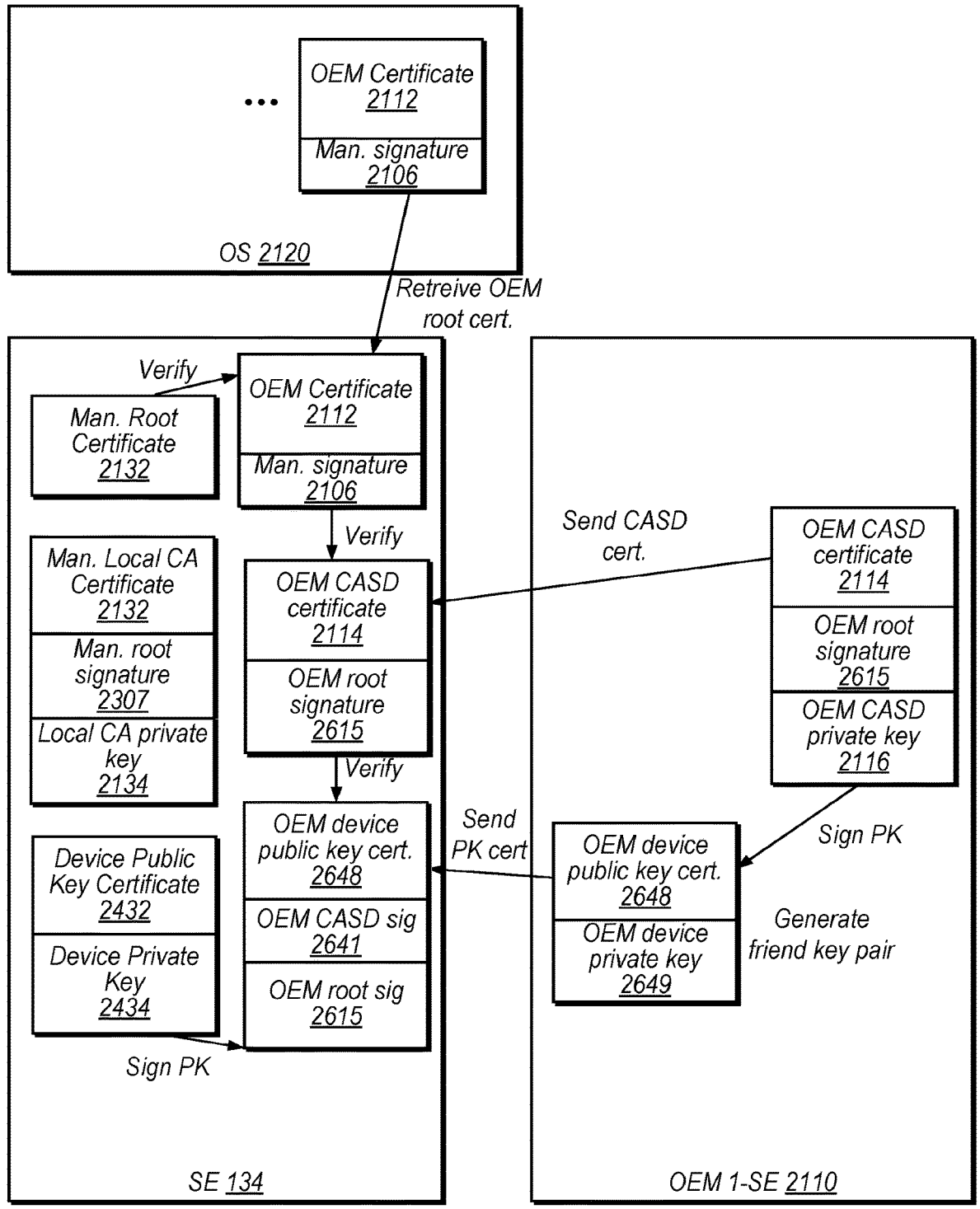

FIG. 24 is a block diagram illustrating an exemplary key sharing certificate chain, according to some embodiments. In some embodiments, when a signed public key is sent from the friend device to the owner device during a key sharing process, the secure element of the owner device may identify the SE certificate through the CA Identifier field and retrieves the corresponding OEM root certificate from the AP. In the illustrated embodiment, the SE 134 uses the manufacturer root certificate to verify the OEM certificate 2112, then uses the OEM certificate to verify the OEM CASD certificate (which may also be referred to as the SE certificate) received from the OEM SE 2110. It then uses the OEM CASD certificate to verify the friend's public key certificate. In some embodiments, when the verifications are successful, the owner device signs the friend's public key using the private key associated to the owner public key, which is also stored in the system (at owner pairing).

In some embodiments, the OEM CASD certificate may be replaced by a local CA scheme which replaces the SE manufacturer signature by a device OEM signature, for example.

Additional Embodiments

In some embodiments, an apparatus, comprises: a secure circuit; and one or more processing elements configured to, in response to receiving a first request to perform a pairing operation with a system, establish a first shared encryption key with the system; wherein the secure circuit is configured to generate a public key pair and a certificate corresponding to the public key pair, wherein the certificate includes a public key of the public key pair; wherein the apparatus is configured to: encrypt the certificate using the first shared key; and send the encrypted certificate to the system.

In some embodiments, the secure circuit is a secure element that is further configured to store payment data for payment transactions. In some embodiments, the apparatus is further configured to: display a value generated based on the public key pair; and request a user of the apparatus to confirm that the system also displays the value. In some embodiments, the apparatus is configured to, in response to receiving a second request to cause a system to perform an operation: establish a second shared encryption key; use a private key of the public key pair to generate a response to a challenge received from the system; encrypt the response using the second shared encryption key; and send the encrypted response to the system. In some embodiments, the operation includes opening a door of the system, enabling a navigation system of the system, or starting an engine of the system. In some embodiments, the apparatus is configured, in response to receiving a second request to permit another mobile device to access the system: sign, using a private key of the public key pair, a certificate for another public key pair generated by a secure circuit of the other mobile device. In some embodiments, the apparatus is further configured to: request, via a wide area network, a server signature of the certificate signed by the secure circuit; and the server signature is usable by the system to determine whether to grant an operation requested by the other mobile device. In some embodiments, the apparatus is further configured to indicate whether the other mobile device is allowed to perform ones of a set of entitlements specified by a user of the mobile device.

In some embodiments, a non-transitory computer-readable medium has instructions stored thereon that are executable by a computing device to cause operations comprising: receiving a first request to perform a pairing operation with a system; in response to the first request: establishing a first shared encryption key with the system; using a secure circuit of the device to generate a public key pair and a certificate corresponding to the public key pair, wherein the certificate includes a public key of the public key pair; encrypting the certificate using the first shared key; and sending the encrypted certificate to the system.

In some embodiments, the operations further comprise: displaying a value generated based on the public key pair; and requesting a user of the computing device to confirm that the system displays the value. In some embodiments, the operations further comprise: receiving a second request to cause a system to perform an operation; in response to the second request: establishing a second shared encryption key; using the secure circuit and a private key of the public key pair to generate a response to a challenge received from the system; encrypting the response with the second shared encryption key; and sending the response to the system.

In some embodiments, the operations further comprise: receiving a second request to permit another mobile device to access the system; and in response to the second request, using the secure circuit and a private key of the public key pair to sign a certificate for another public key pair generated by a secure circuit of the other mobile device.

In some embodiments, an apparatus is included in or configured to couple to a system, the apparatus comprising: one or more processing elements configured to: establish a first shared encryption key with a mobile device; receive an encrypted certificate from the mobile device, wherein the certificate corresponds to a first public key pair and includes a public key of the first public key pair, and wherein the certificate is encrypted using the first shared encrypted key; and decrypt the encrypted certificate and store the decrypted certificate.

In some embodiments, the one or more processing elements are further configured to: generate a value based on the first public key pair and cause the value to be displayed on a display of the system for comparison by a user with a corresponding value displayed on the mobile device. In some embodiments, the one or more processing elements are further configured to: store information indicating which of one or more operations by the system the mobile device is entitled to access. In some embodiments, the one or more processing elements are further configured to: for a request to cause the system to perform an operation, issue a challenge to the mobile device; negotiate a second shared encryption key with the mobile device; receive a response to the challenge and decrypt the response using the second shared encryption key; verify that the response is signed by the mobile device using a private key of the first public key pair before authorizing the operation. In some embodiments, the one or more processing elements are further configured to: receive a certificate for a public key pair generate by another mobile device; in response to determining that the certificate is signed by private key of the first public key pair by the mobile device, store the certificate for the other mobile device; and determine whether to authorize an operation for the other mobile device based on the stored certificate for the other mobile device.

In some embodiments, a non-transitory computer-readable medium has instructions stored thereon that are executable by a computing device of a system to cause operations comprising: establishing a first shared encryption key with a mobile device; receiving an encrypted certificate from the mobile device, wherein the certificate corresponds to a first public key pair and includes a public key of the first public key pair, and wherein the certificate is encrypted using the first shared encrypted key; and decrypting the encrypted certificate and store the decrypted certificate.

In some embodiments, the operations further comprise: for a request to cause the system to perform an operation, issuing a challenge to the mobile device; negotiating a second shared encryption key with the mobile device; receiving a response to the challenge and decrypt the response using the second shared encryption key; verifying that the response is signed by the mobile device using a private key of the first public key pair before authorizing the operation. In some embodiments, the operations further comprise: receiving a certificate for a public key pair generate by another mobile device; in response to determining that the certificate is signed by private key of the first public key pair by the mobile device, storing the certificate for the other mobile device; and determining whether to authorize an operation for the other mobile device based on the stored certificate for the other mobile device.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 25:
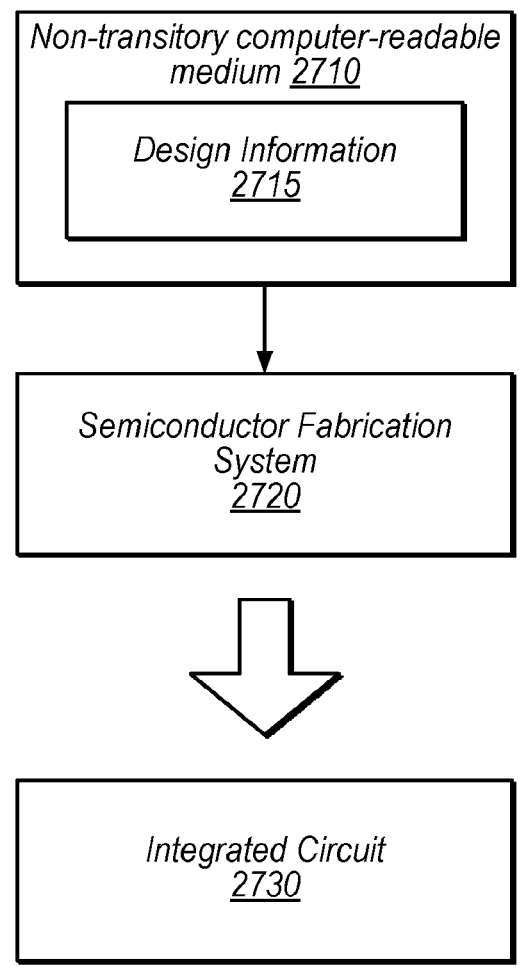
FIG. 25 is a block diagram illustrating an exemplary computer-readable medium that stores design information, according to some embodiments.

FIG. 25 is a block diagram illustrating an exemplary non-transitory computer-readable storage medium that stores circuit design information, according to some embodiments. In the illustrated embodiment semiconductor fabrication system 2720 is configured to process the design information 2715 stored on non-transitory computer-readable medium 2710 and fabricate integrated circuit 2730 based on the design information 2715.

Non-transitory computer-readable medium 2710, may comprise any of various appropriate types of memory devices or storage devices. Medium 2710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 2710 may include other types of non-transitory memory as well or combinations thereof. Medium 2710 may include two or more memory mediums which may reside in different locations, e.g., in different computer systems that are connected over a network.

Design information 2715 may be specified using any of various appropriate computer languages, including hardware description languages such as, without limitation: VHDL, Verilog, SystemC, SystemVerilog, RHDL, M, MyHDL, etc. Design information 2715 may be usable by semiconductor fabrication system 2720 to fabrication at least a portion of integrated circuit 2730. The format of design information 2715 may be recognized by at least one semiconductor fabrication system 2720. In some embodiments, design information 2715 may also include one or more cell libraries which specify the synthesis and/or layout of integrated circuit 2730. In some embodiments, the design information is specified in whole or in part in the form of a netlist that specifies cell library elements and their connectivity.

Semiconductor fabrication system 2720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 2720 may also be configured to perform various testing of fabricated circuits for correct operation.

In various embodiments, integrated circuit 2730 is configured to operate according to a circuit design specified by design information 2715, which may include performing any of the functionality described herein. For example, integrated circuit 2730 may include any of various elements shown in FIG. 1A-1C or 2. Further, integrated circuit 2730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Figure 26:
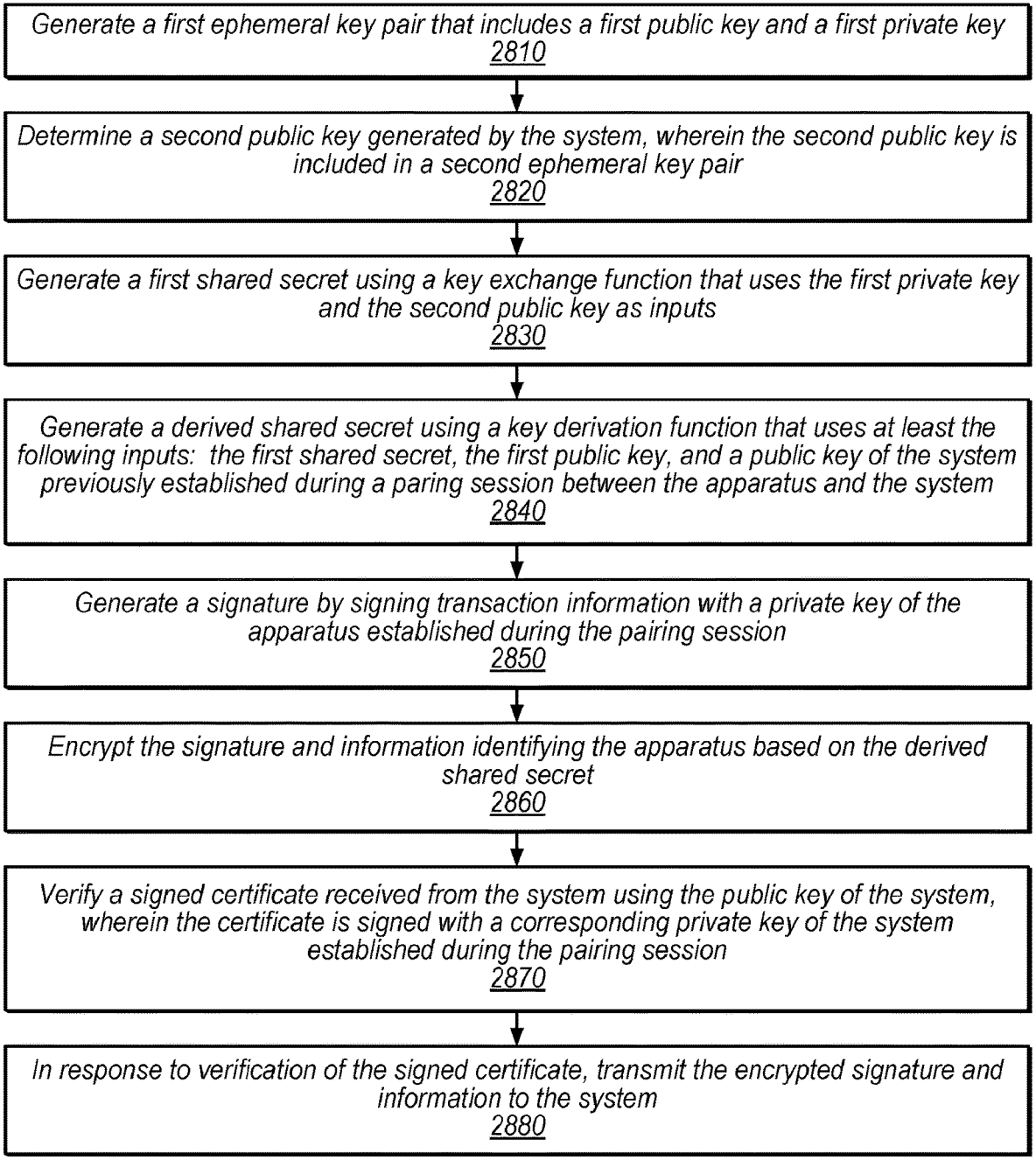
FIG. 26 is a flow diagram illustrating an exemplary mobile-side method for authentication, according to some embodiments.

FIG. 26 is a flow diagram illustrating an exemplary method for authentication in which a device does not send identifying information until after verifying a signed certificate from the other device, according to some embodiments. The method shown in FIG. 26 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 2810, in the illustrated embodiment, a device (e.g., a mobile device) generates a first ephemeral key pair that includes a first public key and a first private key. The phone.ePK and phone.eSK are one example of the first ephemeral key pair.

At 2820, in the illustrated embodiment, the device determines a second public key generated by a system, wherein the second public key is included in a second ephemeral key pair. System.ePK is one example of the second public key.

At 2830, in the illustrated embodiment, the device generates a first shared secret using a key exchange function that uses the first private key and the second public key as inputs. For example, the key exchange function may be DH(car.ePK, phone.eSK) and its output may be the first shared secret.

At 2840, in the illustrated embodiment, the device generates a derived shared secret using a key derivation function that uses at least the following inputs: the first shared secret, the first public key, and a public key of a system previously established during a pairing session between the device and the system. KAEseed is one example of the derived shared secret and system.PK is one example of the public key of the system.

At 2850, in the illustrated embodiment, the device generates a signature by signing transaction information with a private key of the device established during the pairing session. Phone.Sig is one example of such a signature.

At 2860, in the illustrated embodiment, the device encrypts the signature and information identifying the device based on the derived shared secret. phoneIdentifier is one example of the information identifying the device.

At 2870, in the illustrated embodiment, the device verifies a signed certificate received from the system using the public key of the system, wherein the certificate is signed with a corresponding private key of the system established during the pairing session. In various embodiments, the device does not transmit identifying information during a transaction until after verification of the signed certificate.

At 2880, in the illustrated embodiment, in response to verification of the signed certificate, the device transmits the encrypted signature and information to the system. In some embodiments, this transmission corresponds to the AUTH1 response.

Figure 27:
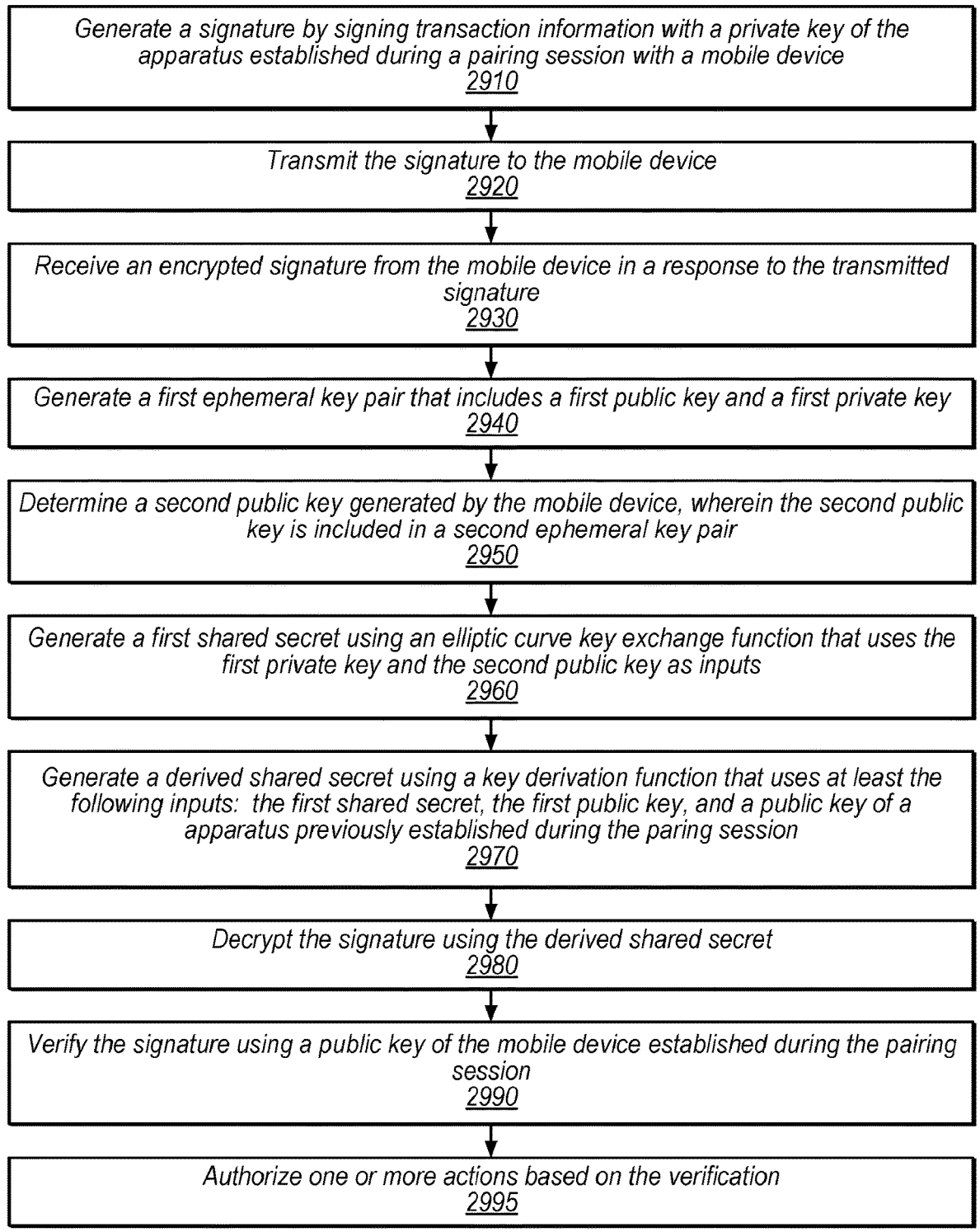
FIG. 27 is a flow diagram illustrating an exemplary system-side method for authentication, according to some embodiments.

FIG. 27 is a flow diagram illustrating an exemplary method for system-side authentication, according to some embodiments. The method shown in FIG. 27 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 2910, in the illustrated embodiment, a system (e.g., a vehicle) generates a signature by signing transaction information with a private key of the system established during a pairing session with a mobile device.

At 2920, in the illustrated embodiment, the system transmits the signature to the mobile device.

At 2930, in the illustrated embodiment, the system receives an encrypted signature from the mobile device in a response to the transmitted signature.

At 2940, in the illustrated embodiment, the system generates a first ephemeral key pair that includes a first public key and a first private key.

At 2950, in the illustrated embodiment, the system determines a second public key generated by the mobile device, wherein the second public key is included in a second ephemeral key pair.

At 2960, in the illustrated embodiment, the system generates a first shared secret using a key exchange function that uses the first private key and the second public key as inputs.

At 2970, in the illustrated embodiment, the system generates a derived shared secret using a key derivation function that uses at least the following inputs: the first shared secret, the first public key, and a public key of the system previously established during the pairing session.

At 2980, in the illustrated embodiment, the system decrypts the signature using the derived shared secret.

At 2990, in the illustrated embodiment, the system verifies the signature using a public key of the mobile device established during the pairing session.

At 2995, in the illustrated embodiment, the system authorizes one or more actions based on the verification.

Exemplary Digital Key Attestation Techniques

FIG. 28 is a block diagram illustrating exemplary digital key attestation during pairing, according to some embodiments. In the illustrated embodiment, server 3010 is configured to generate pairing passwords 3002 and send a system password and salt 3004 to system 110. Note that a secure remote password (SRP) (an augmented PAKE protocol) is used in the illustrated example for purposes of illustration, but the disclosed attestation techniques may be used with various security protocols. In the illustrated embodiment, the salt is random data that is used as an additional input to a one-way hash function, and may be used to protect the system password.

At 3006, the mobile device OS 2120 logs in to server 3010 and fetches an owner password. At 3008, SRP is used to create a secure channel and system 110 provides digital key configuration data. This configuration information may include various fields, e.g., indicating what type of transactions are allowed, system metadata, start date, expiration date, public keys, a system identifier, etc. In some embodiments, system 110 is configured to reject pairing unless the mobile device properly attests that the digital key was created according to the configuration data.

At 3012, mobile device OS 2120 sends a command to SE applet 3030 to create a digital key according to the configuration information. SE applet 3030 creates the digital key (which may include various information discussed herein such as a long-term public key pair for the pairing session) and sends an attestation and the public key to mobile device OS 2120 at 3014. The OS then sends attestation 3016 to system 110.

System 110 then verifies, at 3018 the attestation data and accepts or rejects the public key based on the verification. This may include comparing configuration data embedded in a signed certificate from the OS with the configuration data sent at 3008 and verifying a signature of the certificate to confirm that the certificate is from the SE. This may allow system 110 to confirm that a digital key was properly created before allowing pairing with a mobile device 130, in various embodiments.

Note that the functionality described with respect to OS 2120 and applet 3030 may be performed by a single module, which may be executed on a single processor, in other embodiments. The disclosed distribution of functionality in FIG. 28 is included for purposes of illustration but is not intended to limit the scope of the present disclosure.

Although specific embodiments have been described above and have been depicted in the accompanying appendix below, these embodiments are not intended to limit the scope of the present disclosure, even where only a single embodiment is described with respect to a particular feature. Examples of features provided in the disclosure are intended to be illustrative rather than restrictive unless stated otherwise. As one example, references to the term "phone" may encompass any suitable mobile device. Accordingly, the above and below descriptions are intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A mobile device, comprising:
one or more processing elements configured to:
determine an action associated with another system for which a sharee device is to be authorized;
transmit information indicating the action to the sharee device;
receive a certificate from the sharee device, wherein the certificate is signed and embeds the action and a public key of the sharee device;
verify a first signature of the certificate, verify the received certificate using a root certificate, and verify that the action matches the determined action;
sign the verified certificate with a private key of the mobile device established during a pairing session with the other system; and
transmit the signed certificate to the sharee device, wherein the signed certificate is usable for transmission by the sharee device to the other system for inclusion of the sharee device as an authorized device for the action based on validation of a second signature from signing the verified certificate and validation of the certificate.

2. The mobile device of claim 1, wherein the sharee device is another mobile device, the other system is a vehicle, and the action is opening the vehicle or starting the vehicle.

3. The mobile device of claim 1, wherein the one or more processing elements are further configured to:
encrypt the signed certificate before transmission, using a public key of an encryption key pair.

4. The mobile device of claim 1, wherein the one or more processing elements are further configured to:
authenticate a user of the mobile device prior to transmission of the signed certificate.

5. The mobile device of claim 1, wherein the one or more processing elements are further configured to:
maintain a counter value that indicates a number of times the mobile device has authorized one or more sharee devices;
update the counter value based on communications with the sharee device; and
transmit the counter value with the signed certificate to the sharee device, wherein the counter value is further usable for transmission by the sharee device to the other system for validation of the counter value.

6. The mobile device of claim 1, wherein the transmission of the signed certificate to the sharee device is performed via a direct wireless connection between the mobile device and the sharee device.

7. A mobile device, comprising:
one or more processing elements configured to:
receive, from a sharing device, information indicating an action to be authorized for the mobile device, wherein the action is associated with another system;
transmit, to the sharing device, a certificate that is signed and embeds the action and a public key of the mobile device;
receive, from the sharing device based on verification of the public key and the certificate, a signed version of the certificate that was signed to produce an additional signature using a private key of the sharing device that was established during a pairing session between the sharing device and the other system;
transmit the signed certificate to the other system for inclusion of the mobile device as an authorized device for the action based on validation of the additional signature and validation of the certificate; and
request the action from the other system.

8. The mobile device of claim 7, wherein the one or more processing elements are further configured to:
generate an encryption key pair for encryption of the signed certificate.

9. The mobile device of claim 7, wherein the signed version of the certificate is received via a direct wireless connection between the mobile device and the sharing device.

10. A system, comprising:
one or more processing elements configured to:
receive, from a sharee device, a signed certificate, wherein the certificate embeds an action authorized by a sharing device for the sharee device, wherein the certificate is generated by the sharee device and signed by the sharing device to produce a signature using a private key of the sharing device that was established during a pairing session between the sharing device and the system;
validate the signature of the sharing device and certificate;
store information indicating the sharee device as an authorized device for the action; and
initiate the action, in response to a request to perform the action from the sharee device.

11. The system of claim 10, wherein the one or more processing elements configured to:
maintain a counter value that indicates a number of times the sharing device has authorized one or more sharee devices;
update the counter value based on communications with the sharing device;
receive a counter value from the sharee device in conjunction with the signed certificate; and
validate the counter value.

12. The system of claim 10, wherein the sharee device is a mobile device, the system is a vehicle, and the action is opening the vehicle or starting the vehicle.

13. The system of claim 10, wherein the one or more processing elements are further configured to:
check entitlements embedded in the certificate; and
enforce the entitlements with respect to the sharee device.

14. The system of claim 13, wherein the entitlements include an expiration day, a speed limit, a location limit, or a time limit.

15. The system of claim 10, wherein the one or more processing elements are further configured to:
in response to the sharing device revoking authorization of the action, store an indication that the certificate has been revoked.

16. The mobile device of claim 1, wherein the one or more processing elements includes a secure element configured to sign the certificate.

17. The mobile device of claim 7, wherein the sharee device is another mobile device, the other system is a vehicle, and the action is opening the vehicle or starting the vehicle.

18. The mobile device of claim 7, wherein the certificate specifies one or more entitlements to be enforced by the other system.

19. The mobile device of claim 18, wherein the one or more entitlements include an expiration day, a speed limit, a location limit, or a time limit.

20. The mobile device of claim 7, wherein the one or more processing elements includes a secure element configured to generate the certificate.

\* \* \* \* \*